US006437887B1

(12) United States Patent
Usami et al.

(10) Patent No.: US 6,437,887 B1

(45) Date of Patent: Aug. 20, 2002

(54) OPTICAL LOGIC DEVICE AND OPTICAL MEMORY DEVICE

(75) Inventors: Yoshihisa Usami, Odawara; Masayuki Naya, Kaisei-machi; Yoshio Inagaki, Minamiashigara, all of (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/517,202

(22) Filed: Mar. 2, 2000

(30) Foreign Application Priority Data

Mar. 2, 1999 (JP) .......................................... 11-054745
Mar. 2, 1999 (JP) .......................................... 11-054749

(51) Int. Cl.[7] .................................................. G02F 3/00
(52) U.S. Cl. ....................................... 359/108; 359/107
(58) Field of Search ................................ 359/107, 108, 359/241, 242, 243, 244, 299

(56) References Cited

U.S. PATENT DOCUMENTS

| | | | | |
|---|---|---|---|---|
| 4,092,168 A | | 5/1978 | Lemahieu et al. | 96/84 |
| 4,102,688 A | | 7/1978 | Sugiyama et al. | 96/139 |
| 4,497,544 A | * | 2/1985 | Mitchell et al. | 359/244 |
| 4,790,634 A | * | 12/1988 | Miller et al. | 349/198 |

(List continued on next page.)

FOREIGN PATENT DOCUMENTS

| | | |
|---|---|---|
| EP | 0021336 A1 * | 1/1981 |
| JP | 48-62826 | 9/1973 |
| JP | 49-5125 | 1/1974 |
| JP | 49-99620 | 9/1974 |

(List continued on next page.)

OTHER PUBLICATIONS

Toshihiko Nagamura, et al., "Novel all optical light modulation based on complex refractive index changes of organic dye–doped polymer film upon photoexcitation", Appl. Phys. Lett., 69(9), Aug. 26, 1996, pp. 1191–1193.*

Kyoichi Sasaki, et al., "Ultrafast wide range all–optical switch using complex refractive–index changes in a composite film of silver and polymer containing photochromic dye", J. Appl. Phys., vol. 83, No. 6, pp. 72–78. Mar. 15, 1998.*

Takayuki Okamoto, et al., "All–optical spatial light modulator with surface plasmon resonance", Optics Letters, vol. 18, No. 18, pp. 3570–3572, Sep. 15, 1993.*

(List continued on next page.)

*Primary Examiner*—Cassandra Spyrou
*Assistant Examiner*—John Juba, Jr.
(74) *Attorney, Agent, or Firm*—Sughrue Mion, PLLC

(57) ABSTRACT

An optical logic device comprises a dielectric block arranged such that a driving light is incident on one plane thereof at a total reflection critical angle through an interior thereof, a metallic film formed over the one plane of the dielectric block, and an optical functional film, a refractive index of which is changed by irradiation of light, formed over the metallic film such that the optical functional film is irradiated with a control light. A surface plasmon device is fabricated, which comprises a dielectric block arranged such that a driving light having a uniform intensity is incident on one plane thereof at a total reflection critical angle through an interior thereof, a metallic film formed over the one plane of the dielectric block, an optical functional film, a refractive index of which is changed by irradiation of light, formed over the metallic film such that the optical functional film is irradiated with a signal light subjected to space modulation. The driving light reflected on the one plane upon irradiating the optical functional film with the signal light is made incident on the optical functional film by an optical system.

9 Claims, 16 Drawing Sheets

U.S. PATENT DOCUMENTS

| | | | | | |
|---|---|---|---|---|---|
| 4,803,150 | A | | 2/1989 | Dickerson et al. | 430/502 |
| 4,855,221 | A | | 8/1989 | Factor et al. | 430/510 |
| 4,857,446 | A | | 8/1989 | Diehl et al. | 430/510 |
| 4,861,700 | A | | 8/1989 | Shuttleworth et al. | 430/517 |
| 4,900,652 | A | | 2/1990 | Dickerson et al. | 430/502 |
| 4,920,031 | A | | 4/1990 | Ohno et al. | 430/522 |
| 4,948,717 | A | | 8/1990 | Diehl et al. | 430/510 |
| 4,992,654 | A | * | 2/1991 | Crossland et al. | 359/108 |
| 5,067,788 | A | * | 11/1991 | Jannson et al. | 385/2 |
| 5,115,336 | A | * | 5/1992 | Schildkraut et al. | 359/263 |
| 5,318,882 | A | | 6/1994 | Ootaguro et al. | 430/495 |
| 5,384,221 | A | * | 1/1995 | Savant et al. | 365/120 |
| 5,570,139 | A | * | 10/1996 | Wang | 359/245 |
| 5,617,232 | A | * | 4/1997 | Takemori | 359/107 |
| 5,633,106 | A | * | 5/1997 | Aihara et al. | 430/21 |
| 5,939,163 | A | * | 8/1999 | Ueno et al. | 369/283 |
| 6,020,105 | A | * | 2/2000 | Wariishi | 430/270.19 |
| 6,057,020 | A | * | 5/2000 | Ueno et al. | 369/283 |
| 6,214,519 | B1 | * | 4/2001 | Suzuki et al. | 369/275.4 |
| 6,265,708 | B1 | * | 7/2001 | Tanaka et al. | 250/216 |

FOREIGN PATENT DOCUMENTS

| | | | |
|---|---|---|---|
| JP | 49-114420 | 10/1974 | |
| JP | 52-38056 | 3/1977 | A23J/3/00 |
| JP | 52-92716 | 8/1977 | G03C/1/84 |
| JP | 54-38129 | 3/1979 | G03G/5/082 |
| JP | 55-10059 | 1/1980 | F03B/15/18 |
| JP | 58-35544 | 3/1983 | G03G/5/10 |
| JP | 59-16834 | 1/1984 | C07C/13/28 |
| JP | 63-316853 | 12/1988 | G03C/1/84 |
| JP | 64-40827 | 2/1989 | G03C/1/84 |
| JP | 2-300287 | 12/1990 | C09K/15/18 |
| JP | 2-300288 | 12/1990 | C09K/15/20 |
| JP | 3-224793 | 10/1991 | B41M/5/26 |
| JP | 9-277703 | 10/1997 | B41M/5/26 |

OTHER PUBLICATIONS

Zouheir Sekkat, et al., "Photosensitive Organized Organic Films in the Light of Bound Electromagnetic Waves", SPIE vol. 2998, ("Photosensitive Optical Materials and Devices"), pp. 164–184. 1997.*

"Electrochromic Attenuated Total Reflection Modulator", IBM Tech. Disclosure Bulletin, vol. 22, Issue 5, p. 2074, Oct. 1979.*

M.E. Caldwell, et al., "Performance Characteristics of Surface Plasmon Liquid Crystal Light Valve", Electron. Lett., Vo. 27, No. 16, pp. 1471–1472. Aug. 1991.*

Abstract DE 2321470 A, Dec. 1973.

Abstract DE 2259746 A, Jul. 1973.

Abstract DE 2409689 A, Sep. 1974.

Abstract JP 49099620 A, Jul. 1975.

Abstract 59–016834 (JP 82124157) Jan. 1984.

Abstract 03–224793 (JP 3224793 A) Oct. 1991.

Abstract 09–277703 (JP 9277703 A) Oct. 1997.

* cited by examiner

F I G . 1A
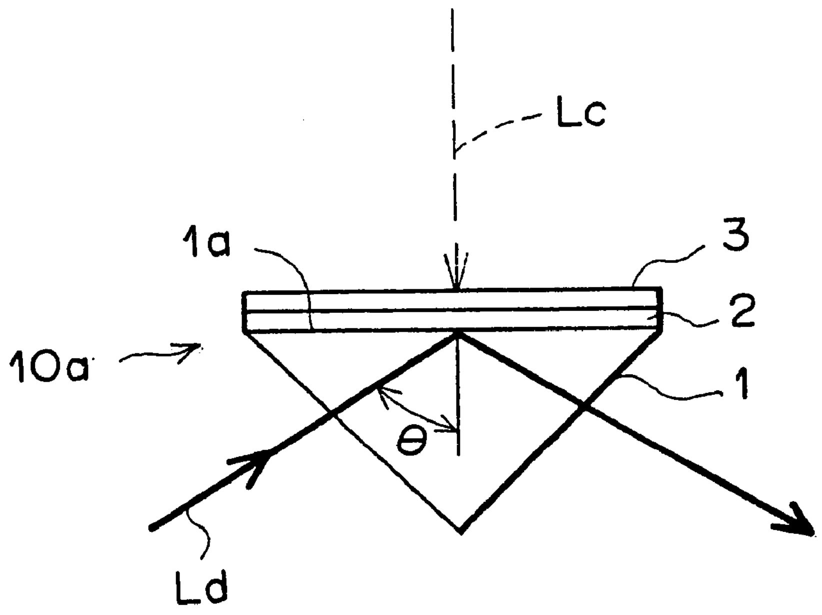
F I G . 1B
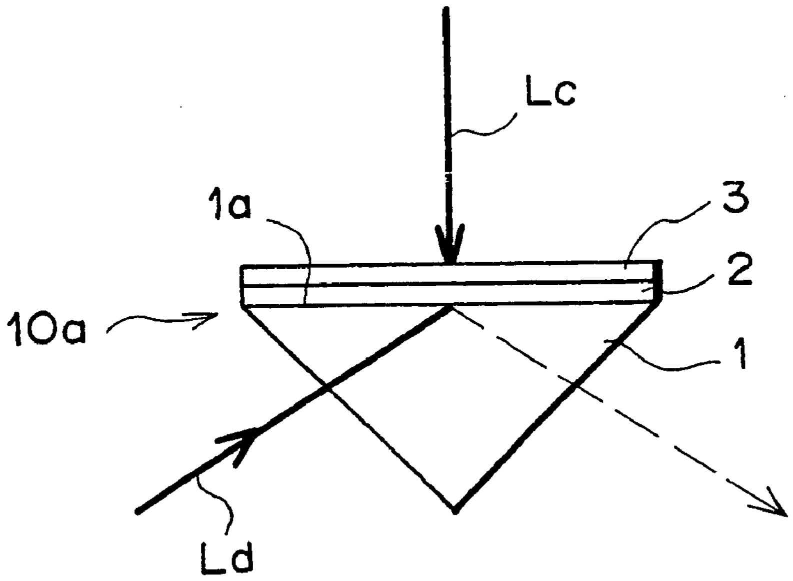

FIG. 18
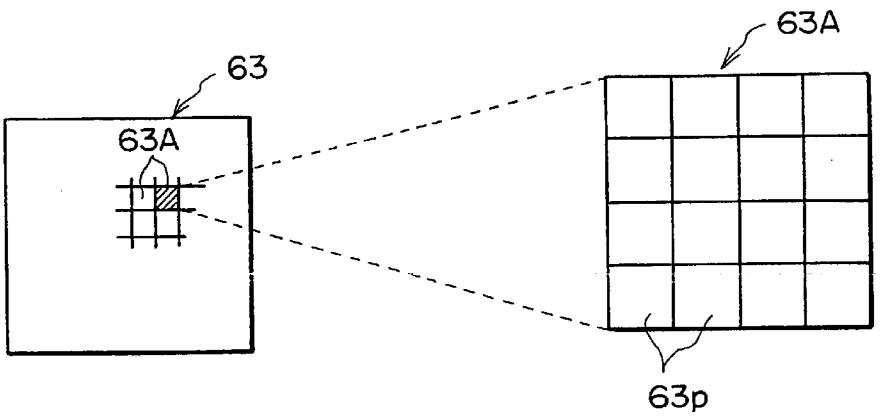
FIG. 19
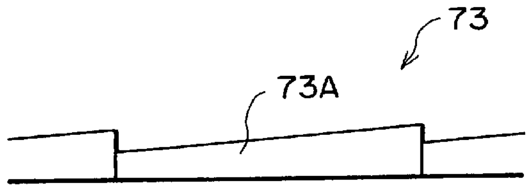
FIG. 20A
FIG. 20B
FIG. 20C
FIG. 20D
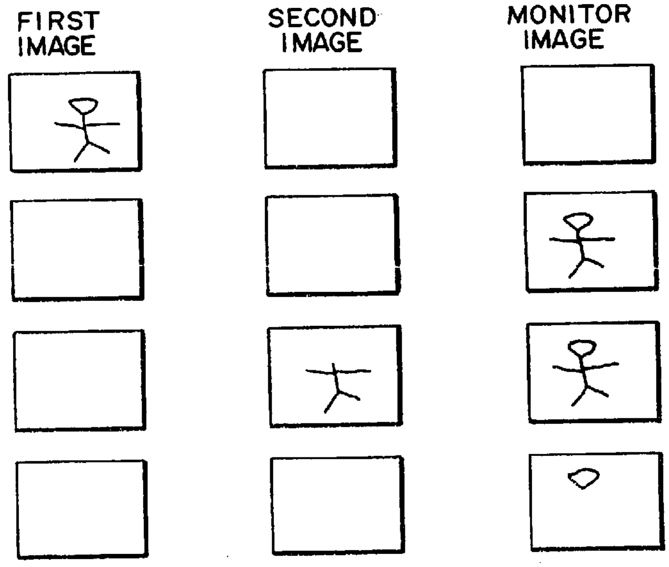

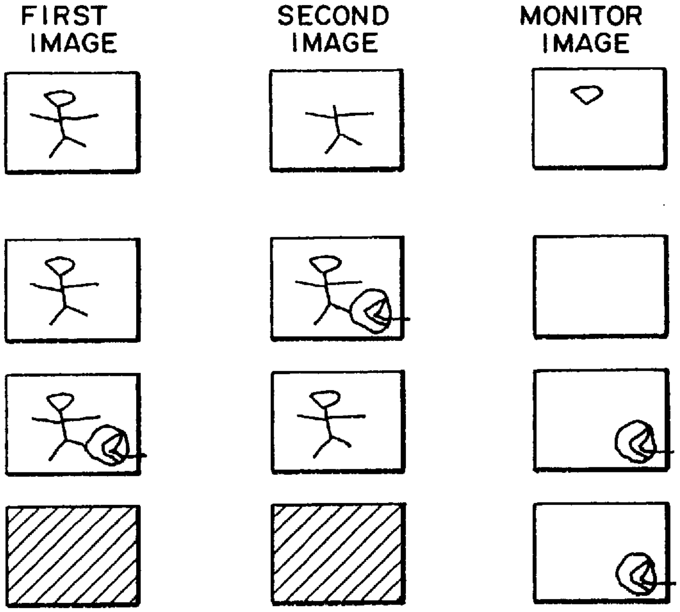
FIG. 21A
FIG. 21B
FIG. 21C
FIG. 21D
FIG. 22
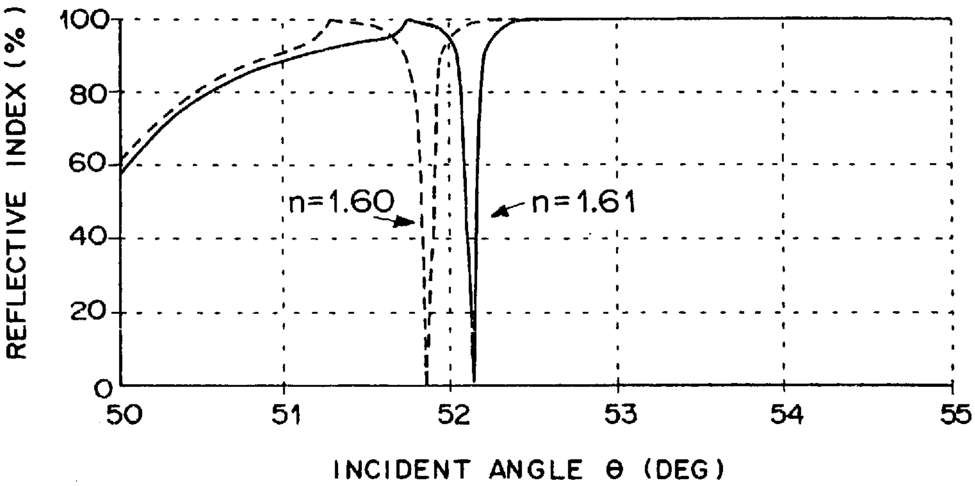

OPTICAL LOGIC DEVICE AND OPTICAL MEMORY DEVICE

BACKGROUND OF THE INVENTION

1. Field of the Invention

The present invention relates to an optical logic device, and more particularly, to an optical logic device performing a logic operation by utilizing generation of surface plasmon resonance.

The invention also relates to an optical logic circuit and an optical oscillation circuit using the optical logic device.

Furthermore, the invention also relates to an optical memory device storing the modulation status of space-modulated signal light by utilizing generation of surface plasmon resonance.

The invention further relates to an optical operation device determining a difference between two kinds of space modulation states of signal light by utilizing generation of surface plasmon resonance.

2. Description of the Prior Art

Owing to its fast transmission speed, investigations are being widely conducted to apply light to the fields of communication and operation. In these fields, various applications are being studied by utilizing an optical circuit, such as an optical logic circuit.

However, many restrictions have been conventionally applied to the constitution of an optical circuit because an inexpensive optical switching device has not been available, and an optical circuit having a simple constitution has not been realized. More specifically, it has been very difficult to realize a logic device, such as AND and OR devices, as a basic component of an optical circuit, as well as an optical logic circuit and an optical oscillation circuit obtained by combining the same. Furthermore, even when an optical oscillation circuit is realized, it is difficult to obtain one having a sufficiently high oscillation frequency.

SUMMARY OF THE INVENTION

The invention has been developed in view of the circumstances described above, and an object of the invention is to provide an optical logic device having a simple constitution that can be produced at a low cost, as well as an optical logic circuit and an optical oscillation circuit, which are inexpensive and have a high operation speed, obtained by combining the same.

The invention relates to an optical logic device performing a logic operation with respect to one or plural input lights, the optical logic device comprising a dielectric block arranged in such a manner that a driving light is incident on one plane thereof at a total reflection critical angle through an interior thereof, a metallic film formed over the one plane of the dielectric block, and an optical functional film, a refractive index of which is changed by irradiation of light, formed over the metallic film in such a manner that the optical functional film is irradiated with a control light.

In the optical logic device according to the invention, the incident angle of the driving light on the one plane of the dielectric block is set, for example, at such an angle that when the optical functional film is irradiated with the control light, the surface plasmon resonance is relatively strongly excited on the metallic film, and when the optical functional film is not irradiated with the control light, the surface plasmon resonance is relatively weakly excited or is not excited. The device of this type is hereinafter called an optical logic device of the mode a.

Contrary to the above, the incident angle of the driving light on the one plane of the dielectric block may be set at such an angle that when the optical functional film is not irradiated with the control light, the surface plasmon resonance is relatively strongly excited on the metallic film, and when the optical functional film is irradiated with the control light, the surface plasmon resonance is relatively weakly excited or is not excited. The device of this type is hereinafter called an optical logic device of the mode b.

The invention provides a NOT circuit using an optical logic device of the mode a. The circuit receives one control light incident on the optical functional film of the optical logic device as an input light, and emits a driving light subjected to total reflection at an interface between the dielectric block and the metallic film as an output light, which is a result of the NOT operation.

The invention also provides an exNOR circuit using an optical logic device of the mode a. The circuit receives two control lights incident on the optical functional film of the optical logic device as input lights, and emits a driving light subjected to total reflection at an interface between the dielectric block and the metallic film as an output light, which is a result of the exNOR operation.

The invention also provides an AND circuit using an optical logic device of the mode b. The circuit receives one control light incident on the optical functional film of the optical logic device and one driving light incident on one plane of the dielectric block as two input lights, and emits a driving light subjected to total reflection at an interface between the dielectric block and the metallic film as an output light, which is a result of the AND operation.

The invention also provides an OR circuit using an optical logic device of the mode b. The circuit receives two control lights incident on the optical functional film of the optical logic device as input lights, and emits a driving light subjected to total reflection at an interface between the dielectric block and the metallic film as an output light, which is a result of the OR operation.

While an optical logic circuit using one optical logic device of the invention has been described above, various optical logic circuits and a flip-flop circuit can be formed by using a plurality of the optical logic devices in such a manner that a driving light subjected to total reflection at an interface between the dielectric block and the metallic film of one optical logic device is incident on the other optical logic device as the control light.

More specifically, the invention provides an exOR circuit comprising two optical logic devices of the mode a, the circuit comprising one of the optical logic devices arranged as a first optical logic device that receives two control lights incident on an optical functional film thereof as input lights, and another of the optical logic devices arranged as a second optical logic device that receives a driving light subjected to total reflection at an interface between a dielectric block and a metallic film of the first optical logic device as one control light, the circuit emitting a driving light subjected to total reflection at an interface between a dielectric block and a metallic film of the second optical logic device as an output light, which is a result of the exOR operation.

The invention also provides a NAND circuit comprising an optical logic device of the mode a and an optical logic device of the mode b, the circuit comprising the optical logic device of the mode b arranged as a first optical logic device that receives one control light incident on an optical functional film thereof and one driving light before being incident on one plane of a dielectric block as two input lights, and the optical logic device of the mode a arranged as a second optical logic device that receives a driving light subjected to total reflection at an interface between the dielectric block and a metallic film of the first optical logic device as one control light, the circuit emitting a driving light subjected to total reflection at an interface between a dielectric block and a metallic film of the second optical logic device as an output light, which is a result of the NAND operation.

The invention also provides a NOR circuit comprising an optical logic device of the mode a and an optical logic device of the mode b, the circuit comprising the optical logic device of the mode b arranged as a first optical logic device that receives two control lights incident on an optical functional film thereof as input lights, and the optical logic device of the mode a arranged as a second optical logic device that receives a driving light subjected to total reflection at an interface between a dielectric block and a metallic film of the first optical logic device as one control light, the circuit emitting a driving light subjected to total reflection at an interface between a dielectric block and a metallic film of the second optical logic device as an output light, which is a result of the NOR operation.

In the optical logic circuits of the invention described above, it is preferred to use plural lights having different wavelengths as the plural lights incident on the optical logic device.

The invention further provides an optical oscillation circuit comprising one or plural optical logic devices of the invention. Specifically, an optical oscillation circuit according to the invention comprises an optical logic device of the mode a, and an optical system, by which a driving light subjected to total reflection at an interface between a dielectric block and a metallic film of the optical logic device is incident on an optical functional film of the optical logic device.

The invention still further provides another optical oscillation circuit comprising an optical logic device of the mode b, an optical device of the mode a arranged in such a manner that an optical functional film of the optical logic device of the mode a receives a driving light subjected to total reflection at an interface between a dielectric block and a metallic film of the optical logic device of the mode b, and an optical system, by which a driving light subjected to total reflection at an interface between a dielectric block and a metallic film of the optical logic device of the mode a is incident on an optical functional film of the optical logic device of the mode b.

In the optical oscillation circuits of the invention described above, it is also preferred to use plural lights having different wavelengths as the plural lights incident on the optical logic device.

BRIEF DESCRIPTION OF THE DRAWINGS

FIGS. 1A and 1B are schematic side views showing the first embodiment of the optical logic device according to the invention.

FIG. 18 is a schematic plan view showing an example of the optical functional film used in the invention.

FIG. 19 is a schematic side view showing another example of the optical functional film used in the invention.

FIGS. 20A to 20D are explanatory views showing the operation process in the optical operation device of FIGS. 15A to 15C.

FIGS. 21A to 21D are explanatory views showing the operation result in the optical operation device of FIGS. 15A to 15C.

FIG. 22 is a graph showing the relationship between the incident angle of a driving light with respect to one plane of the dielectric block and the reflective index at the plane, in the optical memory device of FIGS. 13A to 13C.

DESCRIPTION OF THE PREFERRED EMBODIMENTS

Figure 2A:
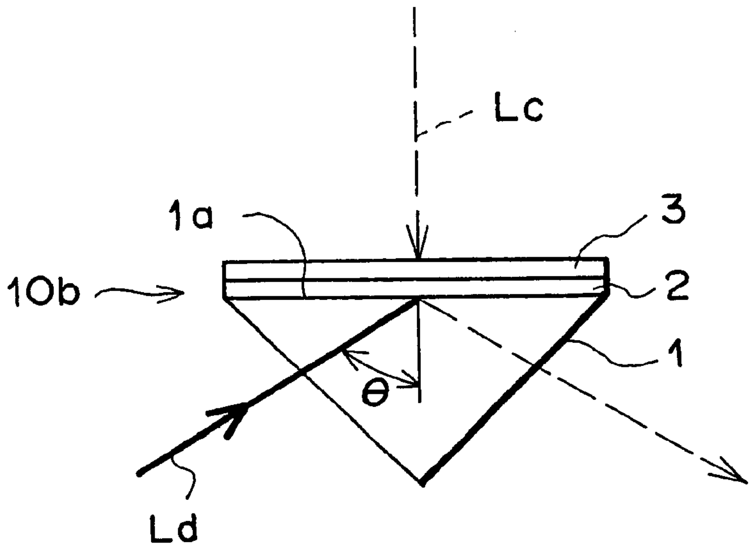
FIGS. 2A and 2B are schematic side views showing the second embodiment of the optical logic device according to the invention.

In the invention, the dielectric block is formed from a dielectric, which is transparent with respect to the wavelength of the light to be modulated. The dielectric block should preferably be formed from a material, which has a refractive index falling within the range of 1.2 to 3 with respect to the wavelength of the light to be modulated. Specifically, the dielectric block may be formed from BK7, high refractive index glass, a polycarbonate, or the like.

The thickness of the metallic film employed in the invention is set such that the surface plasmon resonance occurs with light having a wavelength falling within the range of 350 nm to 2,000 nm. Ordinarily, the thickness of the metallic film should preferably fall within the range of 10 nm to 70 nm. Such that adhesion of the dielectric block and the metallic film to each other may be kept good, a thin layer of an anchor material may be formed between the dielectric block and the metallic film. (The thickness of the anchor material should preferably be at most 5 nm.)

As the optical functional film constituting the optical logic device of the invention, one comprising a compound represented by formula (I) is preferably used:

(I)

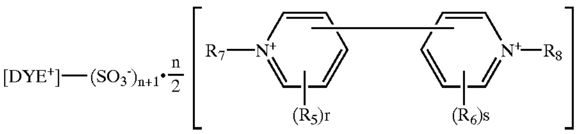

wherein $DYE^+$ represents a mono-valent cation of a cyanine dye; n represents an integer of 1 or more; $R_5$ and $R_6$ each independently represent a substituent group; $R_7$ and $R_8$ each independently represent an alkyl group, an alkenyl group, an alkynyl group, an aralkyl group, an aryl group or a heterocyclic group, provided that $R_5$ and $R_6$, $R_5$ and $R_7$, $R_6$ and $R_8$ or $R_7$ and $R_8$ may each be connected to form a ring; and r and s each independently represent an integer of from 0 to 4, provided that when r and s are each 2 or more, plural groups of r and s may be the same or different.

In the invention, the cyanine dye cation represented by formula (I) is preferably a cation represented by formula (I-1):

(I-1)

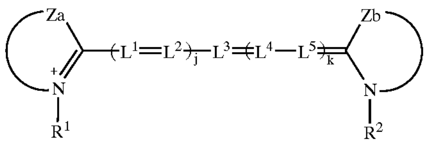

wherein Za and Zb each independently represent an atomic group for forming a 5-membered or 6-membered nitrogen-containing heterocyclic ring; $R^1$ and $R^2$ each independently represent an alkyl group or an aryl group; $L^1$, $L^2$, $L^3$, $L^4$ and $L^5$ each independently represent a substituted or unsubstituted methine group (provided that when $L^1$ to $L^5$ have substituents, they may be connected to form a ring); j represents 0, 1 or 2; and k represents 0 or 1.

Examples of the 5-membered or 6-membered nitrogen-containing heterocyclic ring (nucleus) represented by Za and Zb include a thiazole nucleus, a benzothiazole nucleus, a naphthothiazole nucleus, a thiazoline nucleus, an oxazole nucleus, a benzoxazole nucleus, a naphthoxazole nucleus, an oxazoline nucleus, a selenazole nucleus, a benzoselenazole nucleus, a naphthoselenazole nucleus, a selenazoline nucleus, a tellurazole nucleus, a benzotellurazole nucleus, a naphthotellurazole nucleus, a tellurazoline nucleus, an imidazole nucleus, a benzoimidazole nucleus, a naphthoimidazole nucleus, a pyridine nucleus, a quinoline nucleus, an isoquinoline nucleus, an imidazo[4,5-b]quinoxaline nucleus, an oxadiazole nucleus, a thiadiazole nucleus, a tetrazole nucleus, and a pyrimidine nucleus.

Among these, a benzothiazole nucleus, an imidazole nucleus, a naphthoimidazole nucleus, a quinoline nucleus, an isoquinoline nucleus, an imidazo[4,5-b]quinoxaline nucleus, a thiadiazole nucleus, a tetrazole nucleus, and a pyrimidine nucleus are preferred.

These rings may have a benzene ring or a naphthoquinone ring condensed therewith.

The 5-membered or 6-membered nitrogen-containing heterocyclic ring may have a substituent. Preferred examples of the substituent include a halogen atom, a substituted or unsubstituted alkyl group, and an aryl group. As a halogen atom, a chlorine atom is preferred. As an alkyl group, a linear alkyl group having from 1 to 6 carbon atoms is preferred. Examples of the substituent on the alkyl group include an alkoxy group (such as methoxy) and an alkylthio group (such as methylthio). As an aryl group, a phenyl group is preferred.

The alkyl group represented by $R^1$ and $R^2$ may have a substituent. Preferred examples thereof include a linear, cyclic or branched alkyl group having from 1 to 18 (more preferably from 1 to 8, and particularly from 1 to 6) carbon atoms.

The aryl group represented by $R^1$ and $R^2$ may have a substituent, and is preferably an aryl group having from 6 to 18 carbon atoms, which may have a substituent.

Preferred examples of the substituent of the alkyl group or the aryl group represented by $R^1$ and $R^2$ include a substituted or unsubstituted aryl group having from 6 to 18 carbon atoms (such as phenyl, chlorophenyl, anisyl, toluyl, 2,4-di-t-amyl, and 1-naphthyl), an alkenyl group (such as vinyl and 2-methylvinyl), an alkynyl group (such as ethynyl, 2-methylethynyl, and 2-phenylethynyl), a halogen atom (such as F, Cl, Br, and I), a cyano group, a hydroxyl group, a carboxyl group, an acyl group (such as acetyl, benzoyl, salicyloyl, and pivaloyl), an alkoxy group (such as methoxy, butoxy, and cyclohexyloxy), an aryloxy group (such as phenoxy and 1-naphthoxy), an alkylthio group (such as methylthio, butylthio, benzylthio, and 3-methoxypropylthio), an arylthio group (such as phenylthio and 4-chlorophenylthio), an alkylsulfonyl group (such as methanesulfonyl and butanesulfonyl), an arylsulfonyl group (such as benzensulfonyl and paratoluenesulfonyl), a carbamoyl group having from 1 to 10 carbon atoms, an amido group having from 1 to 10 carbon atoms, an acyloxy group having from 2 to 10 carbon atoms, an alkoxycarbonyl group having from 2 to 10 carbon atoms, a heterocyclic group (such as a heterocyclic aromatic ring, e.g., pyridyl, thienyl, furyl, thiazolyl, imidazolyl and pyrazolyl, and an aliphatic heterocyclic ring, e.g., a pyrrolidine ring, a piperidine ring, a morphorine ring, a pyran ring, a thiopyran ring, a dioxane ring and a dithiolane ring).

In the invention, $R^1$ and $R^2$ are each preferably a linear alkyl group having from 1 to 8 (preferably from 1 to 6, and particularly from 1 to 4) carbon atoms having, as a substituent, an unsubstituted linear alkyl group having from 1 to 8 (preferably from 1 to 6, and particularly from 1 to 4) carbon atoms, an unsubstituted alkoxy group (particularly methoxy), or an unsubstituted alkylthio group (particularly methylthio).

The methine group represented by $L^1$ to $L^5$ may have a substituent. Preferred examples of the substituent include an alkyl group having from 1 to 18 carbon atoms, an aralkyl group, and those exemplified as the preferred examples of the substituent for the alkyl group or the aryl group represented by $R^1$ and $R^2$. Among these, an alkyl group (such as methyl), an aryl group (such as phenyl), a halogen atom (such as Cl and Br), and an aralkyl group (such as benzyl) are preferred.

In the invention, j and k are preferably each independently 0 or 1.

The substituents on $L^1$ to $L^5$ may be connected to form a ring. The ring is preferably a 5-membered ring or a 6-membered ring, and two or more of the rings may be condensed with each other. The positions at which the rings are connected are different depending on the number of the methine chain. For example, in the case where the methine chain formed with $L^1$ to $L^5$ is a pentamethine chain, the preferred connecting positions are $L^1$ and $L^3$, $L^2$ and $L^4$, and $L^3$ and $L^5$. The connecting position in the case of forming a double condensed ring is preferably $L^1$, $L^3$ and $L^5$. In this case, $L^1$ and $R^1$, $L^5$ and $R^2$ and $L^3$ and $R^2$ may each be connected to form a ring, which is preferably a 5-membered ring or a 6-membered ring.

In the invention, the ring formed with the substituents on $L^1$ to $L^5$ is preferably a cyclohexene ring.

Among the cyanine dye cations represented by formula (I-1), a cation represented by formula (I-2) is more preferred.

(I-2)

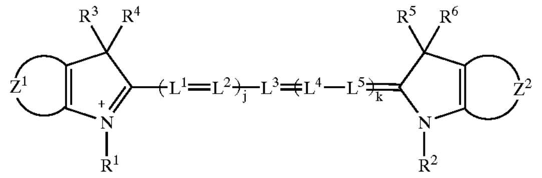

wherein $Z^1$ and $Z^2$ each independently represent an atomic group for forming an indolenine nucleus or a benzoindolenine nucleus; $R^1$ and $R^2$ each independently represent an alkyl group or an aryl group, $R^3$, $R^4$, $R^5$ and $R^6$ each independently represent an alkyl group; $L^1$, $L^2$, $L^3$, $L^4$ and $L^5$ each independently represent a substituted or unsubstituted methine group (provided that when $L^1$ to $L^5$ have substituents, they may be connected to form a ring); j represents 0, 1 or 2; and k represents 0 or 1.

The indolenine nucleus or the benzoindolenine nucleus represented by $Z^1$ and $Z^2$ may have a substituent. Examples of the substituent (atom) include a halogen atom and an aryl group. As a halogen atom, a chlorine atom is preferred. As an aryl group, a phenyl group is preferred.

The alkyl group represented by $R^3$, $R^4$, $R^5$ and $R^6$ is preferably a linear, branched or cyclic alkyl group having from 1 to 18 carbon atoms. $R^3$ and $R^4$, $R^5$ and $R^6$ may be connected to each other to form a ring.

The alkyl group represented by $R^3$, $R^4$, $R^5$ and $R^6$ may have a substituent. Preferred examples of the substituent include those exemplified as the preferred substituents for the alkyl group or the aryl group represented by $R^1$ and $R^2$.

In the invention, the alkyl group represented by $R^3$, $R^4$. $R^5$ and $R^6$is preferably a linear unsubstituted alkyl group having from 1 to 6 carbon atoms (particularly methyl and ethyl).

In formula (I-2), $R^1$, $R^2$, $L^1$, $L^2$, $L^3$, $L^4$, $L^5$, j, k, $X^{n-}$, and n have the same meanings as those in formula (I-1). Preferred examples thereof are also the same as those in formula (I-1).

The $(SO_3^-)$ group in $[DYE^+]\text{-}(SO_3^-)_{n+1}$ is preferably connected to the end of $R^1$ and $R^2$ in formula (I-1) and formula (I-2).

Specific examples of the part represented by $[DYE^+]\text{-}(SO_3^-)_{n+1}$ will be listed below.

A-1

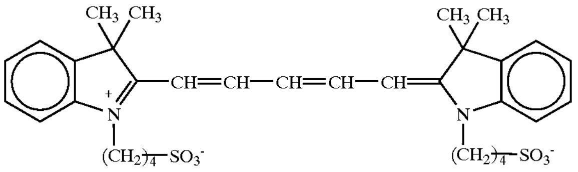

A-2

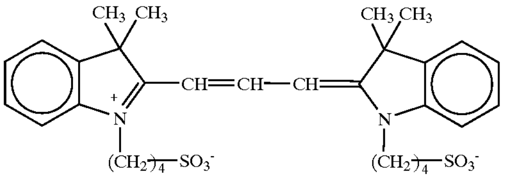

A-3

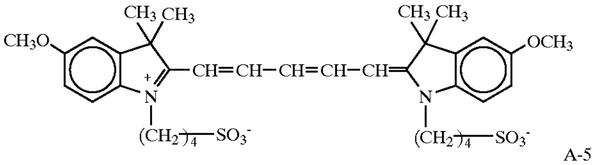

A-4

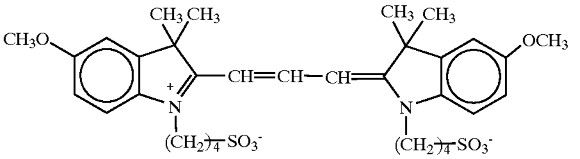

A-5

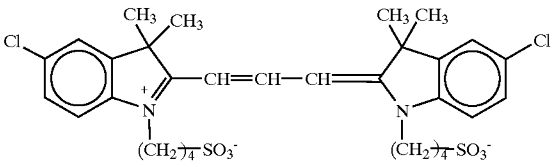

A-6

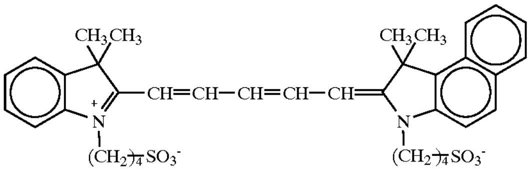

A-7

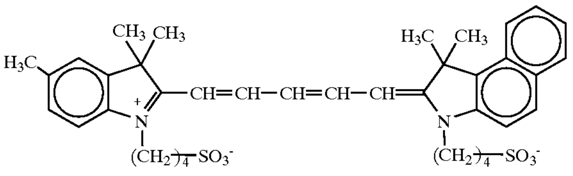

A-8

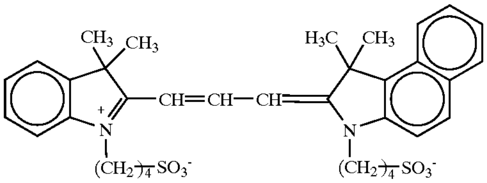

-continued
A-9
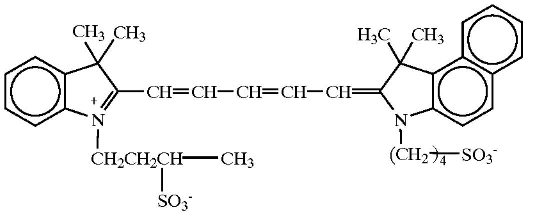
A-10
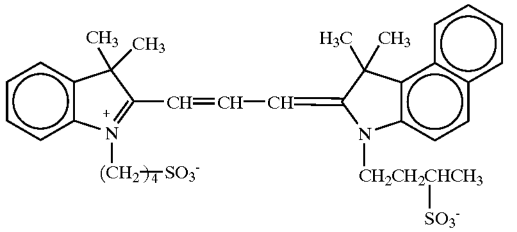
A-11
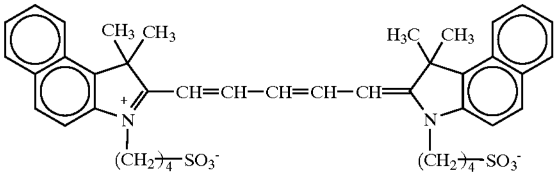
A-12
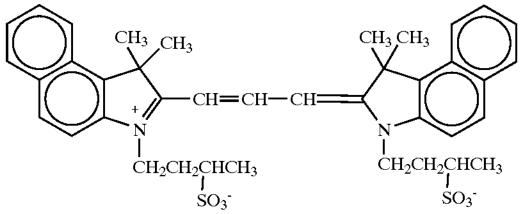
A-13
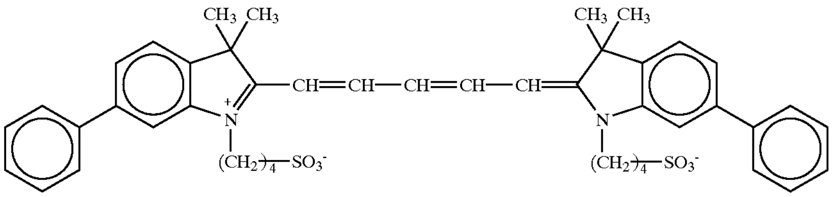
A-14
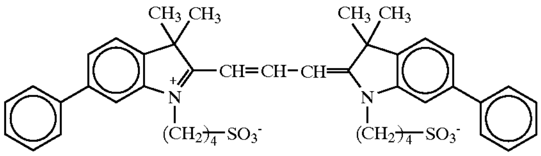
A-15
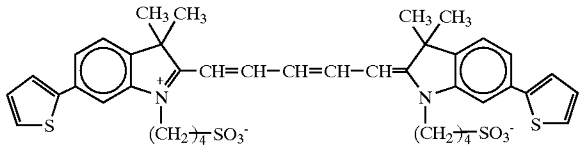
A-16
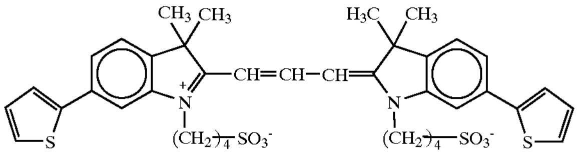
A-17
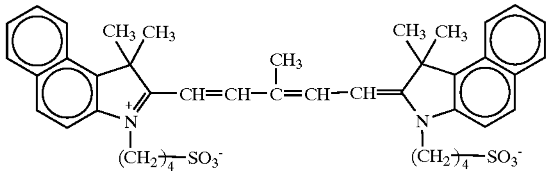
A-18
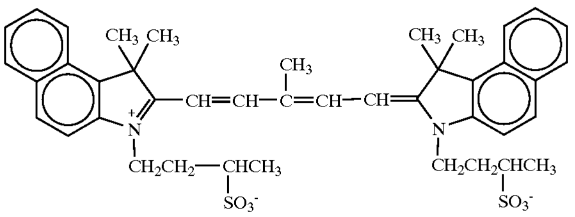
A-19
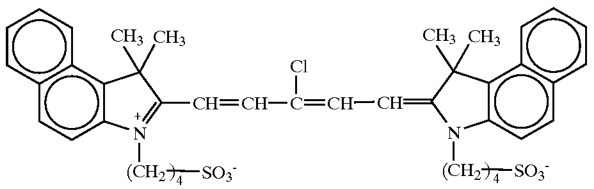
A-20
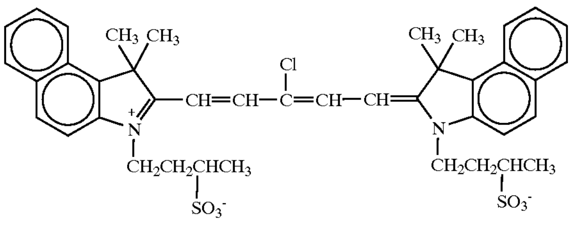
A-21
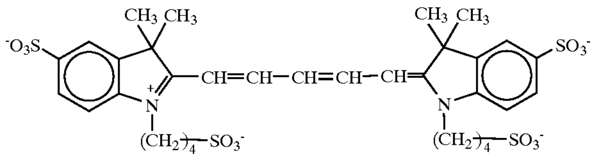

-continued
A-22
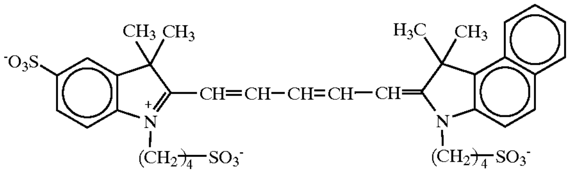
A-23
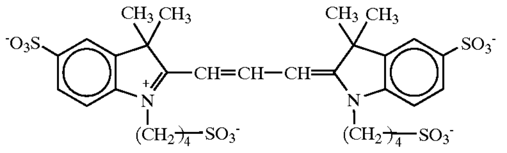
A-24
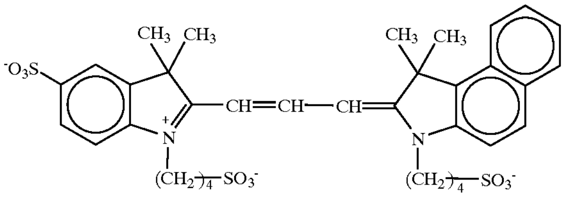
A-25
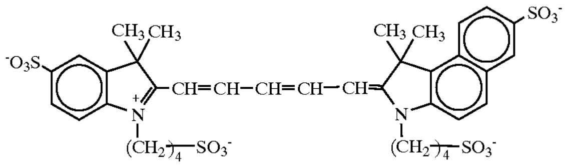
A-26
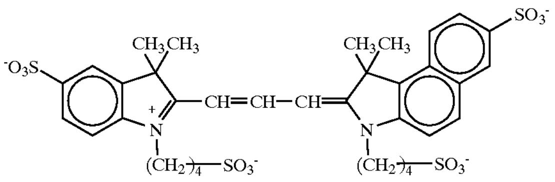
A-27
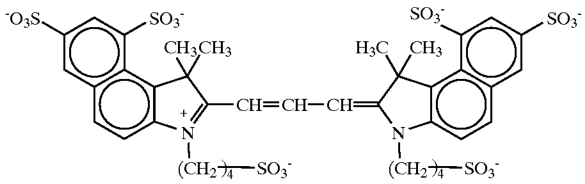
A-28
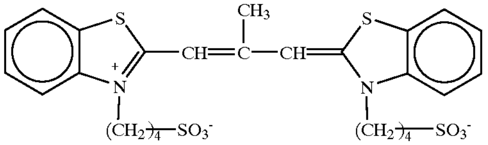
A-29
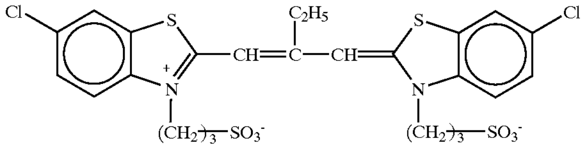
A-30
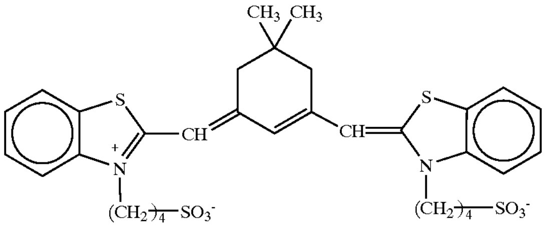
A-31
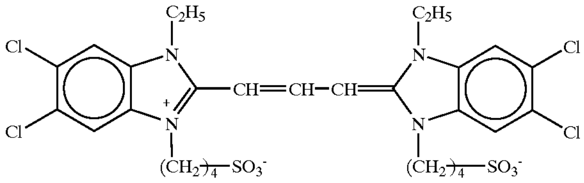
A-32
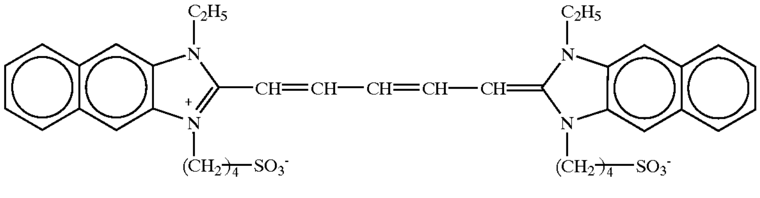
A-33
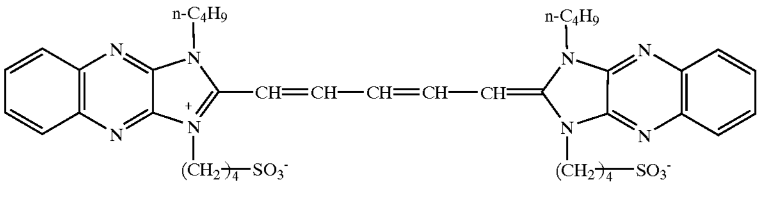

-continued

A-34

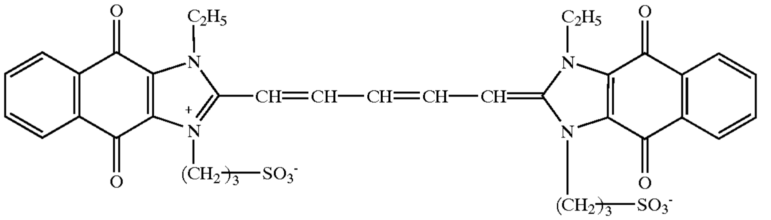

A-35

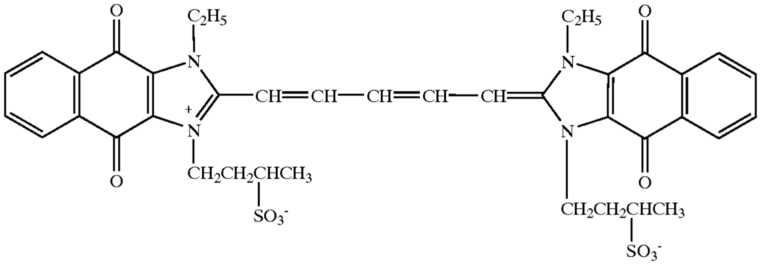

A-36

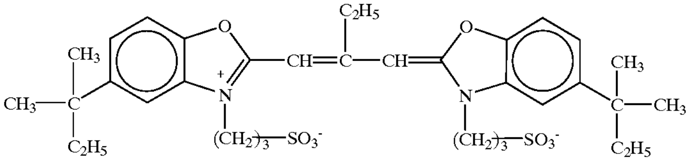

A-37

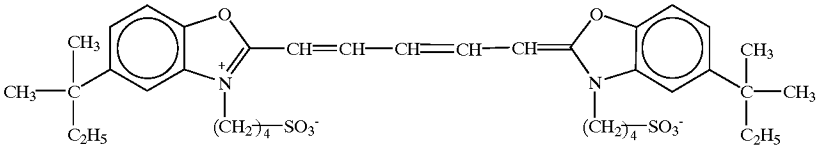

A-38

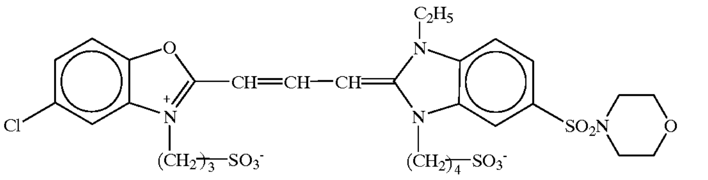

The moiety structure (referred to as formula (I-3)) shown below in formula (I) will hereinbelow be described in detail.

(I-3)

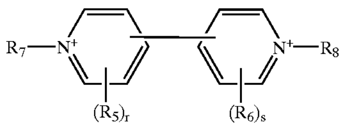

wherein $R_5$ and $R_6$ each independently represent a substituent; $R_7$ and $R_8$ each independently represent an alkyl group, an alkenyl group, an alkynyl group, an aralkyl group, an aryl group or a heterocyclic group, provided that $R_5$ and $R_6$, $R_5$ and $R_7$, $R_6$ and $R_8$, or $R_7$ and $R_8$ each may be connected to form a ring; and r and s each independently represent an integer of from 0 to 4, provided that when r and s are each 2 or more, plural groups of r and s may be the same or not the same.

As the alkyl group represented by $R_7$ and $R_8$, a substituted or unsubstituted alkyl group having from 1 to 18 carbon atoms is preferred, and more preferably a substituted or unsubstituted alkyl group having from 1 to 8 carbon atoms. The alkyl group may be linear, branched or cyclic. Examples thereof include methyl, ethyl, n-propyl, isopropyl, n-butyl, isobutyl, t-butyl, n-hexyl, neopentyl, cyclohexyl, adamantyl, and cyclopropyl.

Examples of the substituent for the alkyl group include the following:

a substituted or unsubstituted alkenyl group having from 2 to 18 carbon atoms (preferably from 2 to 8 carbon atoms) (such as vinyl);

a substituted or unsubstituted alkynyl group having from 2 to 18 carbon atoms (preferably from 2 to 8 carbon atoms) (such as ethynyl);

a substituted or unsubstituted aryl group having from 6 to 10 carbon atoms (such as phenyl and naphthyl);

a halogen atom (such as F, Cl and Br);

a substituted or unsubstituted alkoxy group having from 1 to 18 carbon atoms (preferably from 1 to 8 carbon atoms) (such as methoxy and ethoxy);

a substituted or unsubstituted aryloxy group having from 6 to 10 carbon atoms (such as phenoxy and p-methoxyphenoxy);

a substituted or unsubstituted alkylthio group having from 1 to 18 carbon atoms (preferably from 1 to 8 carbon atoms) (such as methyltho and ethylthio);

a substituted or unsubstituted arylthio group having from 6 to 10 carbon atoms (such as phenylthio);

a substituted or unsubstituted acyl group having from 2 to 18 carbon atoms (preferably from 2 to 8 carbon atoms) (such as acetyl and propyonyl);

a substituted or unsubstituted alkylsulfonyl group or arylsulfonyl group having from 1 to 18 carbon atoms (preferably from 1 to 8 carbon atoms) (such as methanesulfonyl and p-toluenesulfonyl);

a substituted or unsubstituted acyloxy group having from 2 to 18 carbon atoms (preferably 2 to 8 carbon atoms) (such as acetoxy and propionyloxy);

a substituted or unsubstituted alkoxycarbonyl group having from 2 to 18 carbon atoms (preferably from 2 to 8 carbon atoms) (such as methoxycarbonyl and ethoxycarbonyl);

a substituted or unsubstituted aryloxycarbonyl group having from 7 to 11 carbon atoms (such as naphthoxycarbonyl);

an unsubstituted amino group, or a substituted amino group having from 1 to 18 carbon atoms (preferably from 1 to 8 carbon atoms) (such as methylamino, dimethylamino, diethylamino, anilino, methoxyphenylamino, chlorophenylamino, pyridylamino, methoxycarbonylamino, n-butoxycarbonylamino, phenoxycarbonylamino, methylcarbamoylamino, ethylthiocarbamoylamino, phenylcarbamoylamino, acetylamino, ethylcarbonylamino, ethylthiocarbamoylamino, cyclohexylcarbonylamino, benzoylamino, chloroacetylamino, and methylsulfonylamino);

a substituted or unsubstituted carbamoyl group having from 1 to 18 carbon atoms (preferably from 1 to 8 carbon atoms) (such as unsubstituted carbamoyl, methylcarbamoyl, ethylcarbamoyl, n-butylcarbamoyl, t-butylcarbamoyl, dimethylcarbamoyl, morphorinocarbamoyl, and pyrrolidinocarbamoyl);

an unsubstituted sulfamoyl group, or a substituted sulfamoyl group having from 1 to 18 carbon atoms (preferably from 1 to 8 carbon atoms) (such as methylsulfamoyl and phenylsulfamoyl);

a cyano group, a nitro group, a carboxyl group, and a hydroxyl group; and a heterocyclic group (such as an oxazole ring, a benzoxazole ring, a thiazole ring, a benzothiazole ring, an imidazole ring, a benzoimidazole ring, an indolenine ring, a pyridine ring, a piperidine ring, a pyrrolidine ring, a morphorine ring, a sulfolane ring, a furan ring, a thiophene ring, a pyrazole ring, a pyrrole ring, a chroman ring, and a coumarin ring).

As the alkenyl group represented by $R_7$ and $R_8$, a substituted or unsubstituted alkenyl group having from 2 to 18 carbon atoms, and more preferably a substituted or unsubstituted alkenyl group having from 2 to 8 carbon atoms, such as vinyl, allyl, 1-propenyl, and 1,3-butadienyl is used.

As the substituent for the alkenyl group, those exemplified as the substituents for the alkyl group are preferred.

As the alkynyl group represented by $R_7$ and $R_8$, a substituted or unsubstituted alkynyl group having from 2 to 18 carbon atoms, and more preferably a substituted or unsubstituted alkynyl group having from 2 to 8 carbon atoms, such as ethynyl and 2-propynyl is used.

As the substituent for the alkynyl group, those exemplified as the substituents for the alkyl group are preferred.

As the aralkyl group represented by $R_7$ and $R_8$, a substituted or unsubstituted aralkyl group having from 7 to 18 carbon atoms, such as benzyl and methylbenzyl are preferred.

As the aryl group represented by $R_7$ and $R_8$, a substituted or unsubstituted aryl group having from 6 to 18 carbon atoms, such as phenyl and naphthyl are preferred.

As the substituent for the aryl group, those exemplified as the substituents for the alkyl group are preferred. In addition to these, an alkyl group (such as methyl and ethyl) is also preferred.

The heterocyclic group represented by $R_7$ and $R_8$ includes a saturated or unsaturated 5-membered or 6-membered heterocyclic ring constituted with a carbon atom, a nitrogen atom, an oxygen atom or a sulfur atom, and examples thereof include an oxazole ring, a benzoxazole ring, a thiazole ring, a benzothiazole ring, an imidazole ring, a benzoimidazole ring, an indolenine ring, a pyridine ring, a piperidine ring, a pyrrolidine ring, a morphorine ring, a sulfolane ring, a furan ring, a thiophene ring, a pyrazole ring, a pyrrole ring, a chroman ring, and a coumarin ring. The heterocyclic group may have a substituent, and as the substituent in this case, those exemplified as the substituents for the alkyl group are preferred.

The substituent represented by $R_5$ and $R_6$ is the same as those exemplified as the substituents for the alkyl group. In addition to these, an alkyl group (such as methyl and ethyl) is also exemplified.

In the invention, the substituent represented by $R_5$ and $R_6$ is preferably a hydrogen atom or an alkyl group, and particularly preferably a hydrogen atom.

The partial structure represented by formula (I-3) is particularly preferably represented by formula (I-4) or (I-5):

(I-4)

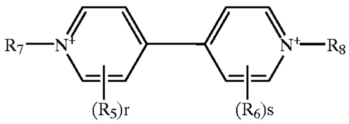

wherein $R_{17}$ and $R_{18}$ have the same meanings as the substituents represented by $R_5$ and $R_6$, and the preferred scopes thereof are also the same; $R_{19}$ and $R_{20}$ have the same meanings as the substituents represented by $R_7$ and $R_8$, and the preferred scopes thereof are also the same; and r and s each independently represent an integer of from 0 to 4, provided that when r and s are 2 or more, plural groups represented by r and s may be the same or different.

(I-5)

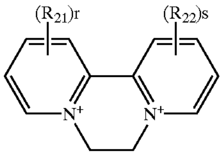

wherein $R_{21}$ and $R_{22}$ have the same meanings as the substituents represented by $R_5$ and $R_6$, and the preferred scopes thereof are also the same, $R_{21}$ and $R_{22}$ are preferred to be connected to each other to form a carbon ring or a heterocyclic ring, and are particularly preferred to be a condensed aromatic ring combined with the pyridine ring, to which $R_{21}$ and $R_{22}$ are connected; and r and s each independently represent an integer of from 0 to 4, provided that when r and s are 2 or more, plural groups represented by r and s may be the same or different.

Specific examples of the part represented by formula (I-3) (represented by $B^-$) in the dye compound represented by formula (I) used in the invention will be listed below.

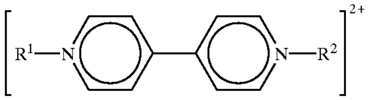
| No. | $R^1$ | $R^2$ |
|---|---|---|
| B-1 | $CH_3$ | $CH_3$ |
| B-2 | $C_2H_5$ | $C_2H_5$ |
| B-3 | n-$C_3H_7$ | n-$C_3H_7$ |
| B-4 | n-$C_4H_9$ | n-$C_4H_9$ |
| B-5 | iso-$C_4H_9$ | iso-$C_4H_9$ |
| B-6 | n-$C_6H_{13}$ | n-$C_6H_{13}$ |
| B-7 | $—C(CH_3)_3$ | $—C(CH_3)_3$ |
| B-8 | $—CH_2CH_2C(CH_3)_3$ | $—CH_2CH_2C(CH_3)_3$ |
| B-9 | $CH_2{=}CH$ | $CH_2{=}CH$ |
| B-10 | $NCCH_2$ | $NCCH_2$ |
| B-11 | $EtO_2C—CH_2$ | $EtO_2C—CH_2$ |
| B-12 | $HOCH_2CH_2$ | $HOCH_2CH_2$ |
| B-13 | $EtOCH_2CH_2$ | $EtOCH_2CH_2$ |
| B-14 | 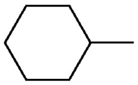 | 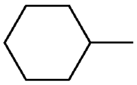 |
| B-15 | $CH_3$ | $PhCH_2$ |
| B-16 | $CH_3COCH_2$ | $CH_3COCH_2$ |
| B-17 | 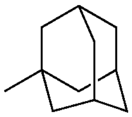 | 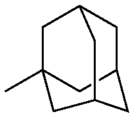 |
| B-18 | $CF_3CH_2$ | $CF_3CH_2$ |
| B-19 | Ph | Ph |
| B-20 | 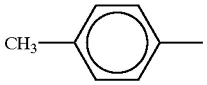 | 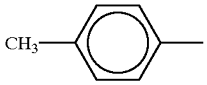 |
| B-21 | 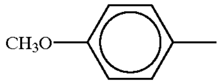 | 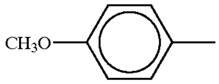 |
| B-22 | 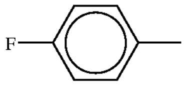 | 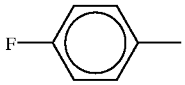 |
| B-23 | 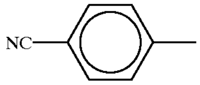 | 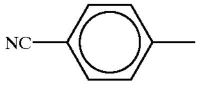 |
| B-24 | 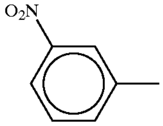 | 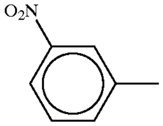 |
B-25
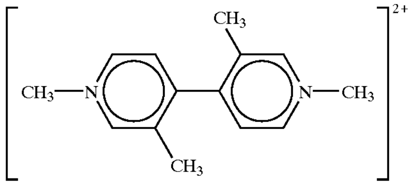

-continued
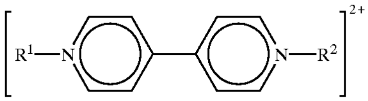
B-26
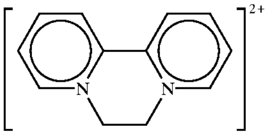
B-27
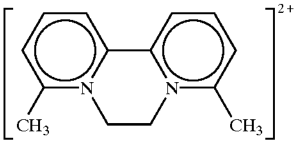
B-28
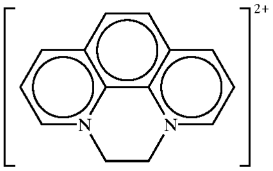
B-29
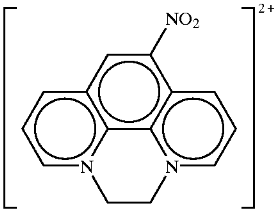
B-30
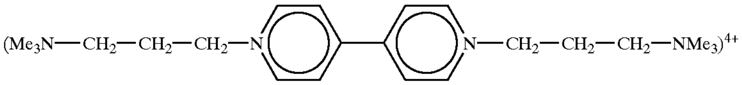
B-31
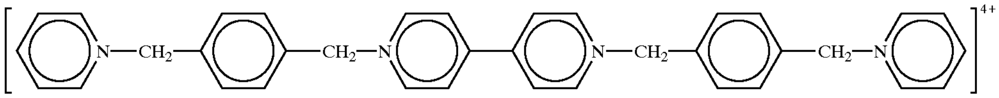
B-32
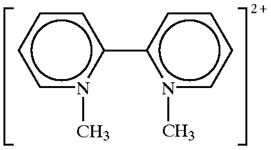
B-33
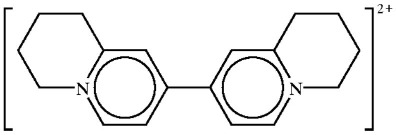
B-34
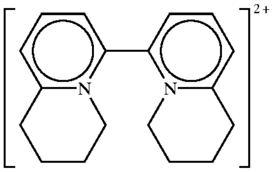

-continued
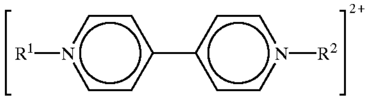
B-35
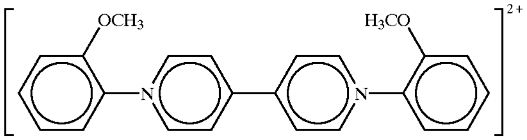
B-36
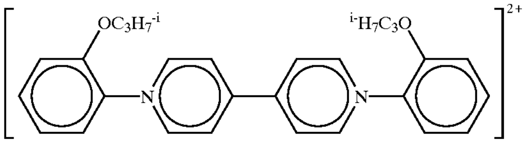
B-37
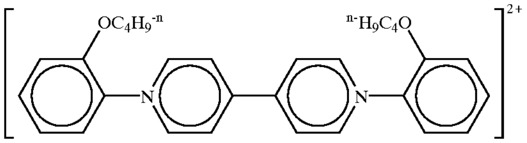
B-38
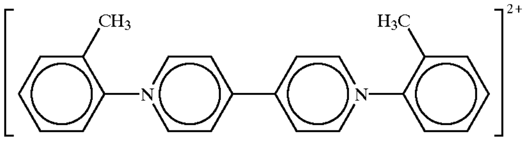
B-39
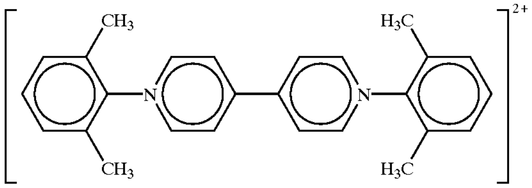
B-40
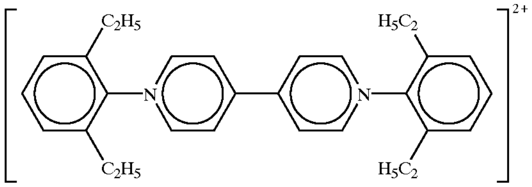
B-41
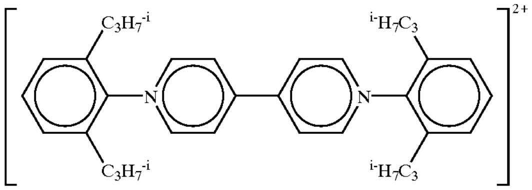
B-42
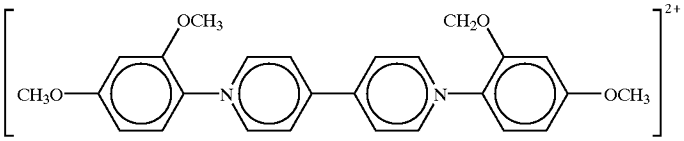

-continued
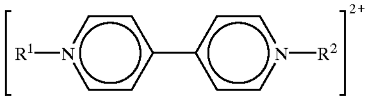
B-43
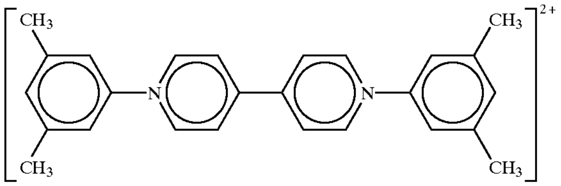
B-44
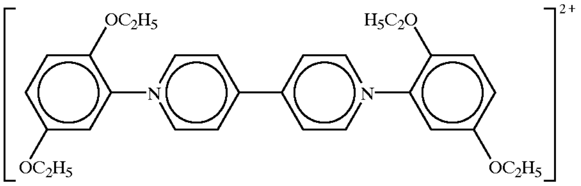
B-45
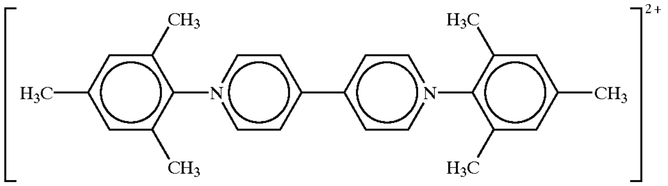
B-46
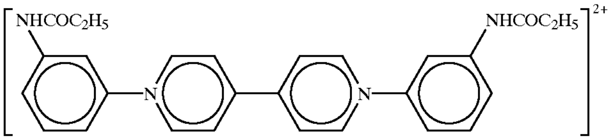
B-47
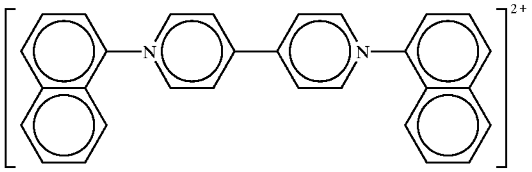
B-48
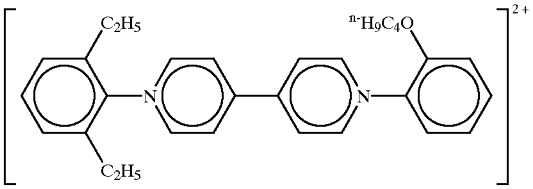
B-49
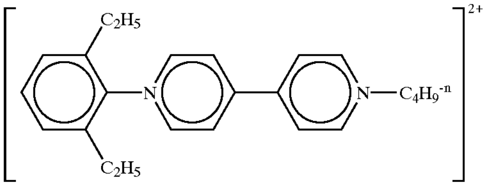

-continued
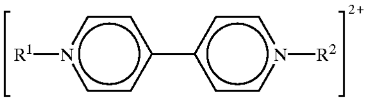
B-50
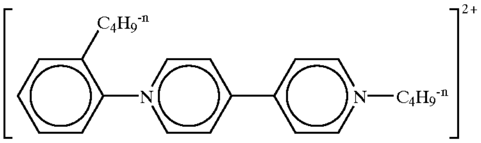
| No. | $R_1$ |
| --- | --- |
| B-51 | iso-$C_5H_{11}$ |
| B-52 | 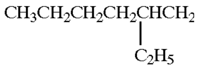 |
| B-53 | 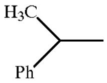 |
| B-54 | $PhCH_2CH_2$ |
| B-55 | 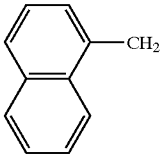 |
| B-56 | 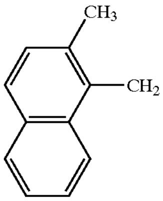 |
| B-57 | 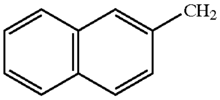 |
| B-58 | 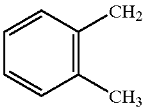 |
| B-59 | 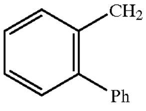 |
| B-60 | $CH_2{=}CH{-}CH_2$ |
| B-61 | 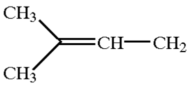 |
| B-62 | 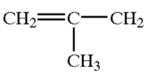 |

-continued

| | 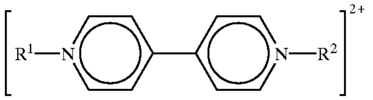 |
|---|---|
| B-63 | $Ph_3C$ |
| B-64 | 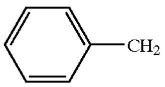 |
| B-65 | $CH{\equiv}C{-}CH_2$ |
| B-66 | $CH_3SO_2CH_2CH_2$ |
| B-67 | 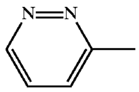 |
| B-68 | 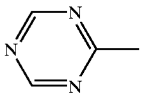 |

| No. | $R_1$ | $R_2$ |
|---|---|---|
| B-69 | 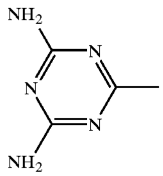 | 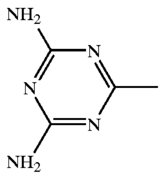 |
| B-70 | 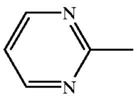 | 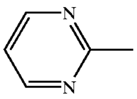 |
| B-71 | 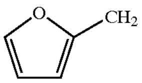 | 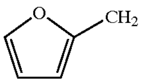 |
| B-72 | 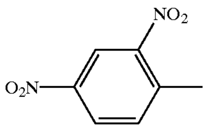 | 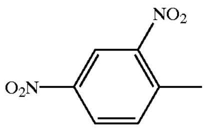 |
| B-73 | 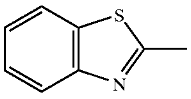 | 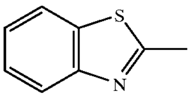 |
| B-74 | 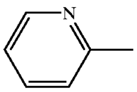 | 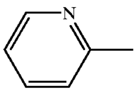 |
| B-75 | iso-$C_4H_9$ | $PhCH_2$ |

Specific preferred examples of the compound used in the invention will be shown in Tables 1 and 2 below. In Tables 1 and 2, the example of the compound comprises the anion part represented by $[DYE^+]-(SO_3^-)_{n+1}$ and the cation part represented by formula (I-3). For example, the compound No. 1 will be explained below. The example of the compound, the compound No. 1, is represented by the following formulae:

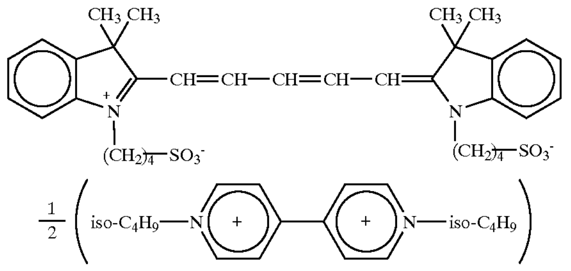

The same is applied to the compound No. 2, et seq.

TABLE 1

| Compound No. | $[DYE^+]\text{-}(SO_3^-)_{n+1}$ | Part correspon. to formula (I-3) |
|---|---|---|
| 1 | A-1 | B-5 |
| 2 | " | B-40 |
| 3 | " | B-54 |
| 4 | A-2 | B-5 |
| 5 | " | B-40 |
| 6 | " | B-54 |
| 7 | A-3 | B-5 |
| 8 | " | B-40 |
| 9 | " | B-74 |
| 10 | A-4 | B-5 |
| 11 | " | B-74 |
| 12 | " | B-54 |
| 13 | A-5 | B-5 |
| 14 | " | B-40 |
| 15 | " | B-74 |
| 16 | A-6 | B-5 |
| 17 | " | B-40 |
| 18 | " | B-54 |
| 19 | A-8 | B-5 |
| 20 | " | B-40 |
| 21 | A-10 | B-40 |
| 22 | " | B-54 |
| 23 | A-12 | B-5 |
| 24 | " | B-40 |
| 25 | " | B-74 |

TABLE 2

| Compound No. | $[DYE^+]\text{-}(SO_3^-)_{n+1}$ | Part correspon. to formula (I-3) |
|---|---|---|
| 26 | A-14 | B-40 |
| 27 | " | B-54 |
| 28 | A-16 | B-74 |
| 29 | " | B-54 |
| 30 | A-17 | B-5 |
| 31 | " | B-40 |
| 32 | A-18 | B-40 |
| 33 | " | B-54 |
| 34 | A-19 | B-40 |
| 35 | " | B-54 |
| 36 | A-24 | B-40 |
| 37 | " | B-74 |
| 38 | A-26 | B-40 |
| 39 | " | B-70 |
| 40 | A-28 | B-5 |
| 41 | " | B-54 |
| 42 | A-29 | B-40 |
| 43 | " | B-54 |
| 44 | A-30 | B-5 |
| 45 | " | B-74 |
| 46 | A-31 | B-40 |
| 47 | " | B-74 |
| 48 | A-33 | B-40 |
| 49 | " | B-54 |
| 50 | " | B-74 |

The compound represented by formula (I) used in the invention may be used singly or in combination of two or more of them.

The compound represented by formula (I) used in the invention can be easily synthesized with reference to the following known publications.

Examples of the publications include *The Cyanine Dyes and Related Compounds* 5, written by F. M. Hamer, Interscience Publishers, N.Y. (1964), pages 55, et seq.; *Polymethyne Dyes*, written by Nikolai Tyutyulkov, Jurgen Fabian, Achim Ulehlhorn, Fritz Dietz and Alia Tadjer, St. Kliment Ohridski University Press, pages 23 to 38; *Heterocyclic Compounds—Special topics in heterocyclic chemistry*, written by D. M. Sturmer, John Wiley & Sons, N.Y. and London (1977), Chapter 18, Section 14, pages 482 to 515; *Rodd's Chemistry of Carbon Compounds*, Elsvier Science Public Company Inc., N.Y., 2nd. Ed. Vol. IV, Part B (1977), Chapter 15, pages 369 to 422, 2nd. Ed. Vol. IV, Part B (1985), Chapter 15, pages 267 to 296.

More specifically, the compound can be obtained in such a manner that a salt represented by $[DYE^+]\text{-}(SO_3^-)_{n+1}(M^+)_n$ (wherein M represents a cation, such as a sodium ion, a potassium ion, an ammonium ion, a pyridinium ion, a triethylammonium ion and an N-ethylpyridinium ion) and a salt obtained by combining a cation represented by formula (I-3) and an anion, such as $Cl^-$, $Br^-$, $I^-$ and paratoluenesulfonate, are mixed in a suitable solvent, such as methanol, water and a mixture thereof, and then the compound is deposited as crystals.

For example, the compound No. 41 can be obtained in the following manner. A methanol solution of an N-ethylpyridinium salt of A-28 and a methanol solution of a bromide of B-54 are mixed to deposit crystals, which are collected by filtration. The crystals are washed with methanol and then dried to obtain the compound as brown powder having a melting point of from 213 to 217° C.

In the invention, an optical functional film formed with a dye compound represented by formula (II-1) or (II-2) solely, or a combination of a plurality of the compounds can also be preferably used.

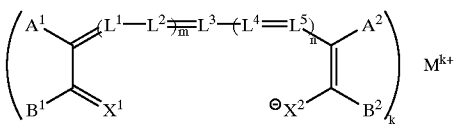

(II-1)

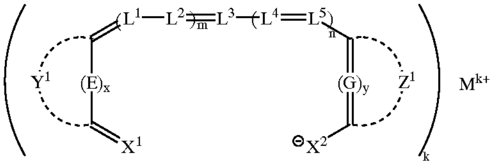

(II-2)

wherein $A^1$, $A^2$, $B^1$, and $B^2$ each independently represent a substituent; $L^1$, $L^3$, $L^4$, and $L^5$ each represent a methine group; $X^1$ represents =O, =NR, or =C(CN), in which R represents a substituent; $X^2$ represents —O, —NR, or $—C(CN)_2$, in which R represents a substituent; m and n each represent an integer of from 0 to 2; $Y^1$ and E each represent an atom or an atom group necessary for forming a carbocyclic ring or a heterocyclic ring; $Z^1$ and G each represent an atom or an atom group necessary for forming a carbocyclic ring or a heterocyclic ring; x and y each independently represent 0 or 1, $M^+$ represents an onium ion, and k represents the number of charges.

The dye compound used in the invention will be described below.

The dye compound used in the invention comprises an anion part (dye part) and a cation part (onium part).

The anion part will be described in detail below.

In the formulae, examples of the substituents represented by $A^1$, $A^2$, $B^1$ and $B^2$ include the following:

a substituted or unsubstituted linear, branched or cyclic alkyl group having from 1 to 18 carbon atoms (preferably from 1 to 8 carbon atoms) (such as methyl, ethyl, propyl, isopropyl, n-butyl, isobutyl, sec-butyl, t-butyl, cyclohexyl, methoxyethyl, ethoxycarbonylethyl, cyanoethyl, diethylaminoethyl, hydroxyethyl, chloroethyl, acetoxyethyl and trifluoromethyl);

a substituted or unsubstituted aralkyl group having from 7 to 18 carbon atoms (preferably from 7 to 12 carbon atoms) (such as benzyl and carboxybenzyl);

an alkenyl group having from 2 to 18 carbon atoms (preferably from 2 to 8 carbon atoms) (such as vinyl);

an alkynyl group having from 2 to 18 carbon atoms (preferably from 2 to 8 carbon atoms) (such as ethynyl);

a substituted or unsubstituted aryl group having from 6 to 18 carbon atoms (preferably from 6 to 10 carbon atoms) (such as phenyl, 4-methylphenyl, 4-methoxyphenyl, 4-carboxyphenyl and 3,5-dicarboxyphenyl);

a substituted or unsubstituted acyl group having from 2 to 18 carbon atoms (preferably from 2 to 8 carbon atoms) (such as acetyl, propyonyl, butanoyl and chloroacetyl);

a substituted or unsubstituted alkylsulfonyl or arylsulfonyl group having from 1 to 18 carbon atoms (preferably from 1 to 8 carbon atoms) (such as methanesulfonyl and p-toluenesulfonyl);

an alkylsulfinyl group having from 1 to 18 carbon atoms (preferably from 1 to 8 carbon atoms) (such as methanesulfonyl, ethanesulfinyl and octanesulfinyl);

an alkoxycarbonyl group having from 2 to 18 carbon atoms (preferably from 2 to 8 carbon atoms) (such as methoxycarbonyl and ethoxycarbonyl);

an aryloxycarbonyl group having from 7 to 18 carbon atoms (preferably from 7 to 12 carbon atoms) (such as phenoxycarbonyl, 4-methylphenoxycarbonyl and 4-methoxyphenylcarbonyl);

a substituted or unsubstituted alkoxy group having from 1 to 18 carbon atoms (preferably from 1 to 8 carbon atoms) (such as methoxy, ethoxy, n-butoxy and methoxyethoxy);

a substituted or unsubstituted aryloxy group having from 6 to 18 carbon atoms (preferably from 6 to 10 carbon atoms) (such as phenoxy and 4-methoxyphenoxy);

an alkylthio group having from 1 to 18 carbon atoms (preferably from 1 to 8 carbon atoms) (such as methylthio and ethylthio);

an arylthio group having from 6 to 10 carbon atoms (such as phenylthio);

a substituted or unsubstituted acyloxy group having from 2 to 18 carbon atoms (preferably from 2 to 8 carbon atoms) (such as acetoxy, ethylcarbonyloxy, cyclohexylcarbonyloxy, benzoyloxy and chloroacetyloxy);

a substituted or unsubstituted sulfonyloxy group having from 1 to 18 carbon atoms (preferably from 1 to 8 carbon atoms) (such as methanesulfonyloxy);

a substituted or unsubstituted carbamoyloxy group having from 2 to 18 carbon atoms (preferably from 2 to 8 carbon atoms) (such as methylcarbamoyloxy and diethylcarbamoyloxy);

a substituted or unsubstituted amino group having from 0 to 18 carbon atoms (preferably from 0 to 8 carbon atoms) (such as unsubstituted amino, methylamino, dimethylamino, diethylamino, anilino, methoxyphenylamino, chlorophenylamino, morphorino, piperidino, pyrrolidino, pyridylamino, methoxycarbonylamino, n-butoxycarbonylamino, phenoxycarbonylamino, methylcarbamoylamino, phenylcarbamoylamino, ethylthiocarbamoylamino, methylsulfamoylamino, phenylsulfamoylamino, acetylamino, ethylcarbonylamino, ethylthiocarbonylamino, cyclohexylcarbonylamino, benzoylamino, chloroacetylamino, methanesulfonylamino and benzenesulfonylamino);

a substituted or unsubstituted carbamoyl group having from 1 to 18 carbon atoms (preferably from 1 to 8 carbon atoms) (such as unsubstituted carbamoyl, methylcarbamoyl, ethylcarbamoyl, n-butylcarbamoyl, t-butylcarbamoyl, dimethylcarbamoyl, morphorinocarbamoyl and pyrrolidinocarbamoyl);

a substituted or unsubstituted sulfamoyl group having from 0 to 18 carbon atoms (preferably from 0 to 8 carbon atoms) (such as unsubstituted sulfamoyl, methylsulfamoyl and phenylsulfamoyl);

a halogen atom (such as fluorine, chlorine and bromine), a hydroxyl group, a nitro group; a cyano group; a carboxyl group; and a heterocyclic group (such as oxazole, benzoxazole, thiazole, benzothiazole, imidazole, benzoimidazole, indolenine, pyridine, sulfolane, furan, thiophene, pyrazole, pyrrole, chroman and coumarin).

The substituent represented by $A^1$ and $A^2$ preferably has a Hammett's substituent constant (σp) of 0.2 or more. The Hammett's substituent constant is described, for example, in *Chem. Rev.*, vol. 91, p. 165 (1991). Particularly preferred examples of the substituent include a cyano group, a nitro group, an alkoxycarbonyl group, an acyl group, a carbamoyl group, a sulfamoyl group, an alkylsulfonyl group, and an arylsulfonyl group.

The substituent represented by $B^1$ and $B^2$ is preferably an alkyl group, an aryl group, an alkoxy group, and an amino group.

Because [—C(=$L^1$)—$(E)_x$—C(=$X^1$)—] (hereinafter referred to as W1 for convenience) connected to $Y^1$ and [—C(—$L^5$)=$(G)_y$=C(—$X^{2-}$)—] (hereinafter referred to as W2 for convenience) connected to $Z^1$ are in a conjugated state, it is considered that the carbon ring or the heterocyclic ring formed with $Y^1$ and W1, and the carbon ring or the heterocyclic ring formed with $Z^1$and W2 are each one of the resonance structures.

The carbon ring or the heterocyclic ring formed with $Y^1$ and W1, and $Z^1$ and W2 is preferably a 4-membered to 7-membered ring, and particularly preferably a 5-membered ring or a 6-membered ring. These rings may form a condensed ring with other 4-membered to 7-membered rings. These rings may have a substituent. Examples of the substituent include those exemplified as the substituents represented by $A^1$, $A^2$, $B^1$ and $B^2$. Preferred examples of the heteroatom forming the heterocyclic ring include B, N, O, S, Se, and Te. It is particularly preferably N, O, and S.

x and y each independently represent 0 or 1, and preferably both of them are 0.

$X^1$ represents =O, =NR or =$C(CN)_2$. $X^2$ represents —O, —NR or —C(CN) 2 R represents a substituent.

Examples of the substituent represented by R include those exemplified as the substituents represented by $A^1$, $A^2$, $B^1$ and $B^2$. R preferably represents an aryl group, and particularly preferably phenyl.

In the invention, it is preferred that $X^1$ is =O, and $X^2$ is —O.

Examples of the carbon ring formed with $Y^1$ and W1, and $Z^1$ and W2 include the following, in which Ra and Rb each independently represent a hydrogen atom or a substituent:

A-1

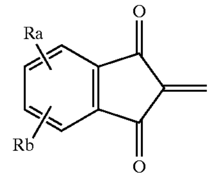

A-2

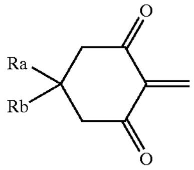

A-3

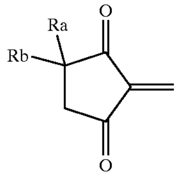

A-4

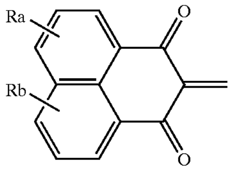

Preferred carbon rings are carbon rings represented by A-1 and A-4.

Examples of the heterocyclic ring formed with $Y^1$ and W1, and $Z^1$ and W2 include the following, in which Ra, Rb and Rc each independently represent a hydrogen atom or a substituent:

[化35]

A-5

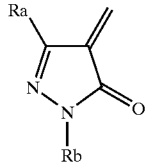

A-6

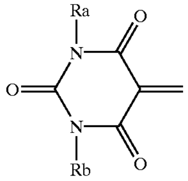

-continued

A-7

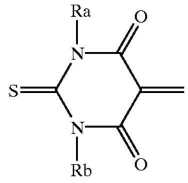

A-8

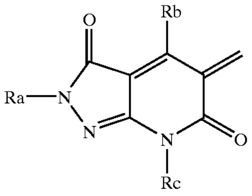

A-9

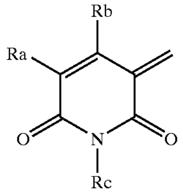

A-10

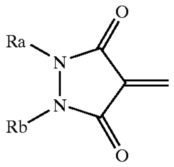

A-11

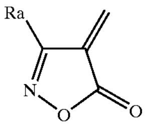

A-12

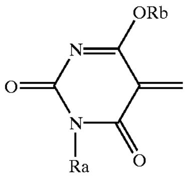

A-13

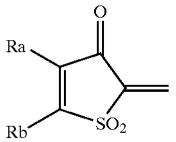

A-14

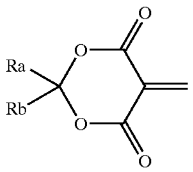

A-15

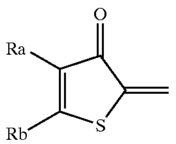

-continued
A-16
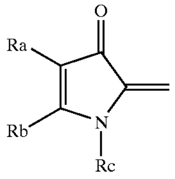
A-17
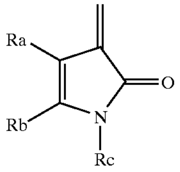
A-18
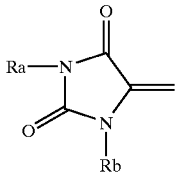
A-19
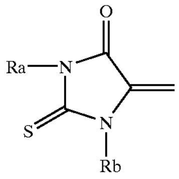
A-20
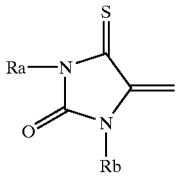
A-21
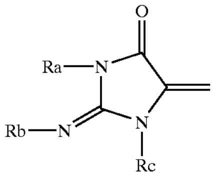
A-22
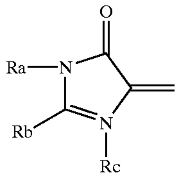
A-23
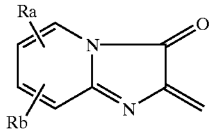
A-24
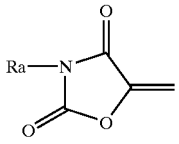
[化37]
-continued
A-25
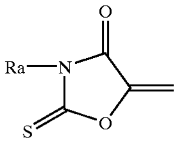
A-26
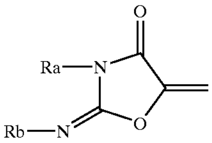
A-27
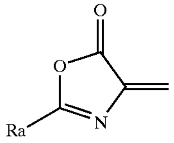
A-28
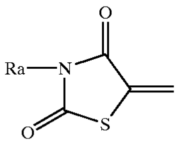
A-29
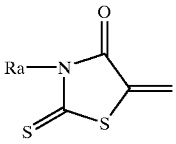
A-30
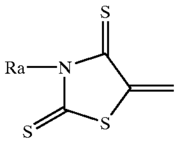
A-31
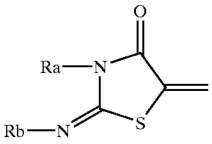
A-32
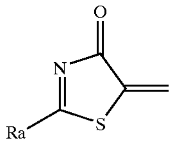
A-33
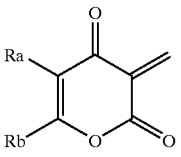
A-34
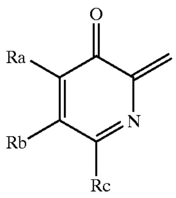

-continued

A-35

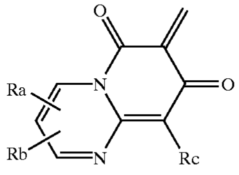

A-36

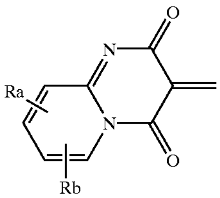

A-37

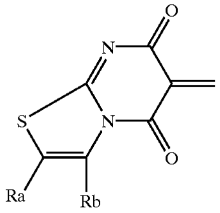

A-38

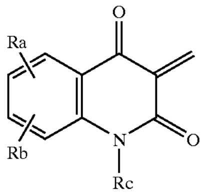

A-39

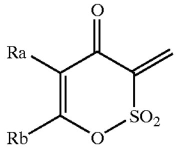

A-40

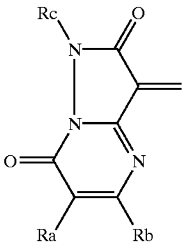

A-41

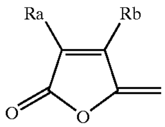

A-42

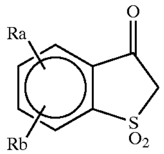

-continued

A-43

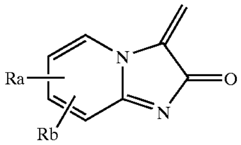

A-44

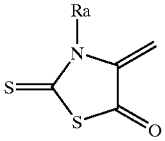

A-45

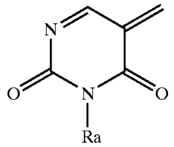

Preferred heterocyclic rings are heterocyclic rings represented by A-5, A-6 and A-7.

Examples of the substituents represented by Ra, Rb and Rc include those exemplified as the substituents represented by $A^1$, $A^2$, $B^1$ and $B^1$.

Ra, Rb and Rc may be connected to each other to form a carbon ring or a heterocyclic ring.

The methine groups represented by $L^1$, $L^2$, $L^3$, $L^4$ and $L^5$ are each independently a methine group, which may have a substituent. Examples of the substituent include, for example, those exemplified as the substituents represented by $A^1$, $A^2$, $B^1$ and $B^2$. Preferred examples of the substituent include an alkyl group, an aralkyl group, an aryl group, an alkoxy group, an aryloxy group, an alkylthio group, an arylthio group, a halogen atom, an amino group, a carbamoyl group and a heterocyclic group. A plurality of the substituents may be connected to each other to form a 5-membered to 7-membered ring (such as a cyclopentene ring, a 1-dimethylaminocyclopentene ring, a 1-diphenylaminocyclopentene ring, a cyclohexene ring, a 1-chlorocyclohexene ring, an isophorone ring, a 1-morphorinocyclopentene ring and a cycloheptene ring).

In the invention, it is preferred that both m and n are 1; m is 0 and n is 2; or m is 2 and n is 0.

The cation part will be described in detail below.

As the onium ion represented by $M^{k+}$, those represented by formulae (II-3) and (II-4) are the most preferred.

(II-3)

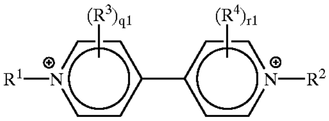

(II-4)

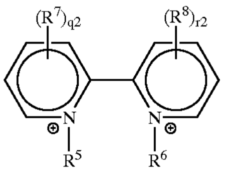

wherein $R^1$, $R^2$, $R^5$ and $R^6$ each independently represent an alkyl group, an alkenyl group, an alkynyl group or an aryl group. $R^3$ $R^4$, $R^7$ and $R^8$ each independently represent a substituent (including a group and an atom); $R^1$ and $R^2$, $R^3$ and $R^4$, $R^5$ and $R^6$, and $R^7$ and $R^8$ each may be connected to each other to form a ring, and alternatively, $R^1$ and $R^3$, $R^2$ and $R^4$, $R^5$ and $R^7$ and $R^6$ and $R^8$ each may be connected to each other to form a ring; and q1, q2, r1 and r2 each represents an integer of from 0 to 4, provided that when q1, q2, r1 and r2 each are 2 or more, a plurality of $R^3$, $R^4$, $R^7$ and $R^8$ each may be the same or different.

As the alkyl groups represented by $R^1$, $R^2$, $R^5$ and $R^6$, a substituted or unsubstituted alkyl group having from 1 to 18 carbon atoms is preferred, and more preferably a substituted or unsubstituted alkyl group having from 1 to 8 carbon atoms, such as methyl, ethyl, n-propyl, isopropyl, n-butyl, isobutyl, and n-hexyl.

Examples of the substituents for the alkyl group include the following:

a halogen atom (such as F, Cl and Br);

a substituted or unsubstituted alkoxy group having from 1 to 18 carbon atoms (preferably from 1 to 8 carbon atoms) (such as methoxy and ethoxy);

a substituted or unsubstituted aryloxy group having from 6 to 10 carbon atoms (such as phenoxy and p-methoxyphenoxy);

a substituted or unsubstituted alkylthio group having from 1 to 18 carbon atoms (preferably from 1 to 8 carbon atoms) (such as methylthio and ethylthio);

a substituted or unsubstituted arylthio group having from 6 to 10 carbon atoms (such as phenylthio);

a substituted or unsubstituted acyl group having from 2 to 18 carbon atoms (preferably from 2 to 8 carbon atoms) (such as acetyl and propyonyl);

a substituted or unsubstituted alkylsulfonyl or arylsulfonyl group having from 1 to 18 carbon atoms (preferably from 1 to 8 carbon atoms) (such as methanesulfonyl and p-toluenesulfonyl);

a substituted or unsubstituted acyloxy group having from 2 to 18 carbon atoms (preferably from 2 to 8 carbon atoms) (such as acetoxy and propionyloxy);

a substituted or unsubstituted alkoxycarbonyl group having from 2 to 18 carbon atoms (preferably from 2 to 8 carbon atoms) (such as methoxycarbonyl and ethoxycarbonyl);

a substituted or unsubstituted alkenyl group having from 2 to 18 carbon atoms (preferably from 2 to 8 carbon atoms) (such as vinyl);

a substituted or unsubstituted alkynyl group having from 2 to 18 carbon atoms (preferably from 2 to 8 carbon atoms) (such as ethynyl);

a substituted or unsubstituted aryl group having from 6 to 10 carbon atoms (such as phenyl and naphthyl);

a substituted or unsubstituted aryloxycarbonyl group having from 7 to 11 carbon atoms (such as naphthoxycarbonyl);

a substituted or unsubstituted amino group having from 0 to 18 carbon atoms (preferably from 0 to 8 carbon atoms) (such as unsubstituted amino, methylamino, dimethylamino, diethylamino, anilino, methoxyphenylamino, chlorophenylamino, morphorino, piperidino, pyrrolidino, pyridylamino, methoxycarbonylamino, n-butoxycarbonylamino, phenoxycarbonylamino, methylcarbamoylamino, ethylthiocarbamoylamino, phenylcarbamoylamino, acetylamino, ethylcarbonylamino, ethylthiocarbamoylamino, cyclohexylcarbonylamino, benzoylamino, chloroacetylamino and methylsulfonylamino);

a substituted or unsubstituted carbamoyl group having from 1 to 18 carbon atoms (preferably from 1 to 8 carbon atoms) (such as unsubstituted carbamoyl, methylcarbamoyl, ethylcarbamoyl, n-butylcarbamoyl, t-butylcarbamoyl, dimethylcarbamoyl, morphorinocarbamoyl and pyrrolidinocarbamoyl);

a substituted or unsubstituted sulfamoyl group having from 0 to 18 carbon atoms (preferably from 0 to 8 carbon atoms) (such as unsubstituted sulfamoyl, methylsulfamoyl and phenylsulfamoyl);

a halogen atom (such as fluorine, chlorine and bromine); cyano group; a nitro group; a carboxyl group; a hydroxyl group; and a heterocyclic group (such as oxazole, benzoxazole, thiazole, benzothiazole, imidazole, benzoimidazole, indolenine, pyridine, sulfolane, furan, thiophene, pyrazole, pyrrole, chroman and coumarin).

As the alkenyl groups represented by $R^1$, $R^2$, $R^5$ and $R^6$ a substituted or unsubstituted alkenyl group having from 2 to 18 carbon atoms is preferred, and a substituted or unsubstituted alkenyl group having from 2 to 8 carbon atoms is more preferred, such as vinyl, allyl, 1-propenyl and 1,3-butadienyl.

As the substituent for the alkenyl group, those exemplified as the substituents for the alkyl group are preferred.

As the alkynyl groups represented by $R^1$, $R^2$, $R^5$ and $R^6$, a substituted or unsubstituted alkynyl group having from 2 to 18 carbon atoms is preferred, and a substituted or unsubstituted alkynyl group having from 2 to 8 carbon atoms is more preferred, such as ethynyl and 2-propynyl.

As the substituent for the alkynyl group, those exemplified as the substituents for the alkyl group are preferred.

As the aryl groups represented by $R^1$, $R^2$, $R^5$ and $R^6$, a substituted or unsubstituted aryl group having from 6 to 18 carbon atoms is preferred, such as phenyl and naphthyl.

As the substituent for the aryl group, those exemplified as the substituents for the alkyl group are preferred. In addition to these, an alkyl group (such as methyl and ethyl) are also preferred as the substituent.

The substituents represented by $R^3$, $R^4$, $R^7$ and $R^8$ have the same meanings as those exemplified as the substituents represented by $A^1$, $A^2$, $B^1$ and $B^2$.

In the invention, the substituents represented by $R^3$, $R^4$, $R^7$ and $R^8$ are preferably a hydrogen atom or an alkyl group. It is particularly preferably a hydrogen atom.

In the invention, it is preferred that $R^5$ and $R^6$ are connected to each other to form a ring. The ring thus formed is preferably a 5-membered to 7-membered ring, and more preferably a 6-membered ring.

It is also preferred that $R^3$ and $R^4$, and $R^7$ and $R^8$ each are connected to each other to form a carbon ring or a heterocyclic ring. It is more preferably a carbon ring, and particularly preferably a condensed aromatic ring with the pyridine ring, to which $R^3$, $R^4$, $R^7$ and $R^1$ are connected.

The cation part and the anion part of the dye compound represented by formulae (II-1) and (II-2) used in the invention will be specifically described below.

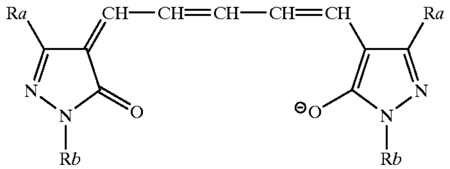
| No. | Ra | Rb |
|---|---|---|
| B-1 | COOEt | H |
| B-2 | COOEt | $CH_3$ |
| B-3 | COOEt | 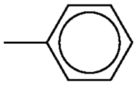 |
| B-4 | COOEt | $—CH_2CH_2OH$ |
| B-5 | $COOCH_3$ | 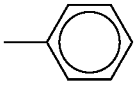 |
| B-6 | COOEt | 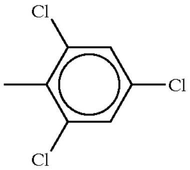 |
| B-7 | COOEt | $CONHC_4H_9(n)$ |
| B-8 | COOEt | CONHPh |
| B-9 | CN | 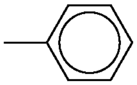 |
| B-10 | $COCH_3$ | 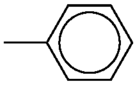 |
| B-11 | $CF_3$ | 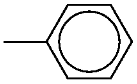 |
| B-12 | $CONHCH_3$ | $CH_3$ |
| B-13 | $CONHCH_3$ | 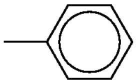 |
| B-14 | $CONHC_4H_9(n)$ | 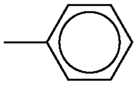 |
| B-15 | CONH— 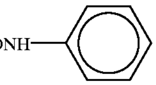 | 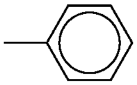 |
| B-16 | $CONHCH_3$ | 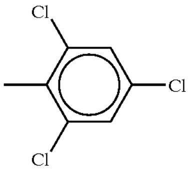 |

-continued
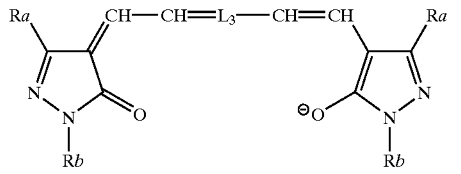
| No. | Ra | Rb | $L_3$ |
|---|---|---|---|
| B-17 | $CONHC_4H_9(n)$ | $CONHC_4H_9(n)$ | CH |
| B-18 | 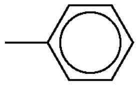 | H | " |
| B-19 | 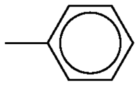 | $CH_3$ | " |
| B-20 | 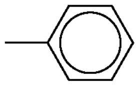 | 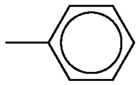 | " |
| B-21 | 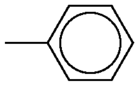 | 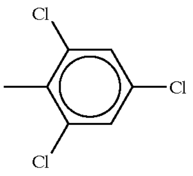 | " |
| B-22 | 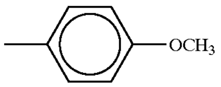 | 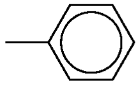 | " |
| B-23 | 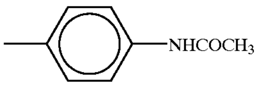 | 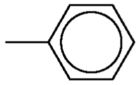 | " |
| B-24 | 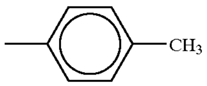 | 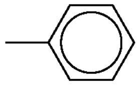 | " |
| B-25 | 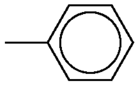 | 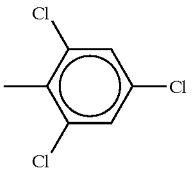 | $C(CH_3)$ |
| B-26 | 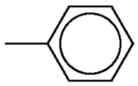 | $CONHC_4H_9(n)$ | CH |
| B-27 | 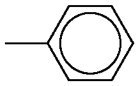 | 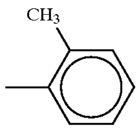 | " |
| B-28 | —COOEt | $CH_2Ph$ | " |

-continued
| | | | |
|---|---|---|---|
| B-29 | $—SO_2CH_3$ | 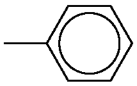 | " |
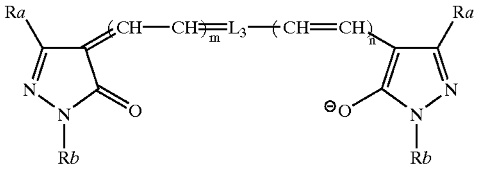
| No. | Ra | Rb | $L_3$ | m | n |
|---|---|---|---|---|---|
| B-30 | $CH_3SO_2NH—$ | 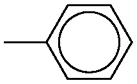 | CH | 1 | 1 |
| B-31 | HO | 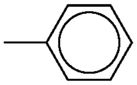 | $C(CONH_2)$ | 1 | 1 |
| B-32 | $CH_3$ | 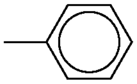 | C(Ph) | 1 | 1 |
| B-33 | $CH_3$ | 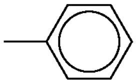 | $C(CH_2Ph)$ | 1 | 1 |
| B-34 | $CH_3$ | 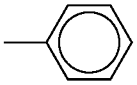 | C 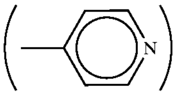 | 1 | 1 |
| B-35 | EtO— | 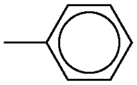 | CH | 1 | 1 |
| B-36 | $—NHCOCH_3$ | 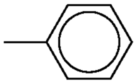 | CH | 1 | 1 |
| B-37 | —NHCOPh | 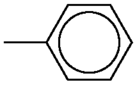 | CH | 1 | 1 |
| B-38 | —NHCOPh | $—CONHC_4H_9(n)$ | CH | 1 | 1 |
| B-39 | —NHCOPh | —CONHPh | CH | 1 | 1 |
| B-40 | —COOEt | 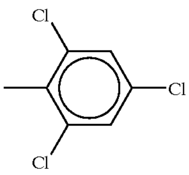 | CH | 1 | 0 |
| B-41 | —CN | 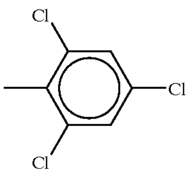 | CH | 1 | 0 |

-continued
| | | | | | |
|---|---|---|---|---|---|
| B-42 | —$CF_3$ | 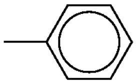 | CH | 1 | 0 |
| B-43 | —$CONHC_4H_9$(n) | 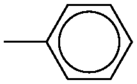 | CH | 1 | 0 |
| B-44 | —$NHCOC_4H_9$(n) | 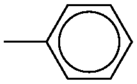 | CH | 1 | 0 |
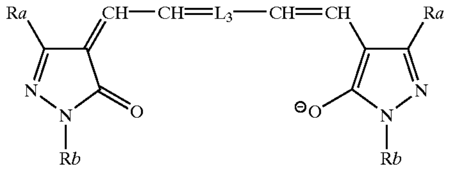
| No. | Ra | Rb | $L_3$ |
|---|---|---|---|
| B-45 | 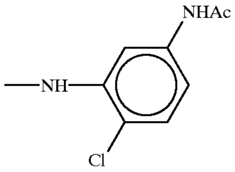 | 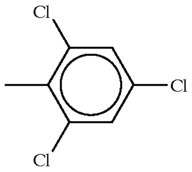 | CH |
| B-46 | —$NH_2$ | 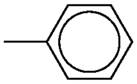 | " |
| B-47 | —$NHCONHC_4H_9$(n) | 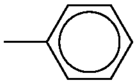 | " |
| B-48 | —$NHCOOC_4H_9$(n) | 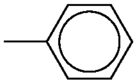 | " |
| B-49 | 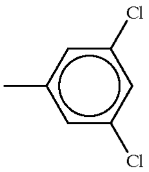 | $CH_2Ph$ | " |
| B-50 | 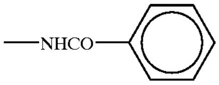 | 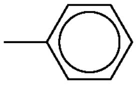 | C(Ph) |
| B-51 | 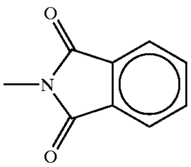 | 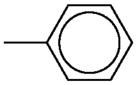 | CH |

-continued
| | | | |
|---|---|---|---|
| B-52 | 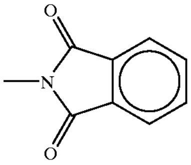 | 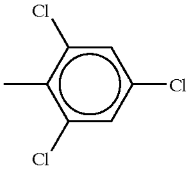 | " |
| B-53 | —CN | 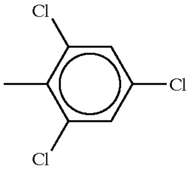 | " |
| B-54 | $—CF_3$ | 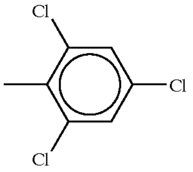 | " |
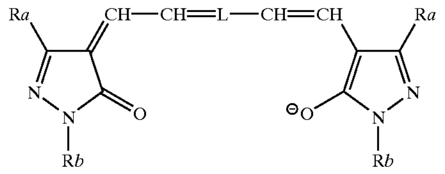
| No. | Ra | Rb | L |
|---|---|---|---|
| B-55 | —COOEt | 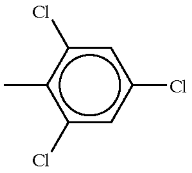 | $C(CH_3)$ |
| B-56 | —CN | 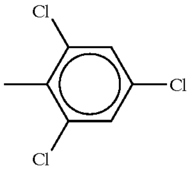 | " |
| B-57 | $—CF_3$ | 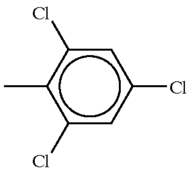 | " |
| B-58 | $—COCH_3$ | 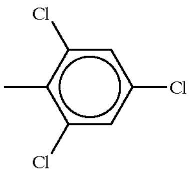 | " |

-continued
| | | | |
|---|---|---|---|
| B-59 | —COOEt | 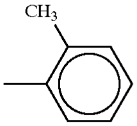 | " |
| B-60 | —CN | 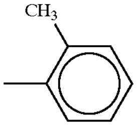 | " |
| B-61 | —COOEt | 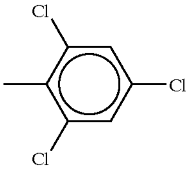 | C(Br) |
| B-62 | —COOEt | 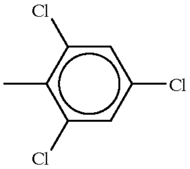 | C(Cl) |
| B-63 | —CN | 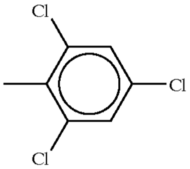 | C(Br) |
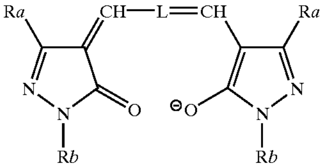
| No. | Ra | Rb | L |
|---|---|---|---|
| B-64 | —CN | 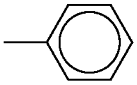 | C(Br) |
| B-65 | —COOEt | 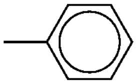 | C(Cl) |
| B-66 | —COOEt | 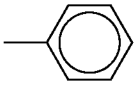 | CH |
| B-67 | —$CONHCH_3$ | 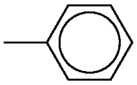 | CH |
| B-68 | —$NHCOCH_3$ | 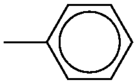 | CH |

-continued
| | | | |
|---|---|---|---|
| B-69 | —$CH_3$ | 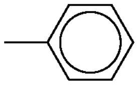 | CH |
| B-70 | —$NH_2$ | 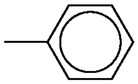 | CH |
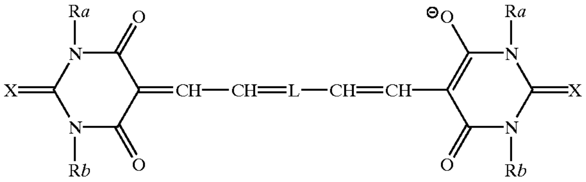
| No. | Ra | Rb | X | L |
|---|---|---|---|---|
| B-71 | H | H | O | CH |
| B-72 | H | $CH_3$ | O | " |
| B-73 | H | $nC_4H_9$ | O | " |
| B-74 | $nC_4H_9$ | $nC_4H_9$ | O | " |
| B-75 | H | Ph | O | " |
| B-76 | H | Ph | O | C(Ph) |
| B-77 | Ph | Ph | O | CH |
| B-78 | H | 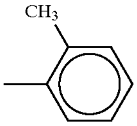 | O | " |
| B-79 | H | 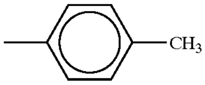 | O | " |
| B-80 | H | H | S | " |
| B-81 | H | $C_2H_5$ | S | " |
| B-82 | $C_2H_5$ | $C_2H_5$ | S | " |
| B-83 | H | $nC_4H_9$ | O | $C(CH_2Ph)$ |
| B-84 | H | Ph | O | $C(CH_3)$ |
| B-85 | H | Ph | S | CH |
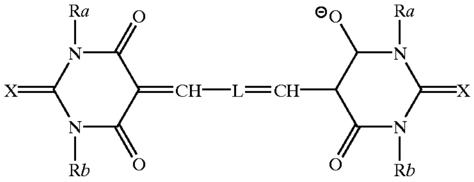
| No. | Ra | Rb | X | L |
|---|---|---|---|---|
| B-86 | H | $nC_4H_9$ | O | CH |
| B-87 | H | Ph | O | " |
| B-88 | $CH_3$ | $CH_3$ | O | " |
| B-89 | Ph | Ph | O | " |
| B-90 | H | Ph | O | $C(CH_3)$ |
| B-91 | H | 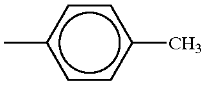 | O | $C(CH_2Ph)$ |
| B-92 | H | $nC_4H_9$ | S | CH |
| B-93 | H | Ph | S | " |
| B-94 | Ph | Ph | S | " |
| B-95 | Et | Et | S | " |
| B-96 | H | Ph | S | $C(CH_3)$ |

-continued
B-97
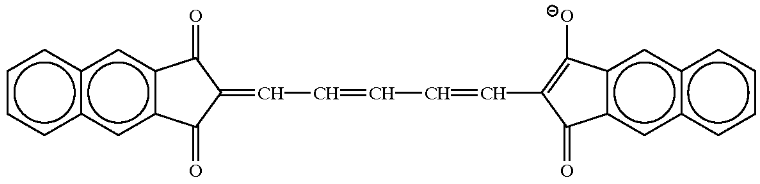
B-98
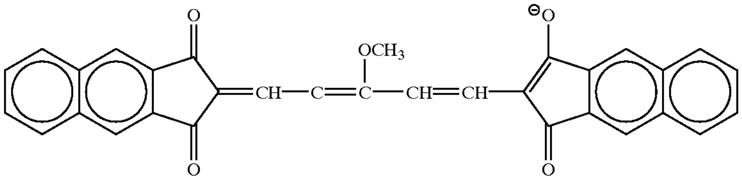
B-99
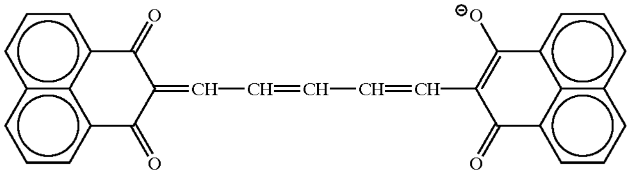
B-100
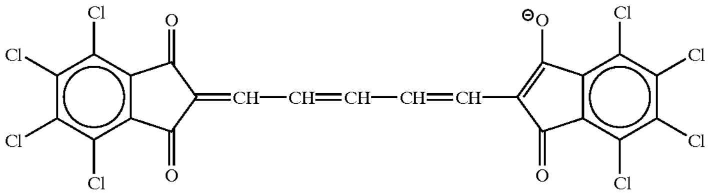
B-101
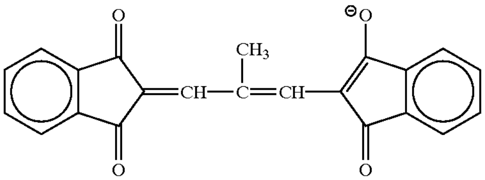
B-102
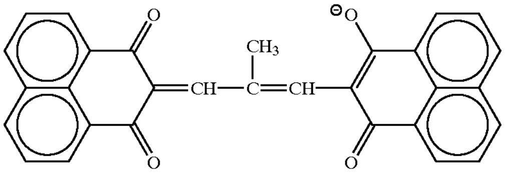
B-103
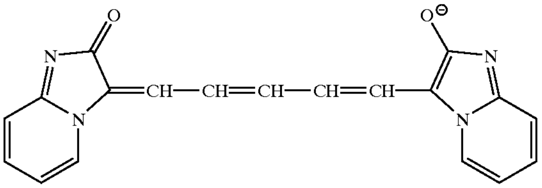
B-104
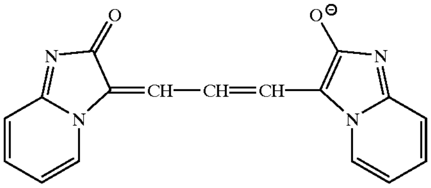

-continued
B-105
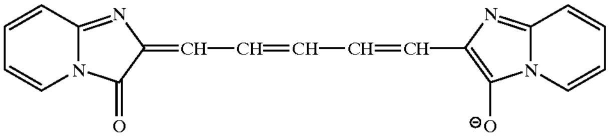
B-106
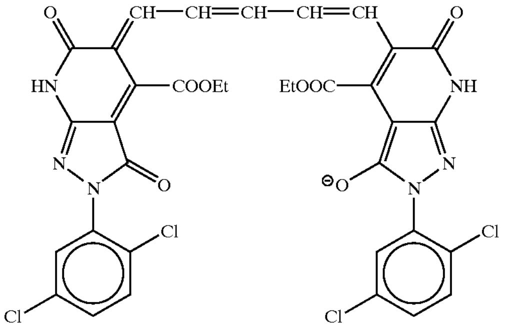
B-107
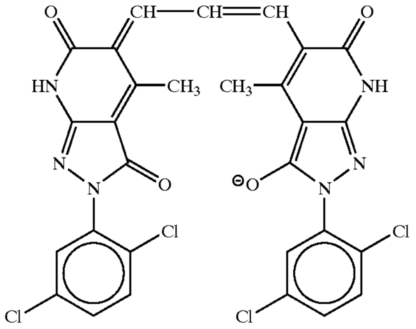
B-108
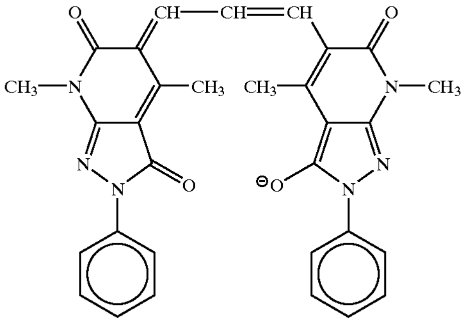
B-109
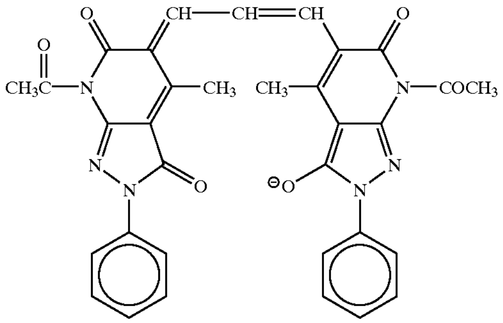

-continued
B-110
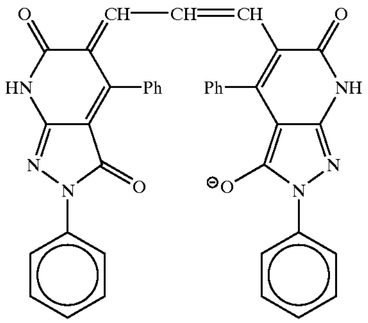
B-111
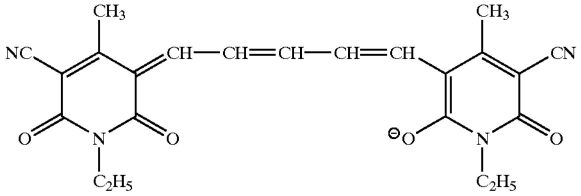
B-112
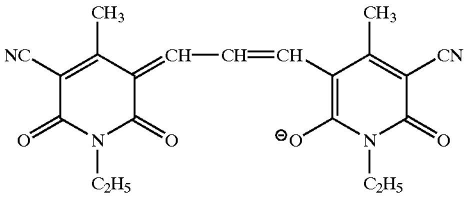
B-113
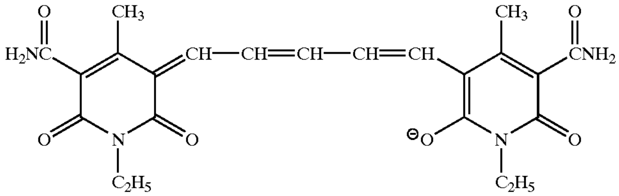
B-114
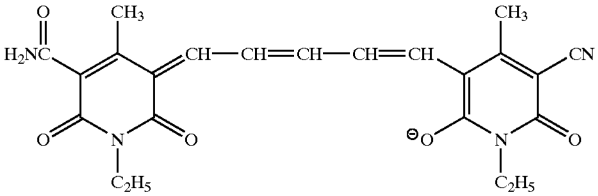
B-115
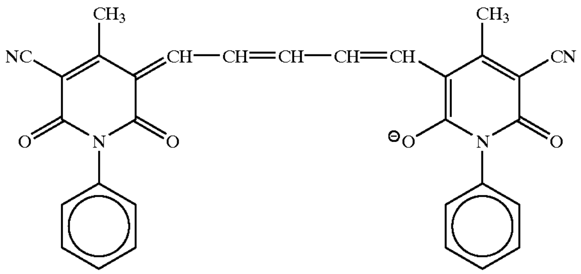

-continued
B-116
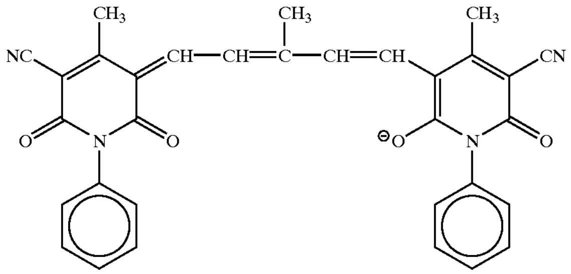
B-117
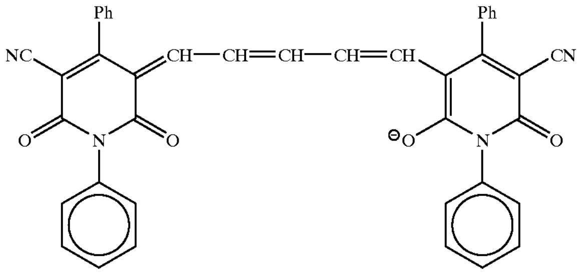
B-118
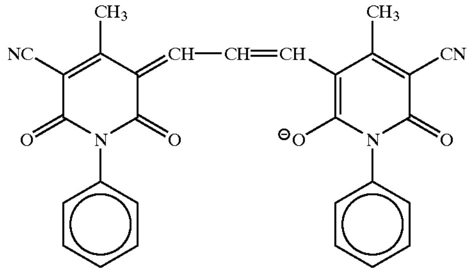
B-119
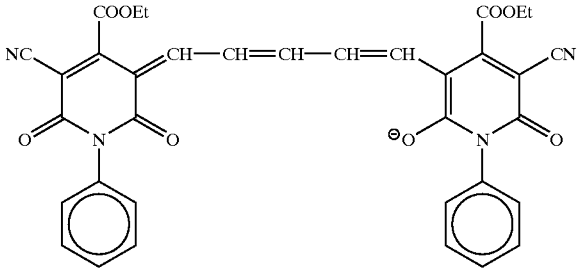
B-120
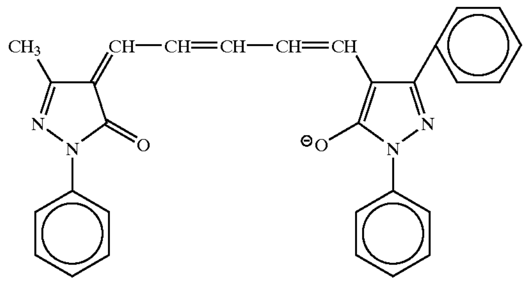
B-121
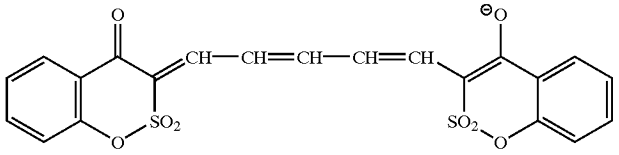

-continued
B-122
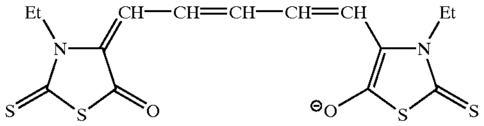
B-123
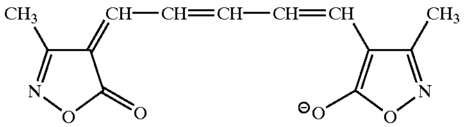
B-124
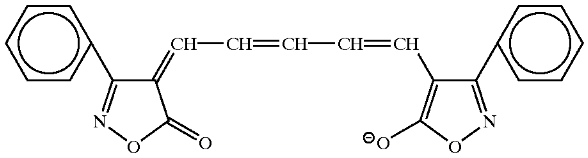
B-125
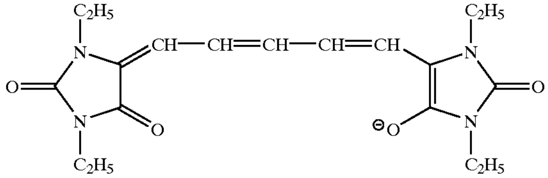
B-126
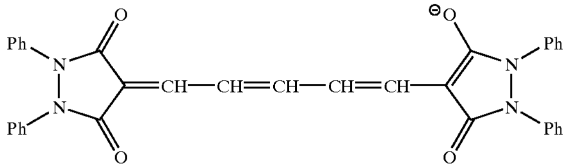
B-127
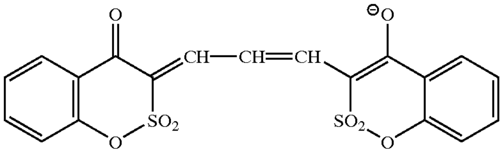
B-128
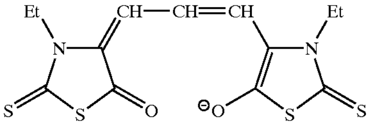
B-129
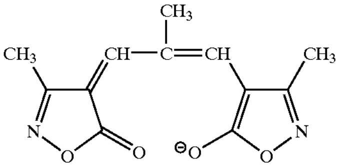
B-130
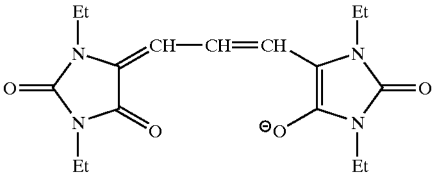

-continued
B-131
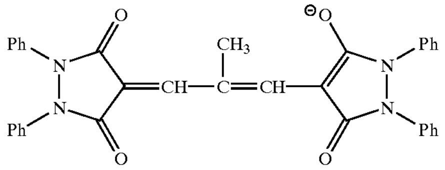
B-132
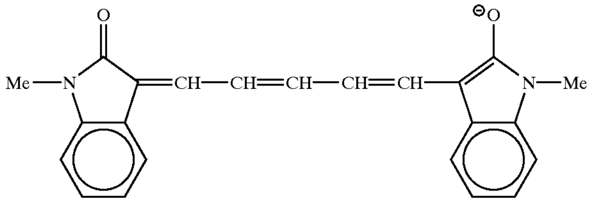
B-133
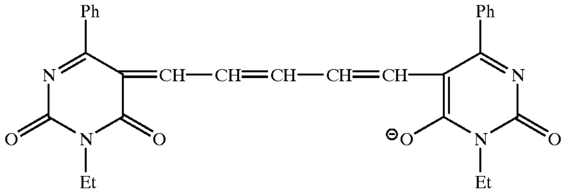
B-134
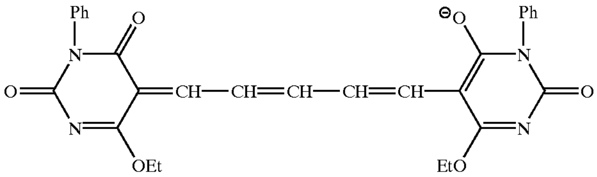
B-135
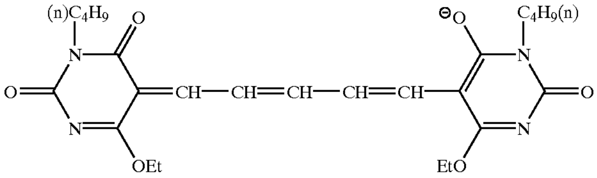
B-136
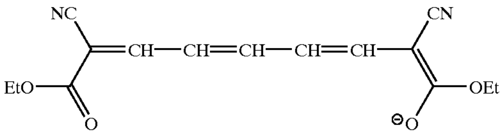
B-137
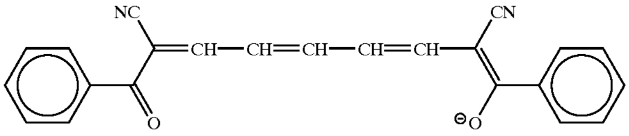
B-138
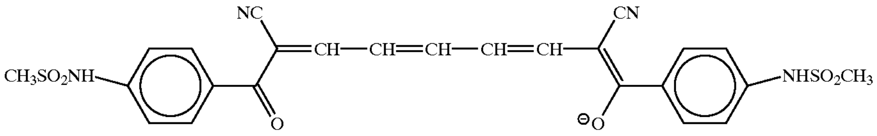
B-139
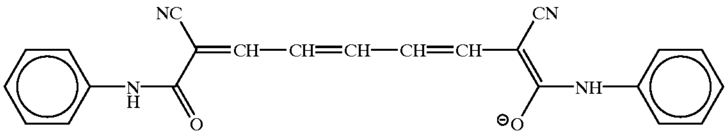

-continued
B-140
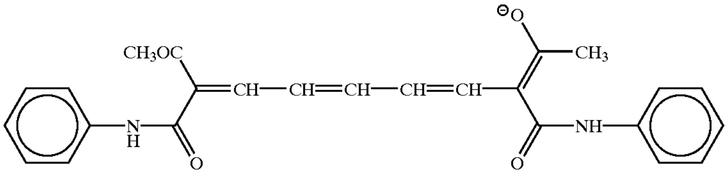
B-141
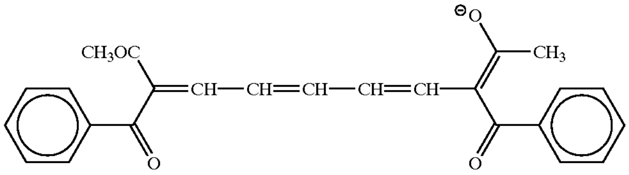
B-142
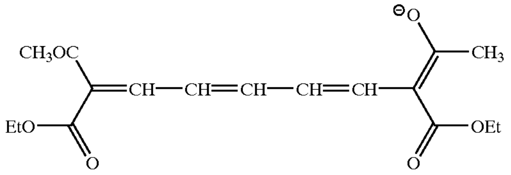
B-143
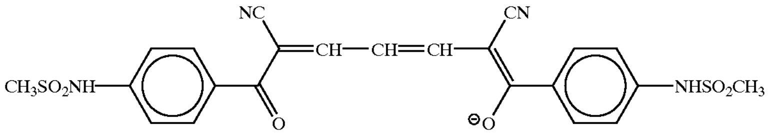
B-144
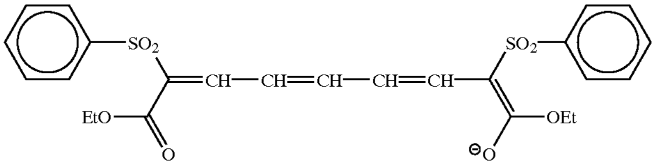
B-145
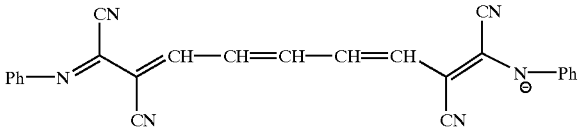
B-146
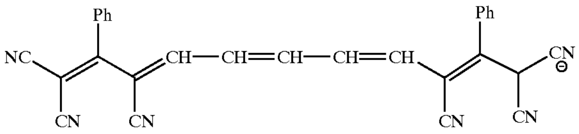
B-147
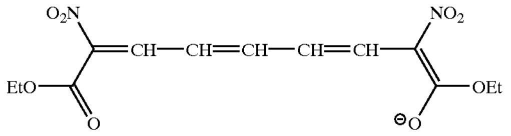
B-148
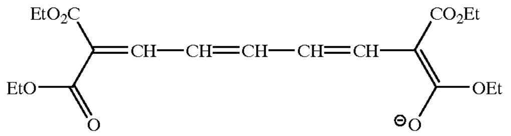

-continued
B-149
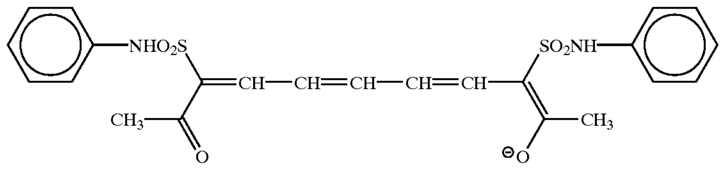
B-150
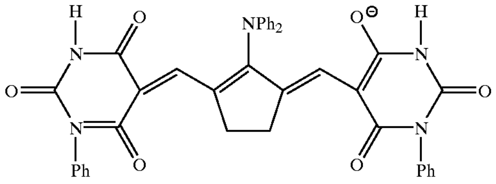
B-151
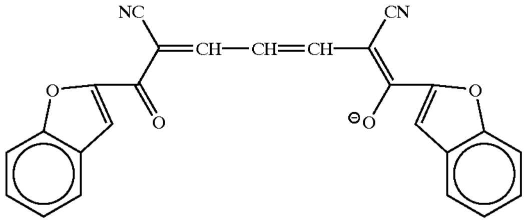
B-152
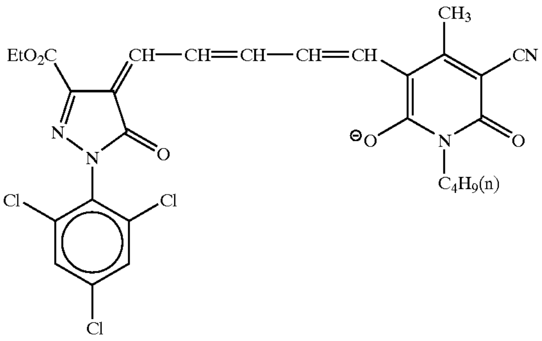
B-153
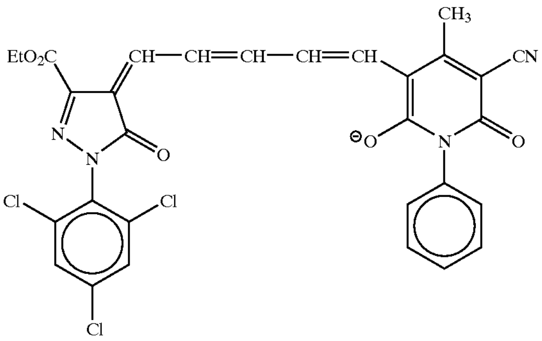
B-154
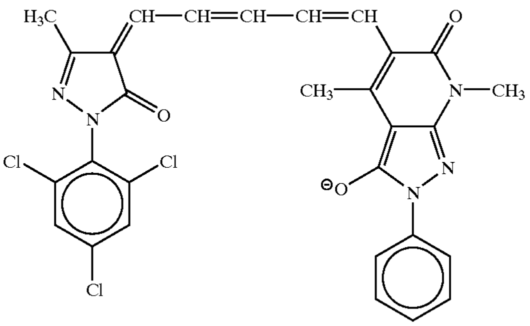

-continued
B-155
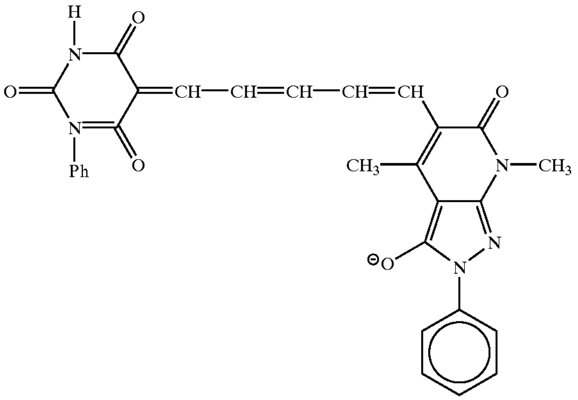
B-156
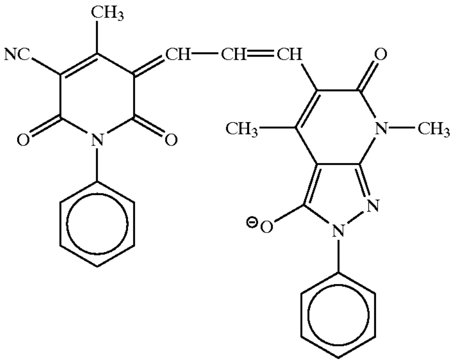
B-157
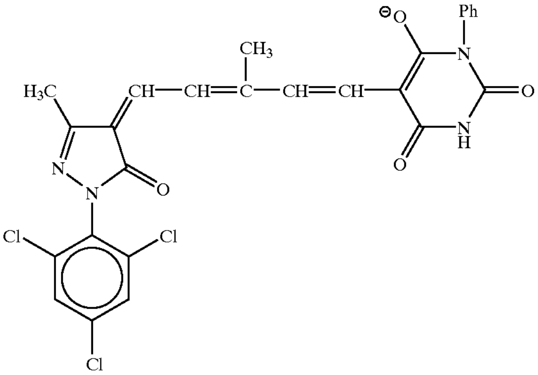
B-158
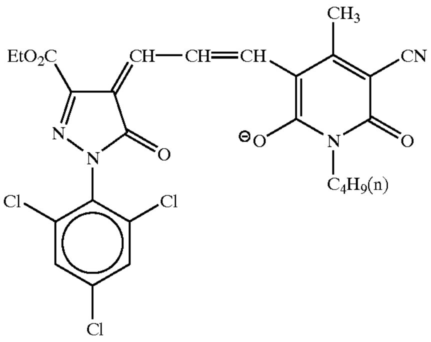

-continued
B-159
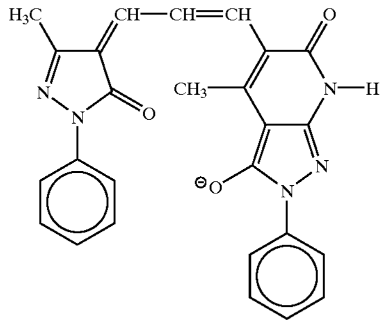
B-160
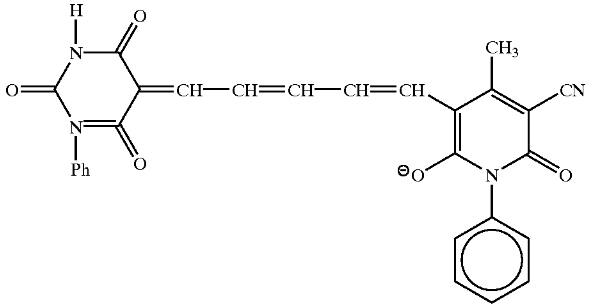
B-161
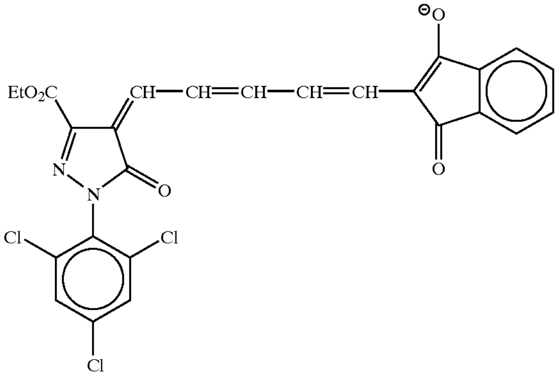
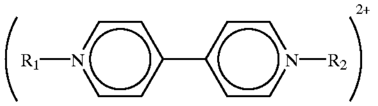
| No. | $R_1$ | $R_2$ |
|---|---|---|
| C-17 | $CH_3$ | $CH_3$ |
| C-18 | $C_2H_5$ | $C_2H_5$ |
| C-19 | $nC_3H_7$ | $nC_3H_7$ |
| C-20 | $nC_4H_9$ | $nC_4H_9$ |
| C-21 | iso$C_4H_9$ | iso$C_4H_9$ |
| C-22 | $nC_6H_{13}$ | $nC_6H_{13}$ |
| C-23 | $PhCH_2$ | $PhCH_2$ |
| C-24 | $CH_3$—CH═CH—$CH_2$ | $CH_3$—CH═CH—$CH_2$ |
| C-25 | $CH_2$═CH | $CH_2$═CH |
| C-26 | $NCCH_2$ | $NCCH_2$ |
| C-27 | $EtO_2C$—$CH_2$— | $EtO_2CCH_2$— |
| C-28 | $HOCH_2CH_2$ | $HOCH_2CH_2$ |
| C-29 | $EtOCH_2CH_2$ | $EtOCH_2CH_2$ |
| C-30 | $CH_3$ | $nC_4H_9$ |
| C-31 | $CH_3$ | $PhCH_2$ |
| C-32 | $CH_3COCH_2$ | $CH_3COCH_2$ |
| C-33 | 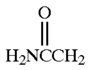 | 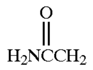 |

-continued
| | | |
|---|---|---|
| C-34 | $CF_3CH_2$ | $CF_3CH_2$ |
| C-35 | Ph | Ph |
| C-36 | 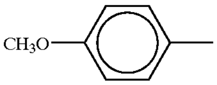 | 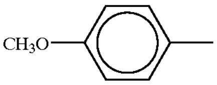 |
| C-37 | 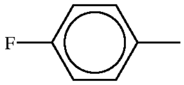 | 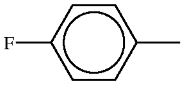 |
| C-38 | 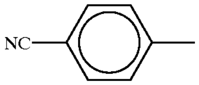 | 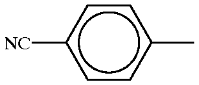 |
| C-39 | 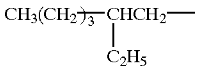 | 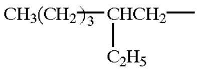 |
| C-40 | 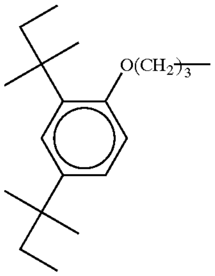 | 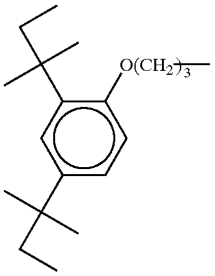 |
C-50
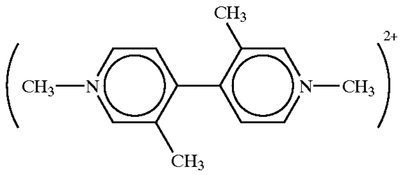
C-51
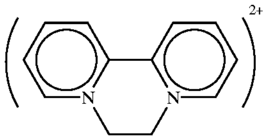
C-52
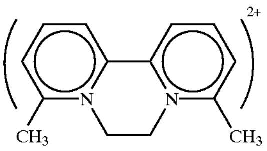
C-53
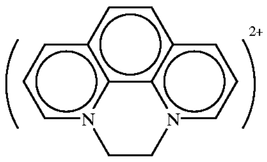

-continued
C-54
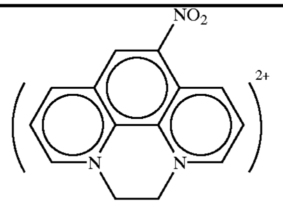
C-55
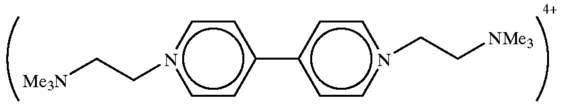
C-61
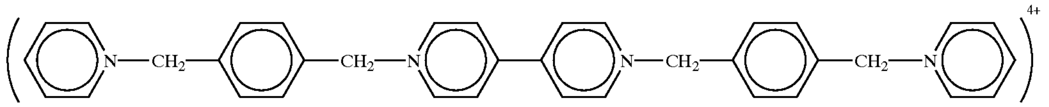
C-70
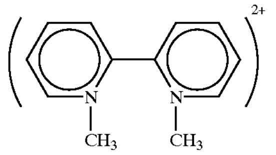
C-71
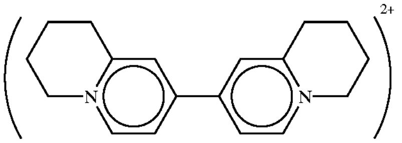
Preferred specific examples of the compound used in the invention will be described in Table 3 below.
In Table 3, the example of the compound comprises the anion part and the cation part. For example, the compound No. 3 is represented by the following formulae:
Compound No. 3
B-3
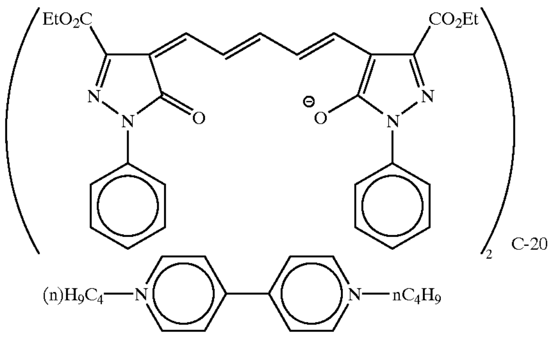
C-20
TABLE 3
| Compound No. | Anion part | Cation part |
|---|---|---|
| 3 | B-3 | C-20 |
| 4 | B-3 | C-21 |
| 5 | B-3 | C-22 |
| 6 | B-3 | C-39 |
| 7 | B-3 | C-40 |
| 9 | B-3 | C-53 |
| 12 | B-6 | C-39 |
| 13 | B-6 | C-40 |

TABLE 3-continued

| Compound No. | Anion part | Cation part |
|---|---|---|
| 16 | B-74 | C-39 |
| 17 | B-74 | C-40 |
| 20 | B-111 | C-39 |
| 21 | B-111 | C-40 |
| 23 | B-111 | C-53 |
| 24 | B-98 | C-39 |
| 25 | B-98 | C-40 |
| 26 | | |

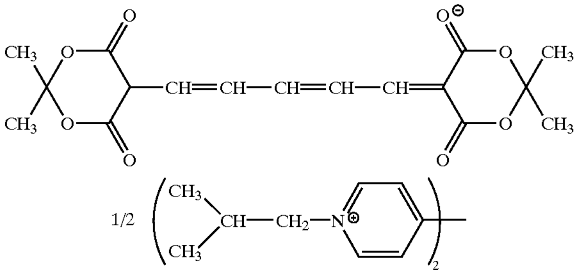

The compounds represented by formulae (II-1) and (II-2) can be easily synthesized by a salt exchange reaction of a salt compound, such as an alkali metal salt (e.g., a Li salt, a Na salt and a K salt), an ammonium salt (e.g., a $NH^{4+}$ salt) and a triethylammonium salt ($Et_3NH^+$ salt), of the dye compounds represented by formulae (II-9) and (II-10), and an onium salt represented by formula (II-11) in water or an organic solvent (such as methanol, ethanol, isopropanol and dimethylformamide)

(II-9)

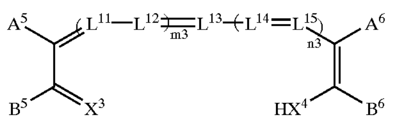

(II-10)

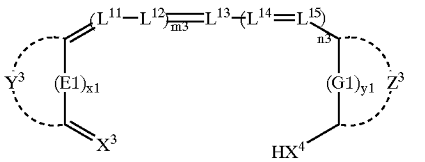

wherein $A^5$ and $A^6$, $B^5$ and $B^6$, $Y^3$ and $Z^3$, $L^{11}$, $L^{12}$, $L^{13}$, $L^{14}$ and $L^{15}$, $X^3$ and $X^4$, $E^1$ and $G^1$, $m^3$ and $n^3$, and $x^1$ and $Y^1$ each have the same meanings as $A^1$ and $A^2$, $B^1$ and $B^2$, $Y^1$ and $Z^1$, $L^1$, $L^2$, $L^3$, $L^4$ and $L^5$, $X^1$ and $X^2$, E and G, m and n, and x and y in formulae (II-1) and (II-2).

$$M^{k+}\cdot\frac{k}{r}X^{r-} \qquad \text{(II-11)}$$

wherein $X^{r-}$ represents an anion; and r represents an integer (preferably an integer of from 1 to 4, and more preferably from 1 to 2).

Examples of the anion include a halide ion (such as $Cl^-$, $Br^-$ and $I^-$), a sulfonate ion (such as $CH_3SO_3^-$, a p-toluenesulfonate ion and a naphthalene-1,5-disulfonate ion), $ClO_4^-$, $BF_4^-$ and $PF_6^-$.

The dye compounds represented by formulae (II-9) and (II-10) can be generally synthesized by a condensation reaction of a corresponding active methylene compound (such as pyrazolone, thiobarbituric acid, barbituric acid, indandione and hydroxyphenalenone) and a methine source for introducing a methine group or a polymethine group into a methine dye. The details of the compounds of this kind are described in the specifications of Japanese Patent Publication No. 39(1964)-22069, No. 43(1968)-3504, No. 52(1977)-38056, No. 54(1979)-38129, No. 55(1980)-10059 and No. 58(1983)-35544, Japanese Unexamined Patent Publication No. 49(1974)-99620, No. 52(1977)-92716, No. 59(1984)-16834, No. 63(1988)-316853 and No. 64(1989)-40827, British Patent No. 1,133,986, and U.S. Pat. No. 3,247,127, U.S. Pat. No. 4,042,397, U.S. Pat. No. 4,181,225, U.S. Pat. No. 5,213,956 and U.S. Pat. No. 5,260,179.

Specifically, an orthoester, such as ethyl orthoformate and ethyl orthoacetate, or N,N-diphenylformamidine hydrochloride is used for introducing a monomethine group; trimethoxypropene, 1,1,3,3-tetramethoxypropane or malonaldehyde dianylhydrochlorate (or a derivative thereof) is used for introducing a trimethine group; and glutaconaldehyde dianylhydrochlorate or 1-(2,4-dinitrophenyl) pyridinium chloride (or a derivative thereof) is used for introducing a pentamethine group.

Examples of synthesis of the dye compound represented by formula (II-1) or (II-2) will be described below.

Synthesis Example 1

Synthesis of Compound No. 5

1 g of the following compound a was added to 20 mL of a 0.1 N sodium hydroxide aqueous solution at room temperature, and then stirred. To the resulting solution, a solution obtained dissolving 0.5 g of the following compound b in 5 mL of water was added. After stirring at the same temperature for 30 minutes, crystals thus deposited were filtrated and washed with water and ethanol, followed by drying, to obtain 0.23 g of the objective substance.$\lambda$max=654 nm in methanol Compound a

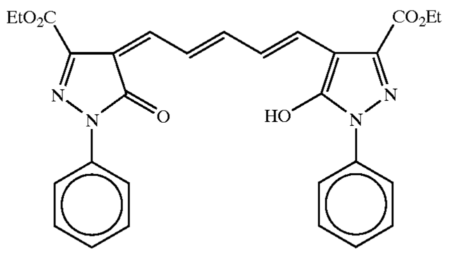

Compound b

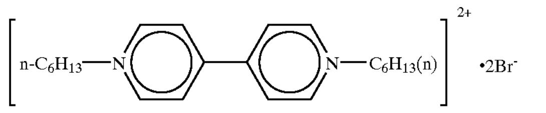

The compounds represented by formula (II-1) and the compounds represented by formula (II-2) may each be used singly or in combination of two or more of them. The compound represented by formula (II-1) and the compound represented by formula (II-2) may also be combined and used.

In the invention, as the optical functional film, those comprising an organic dye represented by formula (III) can be preferably used.

$X^1$ and $X^2$ each represent $=NR^1$ or $=CR^2R^3$. Examples of the substituents represented by $R^1$, $R^2$ and $R^3$ include a halogen atom or a substituent formed by combining a carbon atom, an oxygen atom, a nitrogen atom and a sulfur atom, and specifically, an alkyl group, an alkenyl group, an aralkyl group, an aryl group, a heterocyclic group, a halogen atom, a cyano group, a nitro group, a mercapto group, a hydroxyl group, an alkoxy group, an aryloxy group, an alkylthio group, an arylthio group, an acyloxy group, an amino group, an alkylamino group, an amido group, a sulfoneamido group, a sulfamoylamino group, an alkoxycarbonylamino group, an alkoxysulfonylamino group, an ureido group, a thioureido group, an acyl group, an alkoxycarbonyl group, a carbamoyl group, an alkylsulfonyl group, an alkylsulfinyl group, a sulfamoyl group, a carboxyl group (including a salt), and a sulfo group (including a salt). These may be substituted with substituents.

Examples of the substituents represented by $R^1$, $R^2$ and $R^3$ will be described in more detail below.

The alkyl group includes a linear, branched or cyclic alkyl group having from 1 to 18 carbon atoms (preferably from 1 to 6 carbon atoms), and examples thereof include methyl, ethyl, propyl, isopropyl, t-butyl, cyclopentyl, cyclohexyl, 2-hydroxyethyl, 3-hydroxypropyl, 4-hydroxybutyl, 3-methoxypropyl, 2-aminoethyl, acetoamidomethyl, 2-acetoamidoethyl, carboxymethyl, 2-carboxyethyl, 2-sulfoethyl, ureidomethyl, 2-ureidoethyl, carbamoylmethyl, 2-carbamoylethyl, 3-carbamoylpropyl, pentyl, hexyl, octyl, decyl, undecyl, dodecyl, hexadecyl and octadecyl.

(III)

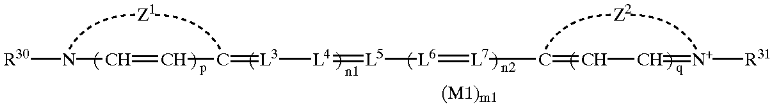

wherein $Z^1$ and $Z^2$ each represent an atom group necessary for forming a 5-membered or 6-membered nitrogen-containing heterocyclic ring; $R^{30}$ and $R^{31}$ each independently represent an alkyl group; $L^3$, $L^4$, $L^5$, $L^6$, and $L^7$ each represent a methine group; n1 and n2 each represent an integer of from 0 to 2; p and q each independently represent an integer of from 0 to 2; and M1 represents a charge balancing counter ion.

In the invention, the optical functional film comprising a combination of the organic dye represented by formula (III) and an organic oxidizing agent represented by formula (IV) is more preferred.

(IV)

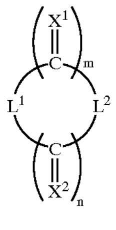

wherein m and n each independently represent an integer of from 0 to 2; $X^1$ and $X^2$ each represent $=NR^1$ or $=CR^2R^3$, in which $R^1$, $R^2$, and $R^3$ each represent substituents; and $L^1$ and $L^2$ each independently represent a divalent linking group.

The organic oxidizing agent and the organic dye used in the invention will be described below.

The organic oxidizing agent will first be described. In formula (IV), it is preferred that both m and n are 1.

The alkenyl group include a linear, branched and cyclic alkenyl group having from 2 to 18 carbon atoms (preferably from 2 to 6 carbon atoms), and examples thereof include vinyl, allyl, 1-propenyl, 2-pentenyl, 1,3-butanedienyl, 2-octenyl and 3-dodecenyl.

The aralkyl group includes an aralkyl group having from 7 to-10 carbon atoms, and examples thereof include benzyl.

The aryl group includes an aryl group having from 6 to 10 carbon atoms, which may have a substituent, and examples thereof include phenyl, naphthyl, p-dibutylaminophenyl and p-methoxyphenyl.

The heterocyclic group includes a 5-membered or 6-membered saturated or unsaturated heterocyclic group comprising a carbon atom, a nitrogen atom, an oxygen atom and a sulfur atom, in which the number and the species of the hetero atoms constituting the ring may be single or plural, and examples thereof include furil, benzofuril, pyranyl, pyrrolyl, imidazolyl, isoxazolyl, pyrazolyl, benzotriazolyl, pyridyl, pyrimidyl, pyridazinyl, thienyl, indolyl, quinolyl, phthalazinyl, quinoxalyl, pyrrolidinyl, pyrrolinyl, imidazolidinyl, imidazolinyl, pyrazolidinyl, piperidyl, piperazinyl, indolyl and morpholinyl.

Examples of the halogen atom include a fluorine atom, a chlorine atom and a bromine atom.

The alkoxy group includes an alkoxy group having from 1 to 18 carbon atoms (preferably from 1 to 6 carbon atoms), which may have a substituent, and the examples thereof includemethoxy, ethoxy, propoxy, isopropoxy, butoxy, 2-methoxyethoxy, 2-methanesulfonylethoxy, pentyloxy, hexyloxy, octyloxy, undecyloxy, dodecyloxy, hexadecyloxy and octadecyloxy.

The aryloxy group includes an aryloxy group having from 6 to 10 carbon atoms, which may have a substituent, and examples thereof include phenoxy and p-methoxyphenoxy.

The alkylthio group includes an alkylthio group having from 1 to 18 carbon atoms (preferably from 1 to 6 carbon atoms), and examples thereof include methylthio, ethylthio, octylthio, undecylthio, dodecylthio, hexadecylthio and octadecylthio.

The arylthio group includes an arylthio group having from 6 to 10 carbon atoms, which may have a substituent, and examples thereof include phenylthio and 4-methoxyphenylthio.

The acyloxy group includes an acyloxy group having from 1 to 18 carbon atoms (preferably from 1 to 6 carbon atoms), and examples thereof include acetoxy, propanoyloxy, pentanoyloxy, octanoyloxy, dodecanoyloxy and octadecanoyloxy.

The alkylamino group includes an alkylamino group having from 1 to 18 carbon atoms (preferably from 1 to 6 carbon atoms), and examples thereof include methylamino, dimethylamino, diethylamino, dibutylamino, octylamino, dioctylamino and undecylamino.

The amido group includes an amido group having from 1 to 18 carbon atoms (preferably from 1 to 6 carbon atoms), and examples thereof include acetoamido, acetylmethylamino, acetyloctylamino, acetyldecylamino, acetylundecylamino, acetyloctadecylamino, propanoylamino, pentanoylamino, octanoylamino, octanoylmethylamino, dodecanoylamino, dodecanoylmethylamino and octadecanoylamino.

The sulfoneamido group includes a sulfoneamido group having from 1 to 18 carbon atoms (preferably from 1 to 6 carbon atoms), which may have a substituent, and examples thereof include methanesulfoneamido, ethanesulfoneamido, propylsulfoneamido, 2-methoxyethylsulfoneamido, 3-aminopropylsulfoneamido, 2-acetoamidoethylsulfoneamido, octylsulfoneamido and undecylsulfoneamido.

The alkoxycarbonylamino group includes an alkoxycarbonylamino group having from 2 to 18 carbon atoms (preferably from 2 to 6 carbon atoms), and examples thereof include methoxycarbonylamino, ethoxycarbonylamino, octyloxycarbonylamino and undecyloxycarbonylamino.

The alkoxysulfonylamino group includes an alkoxysulfonylamino group having from 1 to 18 carbon atoms (preferably from 1 to 6 carbon atoms), and examples thereof include methoxysulfonylamino, ethoxysulfonylamino, octyloxysufonylamino and undecyloxysulfonylamino.

The sulfamoylamino group includes a sulfamoylamino group having from 0 to 18 carbon atoms (preferably from 0 to 6 carbon atoms), and examples thereof include methylsulfamoylamino, dimethylsulfamoylamino, ethylsulfamoylamino, propylsulfamoylamino, octylsulfamoylamino and undecylsulfamoylamino.

The ureido group includes an ureido group having from 1 to 18 carbon atoms (preferably from 1 to 6 carbon atoms), which may have a substituent, and examples thereof include ureido, methylureido, N,N-dimethylureido, octylureido and undecylureido.

The thioureido group includes a thioureido group having from 1 to 18 carbon atoms (preferably from 1 to 6 carbon atoms), which may have a substituent, and examples thereof include thioureido, methylthioureido, N,N-dimethylthioureido, octylthioureido and undecylthioureido.

The acyl group includes an acyl group having from 1 to 18 carbon atoms (preferably from 1 to 6 carbon atoms), and examples thereof include acetyl, benzoyl, octanoyl, decanoyl, undecanoyl and octadecanoyl.

The alkoxycarbonyl group includes an alkoxycarbonyl group having from 2 to 18 carbon atoms (preferably from 2 to 6 carbon atoms), and examples thereof include methoxycarbonyl, ethoxycarbonyl, octyloxycarbonyl and undecyloxycarbonyl.

The carbamoyl group includes a carbamoyl group having from 1 to 18 carbon atoms (preferably from 1 to 6 carbon atoms), which may have a substituent, and examples thereof include carbamoyl, N,N-dimethylcarbamoyl, N-ethylcarbamoyl, N-octylcarbamoyl, N,N-dioctylcarbamoyl and N-undecylcarbamoyl.

The alkylsulfonyl group includes an alkylsulfonyl group having from 1 to 18 carbon atoms (preferably from 1 to 6 carbon atoms), which may have a substituent, and examples thereof include methanesulfonyl, ethanesulfonyl, 2-chloroethanesulfonyl, octanesulfonyl and undecanesulfonyl.

The alkylsulfinyl group includes an alkylsulfinyl group having from 1 to 18 carbon atoms (preferably from 1 to 6 carbon atoms), and examples thereof include methanesuflinyl, ethanesulfinyl and octanesulfinyl.

The sulfamoyl group includes a sulfamoyl group having from 0 to 18 carbon atoms (preferably from 0 to 6 carbon atoms), which may have a substituent, and examples thereof include sulfamoyl, dimethylsulfamoyl, ethylsulfamoyl, octylsulfamoyl, dioctylsulfamoyl and undecylsulfamoyl.

$L^1$ and $L^2$ each independently represent a divalent linking group. The divalent linking group used herein comprises a carbon atom, a nitrogen atom, an oxygen atom, or a sulfur atom, and constitutes a 4-membered to 8-membered ring associated with the carbon atoms, to which $X^1$ and $X^2$ are connected.

Specific examples of $L^1$ and $L^2$ include a divalent linking group constituted by combining —C($R^4$)($R^5$)—, —C($R^6$)=, —N($R^7$)—, —N=, —O— and —S—, in which $R^4$, $R^5$, $R^6$ and $R^7$each independently represent a hydrogen atom or a substituent, the details of which are the same as those described for $R^1$, $R^2$ and $R^3$. The 4-membered to 8-membered ring may form a saturated or unsaturated condensed ring, and examples of the condensed ring include a cycloalkyl ring, an aryl ring and a heterocyclic ring, the details of which are the same as those described for $R^1$, $R^2$ and $R^3$.

The 4-membered to 8-membered ring will be described in more detail below.

Examples of the 4-membered ring include cyclobutanedione, cyclobutenedione and benzocyclobutenequinone.

Examples of the 5-membered ring include cyclopentanedione, cyclopentenedione, cyclopentanetrione, cyclopentenetrione, indandione, indantrione, tetrahydrofurandione, tetrahydrofurantrione, tetrahydropyrroledione, tetrahydropyrroletrione, tetrahydrothiophenedione and tetrahydrothiophenetrione.

Examples of the 6-membered ring include benzoquinone, quinomethane, quinodimethane, quinoneimine, quinonediimine, thiobenzoquinone, dithiobenzoquinone, naphthoquinone, anthraquinone, dihydrochromenetrione, dihydropyridinedione, dihydropyrazinedione, dihydropyrimidinedione, dihydropyridazinedione, dihydrophthalazinedione, dihydroisoquinolinedione and tetrahydroquinolinetrione.

Examples of the 7-membered ring include cycloheptanedione, cycloheptanetrione, azacycloheptanetrione, diazacycloheptanetrione, oxocycloheptanetrione, dioxocycloheptanetrione and oxoazacycloheptanetrione.

Examples of the 8-membered ring include cyclooctanedione, cyclooctanetrione, azacyclooctanetrione, diazacyclooctanetrione, oxocyclooctanetrione, dioxocyclooctanetrione, oxoazacyclooctanetrione, cyclooctenedione, cyclooctadienedione and dibenzocyclooctenedione.

The ring formed with $L^1$ and $L^2$ associated with the carbon atoms, to which $X^1$ and $X^2$ are connected, is preferably a 6-membered ring.

The organic oxidizing agent is more preferably a compound represented by formula (IV-1):

(IV-1)

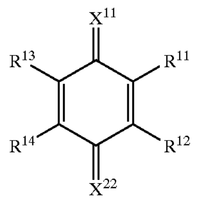

wherein $=NR^8$ and $=CR^9R^{10}$ represented by $X^{11}$ and $X^{22}$ have the same meanings as $=NR^1$ and $=CR^2R^3$ represented by $X^1$ and $X^2$ in formula (IV), and the preferred scopes thereof are also the same; and the substituents represented by $R^8$, $R^9$ and $R^{10}$ have the same meanings as the substituents represented by $R^1$, $R^2$ and $R^3$ in formula (IV), and the preferred scopes thereof are also the same.

$R^{11}$, $R^{12}$, $R^{13}$ and $R^{14}$ each independently represent a hydrogen atom or a substituent. When $R^{11}$ and $R^{12}$, or $R^{13}$ and $R^{14}$ are the substituents at the same time, these may be connected to each other to form an unsaturated condensed ring. The unsaturated condensed ring may have a substituent, and examples of the substituent include those exemplified for $R^1$ to $R^3$.

$X^{11}$ and $X^{22}$ each independently preferably represent an oxygen atom or a $=CR^9R^{10}$ group, and more preferably these simultaneously represent oxygen atoms or simultaneously represent $=CR^9R^{10}$ groups. $R^9$ and $R^{10}$ each independently preferably represent a halogen atom, a cyano group, an acyl group, an alkoxycarbonyl group or an alkylsulfonyl group.

The case where $X^{11}$ and $X^{22}$ simultaneously represent oxygen atoms will be described.

In the case where $X^{11}$ and $X^{22}$ simultaneously represent oxygen atoms, it is preferred that at least two of $R^1$l, $R^{12}$, $R^{13}$ and $R^{14}$ are electron attracting groups. The electron attracting group herein means a substituent having a positive Hammett's σp value, and specifically examples thereof include a halogen atom, a cyano group, a nitro group, an acyl group, an alkoxycarbonyl group, a carbamoyl group, an alkylsulfonyl group and an alkylsulfinyl group.

In the case where $X^{11}$ and $X^{22}$ simultaneously represent oxygen atoms, it is particularly preferred that $R^{11}$, $R^{12}$, $R^{13}$ and $R^{14}$ each independently represent a hydrogen atom, an alkyl group, a halogen atom, a cyano group, a nitro group, an alkoxy group, an alkylthio group, an amino group, an alkylamino group, an amido group, a sulfoneamido group, a sulfamoylamino group, an alkoxycarbonylamino group, an alkoxysulfonylamino group, an ureido group, a thioureido group, an acyl group, an alkoxycarbonyl group, a carbamoyl group, an alkylsulfonyl group, an alkylsulfinyl group and a sulfamoyl group, provided that at least two of them are electron attracting groups.

As the most preferred combination, $R^{11}$, $R^{12}$, $R^{13}$ and $R^{14}$ each independently represent a hydrogen atom, an alkyl group having from 1 to 6 carbon atoms, a halogen atom, a cyano group, an alkoxy group having from 1 to 6 carbon atoms, an alkylthio group having from 1 to 6 carbon atoms, an amido group having from 1 to 6 carbon atoms, a sulfoneamido group having from 1 to 6 carbon atoms, an ureido group having from 1 to 6 carbon atoms, an acyl group having from 1 to 6 carbon atoms, an alkoxycarbonyl group having from 2 to 6 carbon atoms, a carbamoyl group having from 1 to 6 carbon atoms, an alkylsulfonyl group having from 1 to 6 carbon atoms or an alkylsulfinyl group having from 1 to 6 carbon atoms, provided that at least two of them are a halogen atom, a cyano group, an alkylsulfonyl group or an alkylsulfinyl group.

In the case where $X^{11}$ and $X^{22}$ simultaneously represent $=CR^9R^{10}$ groups, the organic oxidizing agent is particularly preferably a compound represented by formula (IV-2):

(IV-2)

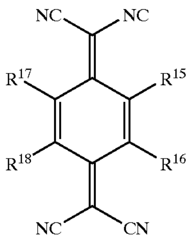

wherein $R^{15}$, $R^{16}$, $R^{17}$ and $R^{18}$ each independently have the same meanings as those described for $R^{11}$ to $R^{14}$.

The organic oxidizing agent is most preferably a compound represented by formula (IV-3) or (IV-4):

(IV-3)

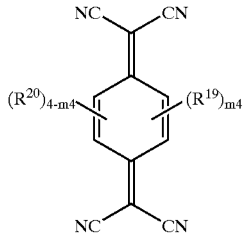

(IV-4)

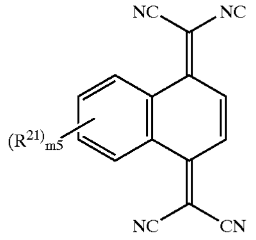

In formula (IV-3), $R^9$ represents a halogen atom, a cyano group, an alkoxy group, an alkylthio group, an amido group, a sulfoneamido group, an ureido group, an acyl group or an alkoxycarbonyl group; $R^{20}$ has the same meaning as those explained for $R^1$ to $R^3$; and m4 represents an integer of from 1 to 4, a plurality of $R^{31}$ and a plurality of $R^{32}$ may each be the same or not the same.

In formula (IV-4), $R^{21}$ represents a hydrogen atom or a substituent. The substituent herein has the same meaning as explained for $R^1$ to $R^3$, and m5 represents an integer of from 0 to 6, provided that if m5 represents an integer of 2 or more, a plurality of $R^{21}$ may be the same or not the same.

A preferred combination of $R^{19}$ and $R^{20}$ in formula (IV-3) will be described below.

A combination, in which $R^{19}$ represents a halogen atom, a cyano group, an alkoxy group having from 1 to 6 carbon atoms, an acyl group having from 1 to 8 carbon atoms or an alkoxycarbonyl group having from 2 to 6 carbon atoms, and $R^{20}$ represents a hydrogen atom or an alkyl group having from 1 to 6 carbon atoms, is preferred, and the most preferred combination is that $R^{19}$ represents an alkoxy group having from 1 to 6 carbon atoms, and $R^{20}$ represents a hydrogen atom.

The organic oxidizing agent represented by formula (IV-3) is particularly preferably a compound represented by the following formula:

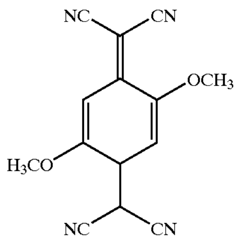

In formula (IV-4), $R^{21}$ preferably represents a hydrogen atom, an alkyl group, a halogen atom, a cyano group, an alkoxy group, an alkylthio group, an amido group, a sulfoneamido group, an ureido group or an acyl group; more preferably a halogen atom, an alkyl group having from 1 to 6 carbon atoms, a halogen atom, a cyano group, an alkoxy group having from 1 to 6 carbon atoms, an alkylthio group having from 1 to 6 carbon atoms, an amido group having from 1 to 6 carbon atoms, a sulfoneamido group having from 1 to 6 carbon atoms, an ureido group having from 1 to 6 carbon atoms or an acyl group having from 1 to 6 carbon atoms; particularly preferably a hydrogen atom, an alkyl group having from 1 to 6 carbon atoms, a fluorine atom, a chlorine atom, a bromine atom, a cyano group or an alkoxy group having from 1 to 6 carbon atoms; and most preferably a hydrogen atom.

Specific examples of compounds of the organic oxidizing agent used in the invention will be described below.

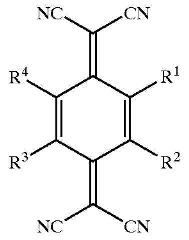

| No. | $R^1$ | $R^2$ | $R^3$ | $R^4$ |
|---|---|---|---|---|
| A-1 | H | H | H | H |
| A-2 | $CH_3$ | H | H | H |
| A-3 | $CH_3$ | H | $OCH_3$ | H |
| A-4 | $OCH_3$ | H | $OCH_3$ | H |
| A-5 | $C_{18}H_{37}$ | H | H | H |
| A-6 | F | H | H | H |
| A-7 | Cl | H | H | H |
| A-8 | Br | H | H | H |
| A-9 | $OCH_3$ | H | H | H |
| A-10 | $CH_2Ph$ | H | H | H |
| A-11 | $CH_2CO_2H$ | H | H | H |
| A-12 | $OC_2H_5$ | H | $OC_2H_5$ | H |
| A-13 | $OC_2H_5$ | H | $SCH_3$ | H |
| A-14 | Cl | H | Cl | H |
| A-15 | $CH_3$ | H | Br | H |
| A-16 | $CH_3$ | H | $CH_3$ | H |
| A-17 | $CO_2CH_3$ | H | H | H |
| A-18 | $COC_{11}H_{23}$ | H | H | H |
| A-19 | Br | H | $OCH_2CH_2OH$ | H |
| A-20 | $CH_3$ | $CH_3$ | $CH_3$ | $CH_3$ |
| A-21 | $CH_3$ | $OCH_3$ | $CH_3$ | $OCH_3$ |
| A-22 | F | H | F | H |
| A-23 | F | F | F | F |
| A-24 | CN | H | CN | H |
| A-25 | $CO_2CH_3$ | H | $CO_2CH_3$ | H |
| A-26 | Cl | $NHCOC_{11}H_{23}$ | Cl | $NHCOC_{11}H_{23}$ |

-continued

A-27

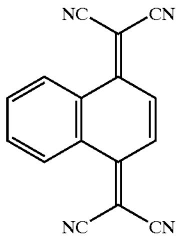

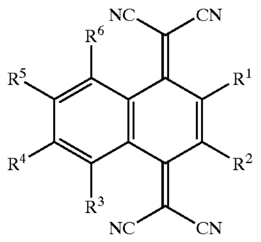

| No. | $R^1$ | $R^2$ | $R^3$ | $R^4$ | $R^5$ | $R^6$ |
|---|---|---|---|---|---|---|
| A-28 | $CH_3$ | H | H | H | H | H |
| A-29 | $CH_3$ | Cl | H | H | H | H |
| A-30 | $CH_3$ | $CH_3$ | H | H | H | H |
| A-31 | H | H | H | $OCH_3$ | H | H |
| A-32 | H | H | H | $C_8H_{17}$ | H | H |
| A-33 | H | H | H | $SCH_3$ | H | H |

A-34

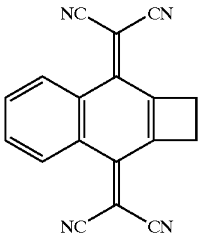

A-35

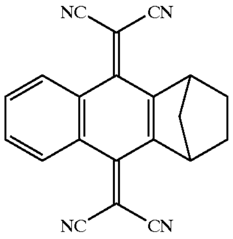

-continued
A-36
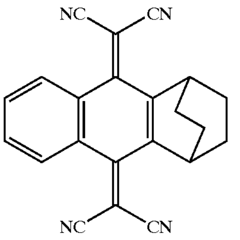
A-37
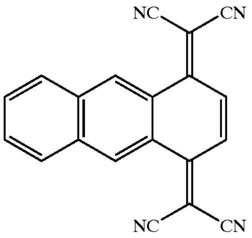
A-38
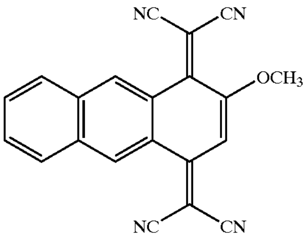
A-39
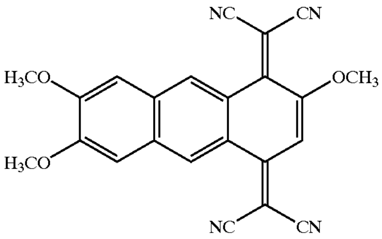
A-40
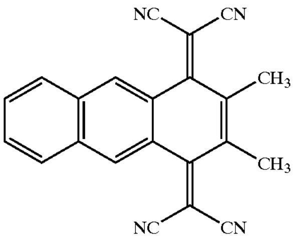
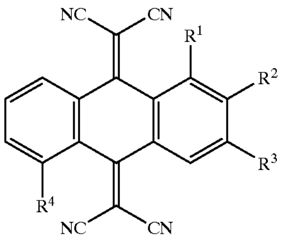
| No. | $R^1$ | $R^2$ | $R^3$ | $R^4$ |
|---|---|---|---|---|
| A-41 | H | H | H | H |
| A-42 | H | $CO_2CH_3$ | H | H |
-continued
A-43
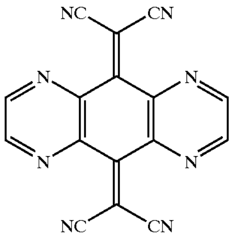
A-44
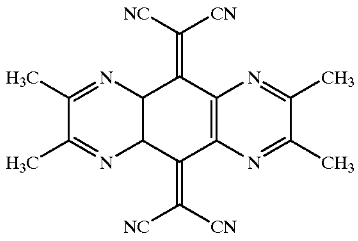
A-45
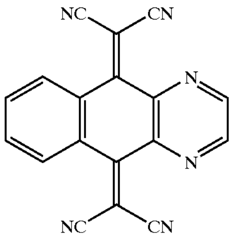
A-46
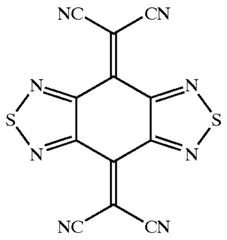
A-47
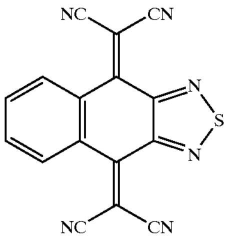
A-48
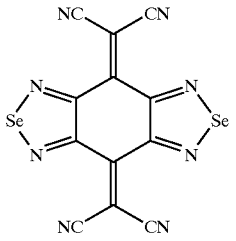

-continued

A-49

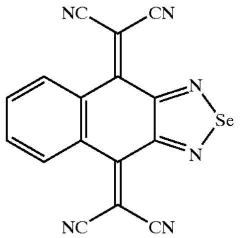

A-50

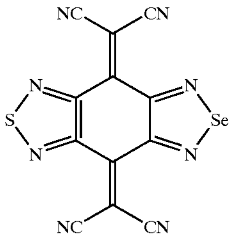

A-51

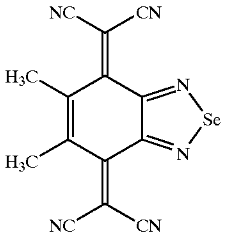

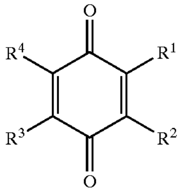

| No. | $R^1$ | $R^1$ | $R^3$ | $R^4$ |
|---|---|---|---|---|
| A-52 | Cl | Cl | Cl | Cl |
| A-53 | Cl | H | Cl | H |
| A-54 | F | F | F | F |
| A-55 | Cl | Cl | Cl | $NHCOCH_3$ |
| A-56 | Cl | Cl | Cl | 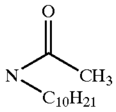 |
| A-57 | Cl | $NHCOC_5H_{11}$ | Cl | $NHCOC_5H_{11}$ |
| A-58 | Cl | $NHCOC_{11}H_{23}$ | Cl | $NHCOC_{11}H_{23}$ |
| A-59 | Cl | $NHCONHC_2H_5$ | Cl | $NHCONHC_2H_5$ |
| A-60 | Cl | $NHSO_2CH_3$ | Cl | $NHSO_2CH_3$ |
| A-61 | Cl | $CO_2C_2H_5$ | Cl | $CO_2C_2H_5$ |
| A-62 | Cl | $CONHC_8H_{17}$ | Cl | $CONHC_8H_{17}$ |
| A-63 | Cl | H | $SC_2H_5$ | H |
| A-64 | H | H | H | H |
| A-65 | $CO_2C_2H_5$ | $CO_2C_2H_5$ | $CO_2C_2H_5$ | $CO_2C_2H_5$ |
| A-66 | $COC_8H_{17}$ | $COC_8H_{17}$ | $COC_8H_{17}$ | $COC_8H_{17}$ |
| A-67 | $CO_2C_2H_5$ | H | $CO_2C_2H_5$ | H |
| A-68 | $SC_{12}H_{25}$ | H | H | H |
| A-69 | Cl | Cl | CN | CN |

-continued

A-70

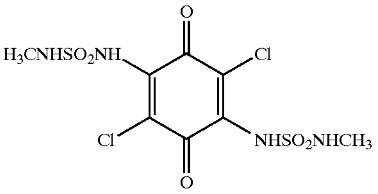

A-71

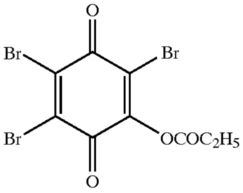

A-72

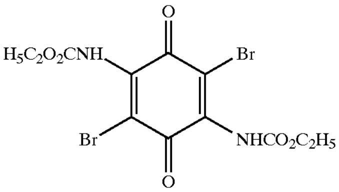

A-73

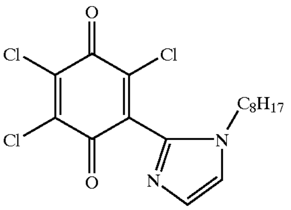

A-74

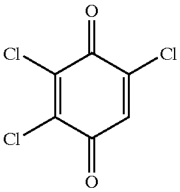

| | | | | |
|---|---|---|---|---|
| A-75 | $SO_2C_2H_5$ | $SO_2C_2H_5$ | $SO_2C_2H_5$ | $SO_2C_2H_5$ |
| A-76 | $SO_2C_2H_5$ | $SO_2C_2H_5$ | $SO_2C_2H_5$ | $OC_2H_5$ |
| A-77 | $SO_2C_2H_5$ | $OC_2H_5$ | $SO_2C_2H_5$ | $OC_2H_5$ |
| A-78 | $SO_2C_2H_5$ | H | $SO_2C_2H_5$ | H |
| A-79 | $C_2H_5$ | $SOC_2H_5$ | $SOC_2H_5$ | $SOC_2H_5$ |
| A-80 | $SO_2Ph$ | $SO_2Ph$ | $SO_2Ph$ | Cl |
| A-81 | $SO_2Ph$ | $SO_2Ph$ | CN | CN |
| A-82 | $SO_2Ph$ | $SO_2Ph$ | $SO_2Ph$ | $SO_2Ph$ |
| A-83 | $SCF_3$ | $SCF_3$ | $SCF_3$ | $SCF_3$ |
| A-84 | $SOCF_3$ | $SOCF_3$ | $SOCF_3$ | $SOCF_3$ |
| A-85 | $SO_2CF_3$ | $SO_2CF_3$ | $SO_2CF_3$ | $SO_2CF_3$ |
| A-86 | $SO_2CF_3$ | H | $SO_2CF_3$ | H |
| A-87 | H | H | $SO_2CF_3$ | H |
| A-88 | Cl | $SO_2CF_3$ | $SO_2CF_3$ | Cl |

A-89

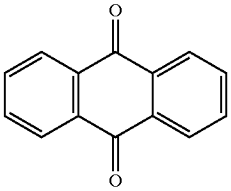

-continued
A-90
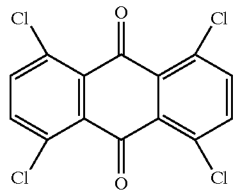
A-91
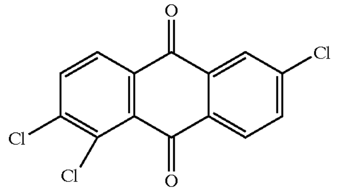
A-92
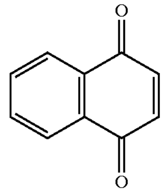
A-93
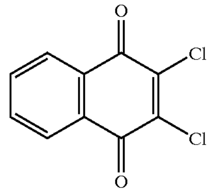
A-94
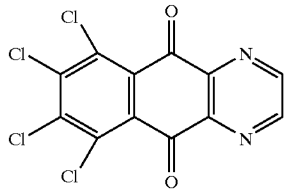
A-95
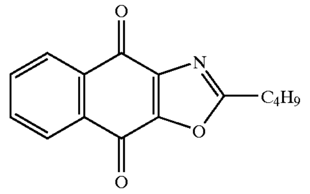
A-96
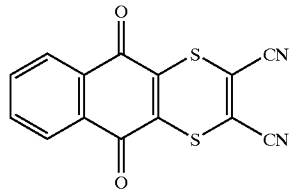
-continued
A-97
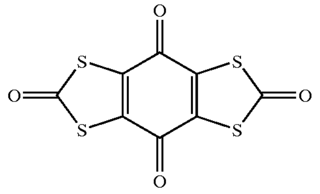
A-98
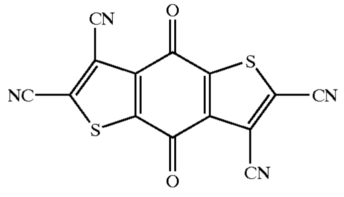
A-99
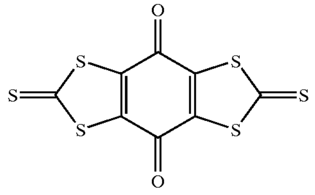
A-100
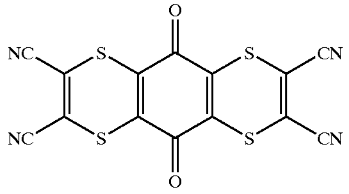
A-101
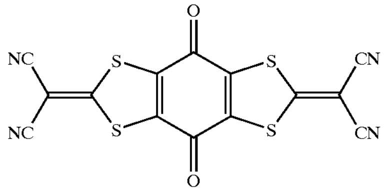
A-102
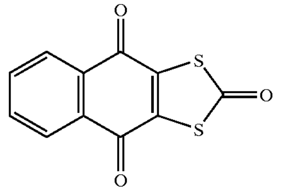
A-103
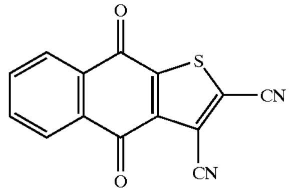

-continued
A-104
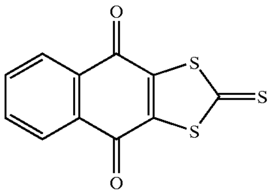
A-105
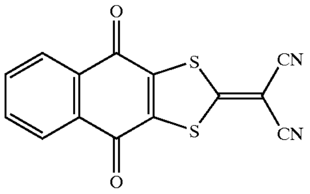
A-106
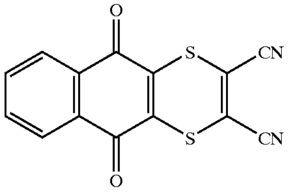
A-107
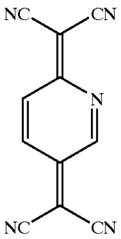
A-108
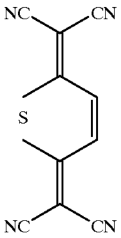
A-109
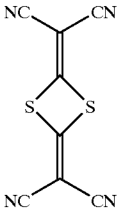
A-110
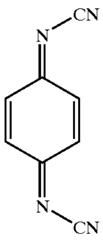
-continued
A-111
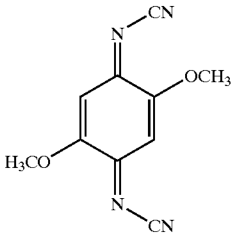
A-112
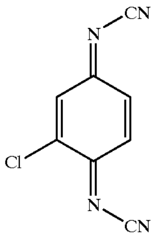
A-113
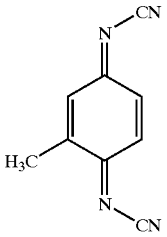
A-114
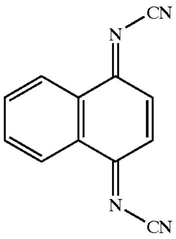
A-115
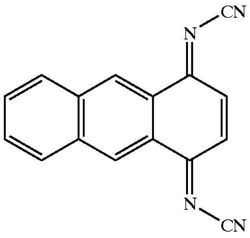
A-116
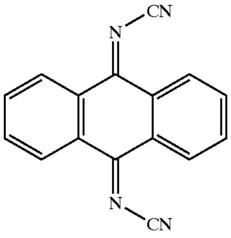

-continued
A-117
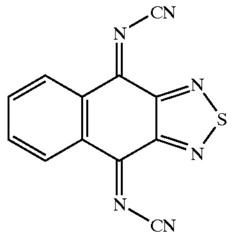
A-118
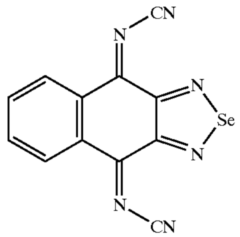
A-119
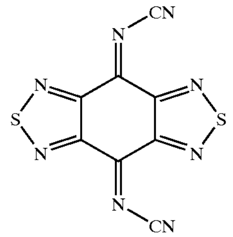
A-120
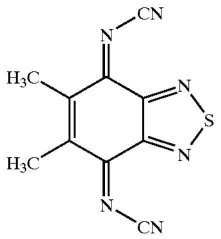
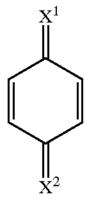
| No. | $X^1$ | $X^2$ |
|---|---|---|
| A-121 | $NC_8H_{17}$ | $NC_8H_{17}$ |
| A-122 | $N + (C_5H_{11})_2$ | O |
A-123
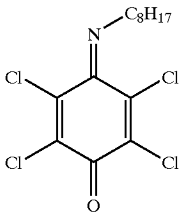
-continued
A-124
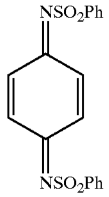
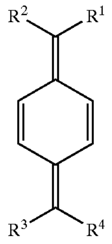
| No. | $R^1$ | $R^2$ | $R^3$ | $R^4$ |
|---|---|---|---|---|
| A-125 | CN | $CO_2CH_3$ | CN | $CO_2CH_3$ |
| A-126 | CN | $CO_2C_4H_9$ | CN | $CO_2C_4H_9$ |
| A-127 | CN | $CO_2C_{11}H_{23}$ | CN | $CO_2C_{11}H_{23}$ |
| A-128 | $CO_2C_2H_5$ | $CO_2C_2H_5$ | $CO_2C_2H_5$ | $CO_2C_2H_5$ |
| A-129 | $COCH_3$ | $COCH_3$ | $COCH_3$ | $COCH_3$ |
| A-130 | $SO_2C_2H_5$ | $SO_2C_2H_5$ | $SO_2C_2H_5$ | $SO_2C_2H_5$ |
| A-131 | Cl | Cl | CN | CN |
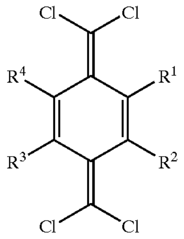
| No. | $R^1$ | $R^2$ | $R^3$ | $R^4$ |
|---|---|---|---|---|
| A-132 | H | H | H | H |
| A-133 | Cl | Cl | Cl | Cl |
| A-134 | Cl | H | Cl | H |
A-135
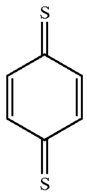
A-136
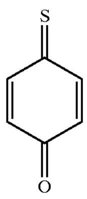

-continued

A-137

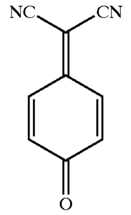

A-138

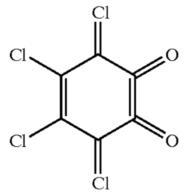

A-139

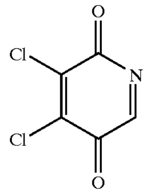

A-140

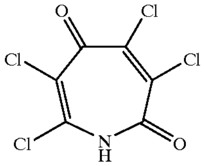

A-141

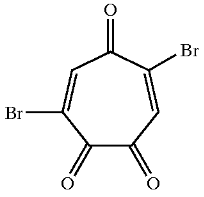

A-142

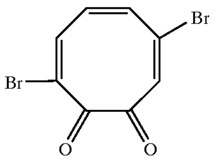

A-143

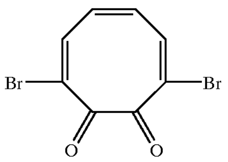

A-144

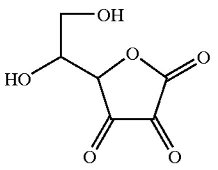

-continued

A-145

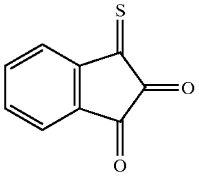

A-146

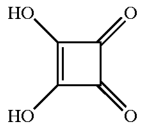

A-147

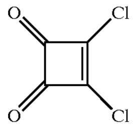

The compound represented by formula (IV) can be easily synthesized according to a general synthesis method described, for example, in *J. Chem. Soc. Perkin Trans.* 1, 611 (1992) and *Synthesis*, 546 (1971). Furthermore, the following synthesis example and a method according thereto may be employed.

Synthesis Example

The example compound (A-22) according to the invention was synthesized by the following scheme:

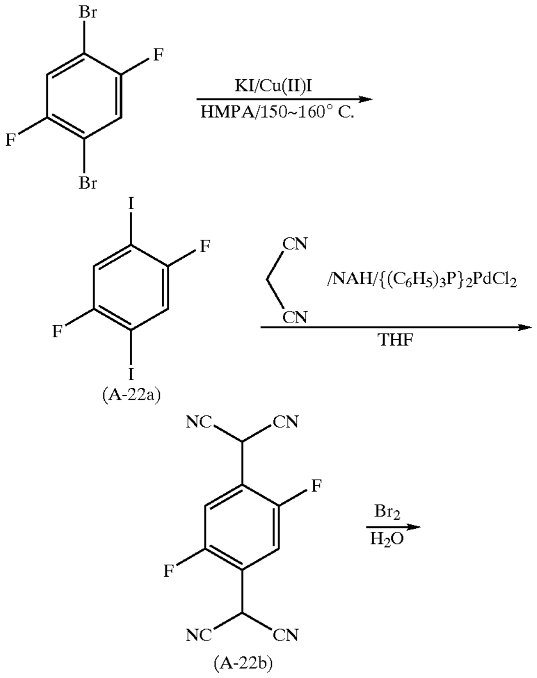

-continued

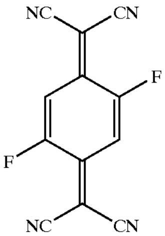

(A-22)

Synthesis of (A-22a)

2.72 g of 1,4-dibromo-2,5-difluorobenzene, 24.9 g of potassium iodide, 9.53 g of copper iodide and 30 ml of HMPA (hexamethylphosphoric triamide) were mixed, and heated to 150 to 160° C. in a nitrogen atmosphere. After completing the reaction, diluted aqueous hydrochloric acid and ether were poured into the reaction liquid, and after filtration of a copper salt, an organic layer was extracted. The organic layer was washed with aqueous sulfite, and after drying with sodium sulfate, the organic layer was filtered. The filtrate was concentrated under reduced pressure to obtain 2.93 g of (A-22a) as yellow crystals.

Synthesis of (A-22b)

60 ml of THF (tetrahydrofuran) was added to 3.66 g of (A-22a), 2.64 g of malononitrile, 1.44 g of sodium hydroxide and 0.21 g of bistriphenylphosphine palladium chloride, and then heated while being refluxed for 12 hours. After completing the reaction, the reaction liquid was poured into 1 N hydrochloric acid, and a white precipitate thus formed was filtered, followed by drying, to obtain 2.68 g of (A-22b) as a white solid.

Synthesis of (A-22)

100 ml of water was added to 3.36 g of (A-22b), and an excessive amount of bromine water was gradually added dropwise into the resulting suspension. After the mixture was allowed to stand overnight, the resulting red precipitate was filtered, and after washing with cold water, it was dissolved in 60 ml of methylene chloride. After the resulting solution was dried by use of sodium sulfate, it was treated with activated charcoal, and the solvent was distilled out to obtain 3.11 g of the objective example compound (A-22) as yellow crystals.

The example compound (A-58) according to the invention was synthesized by the following scheme:

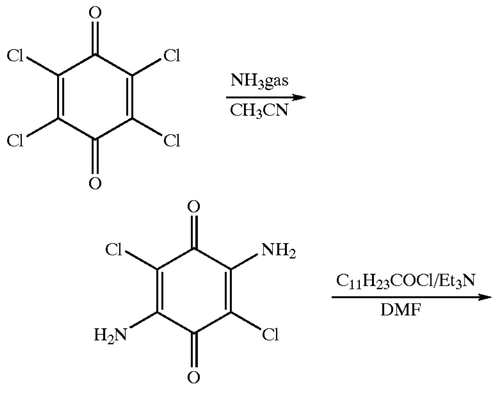

(A-58a)

-continued

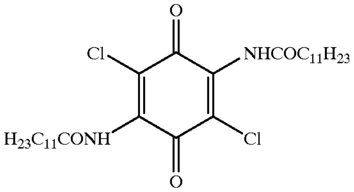

(A-58)

Synthesis of (A-58a)

25.0 g of chloranil was dissolved in 60 ml of acetonitrile, and an ammonia gas was continuously introduced into the resulting suspension. The resulting brown solid was filtered and washed with water and then 100 ml of acetonitrile, and then dried under reduced pressure to obtain 19.6 g of (A-58a).

Synthesis of (A-58)

100 ml of DMF was added to 2.1 g of (A-58a), 4.4 g of laurylic acid chloride and 2.8 ml of triethylamine, and heated to 70° C. After heating for 7 hours, the reaction liquid was poured into 300 ml of cold water, and then extracted with ethyl acetate. After drying the resulting solution by use of sodium sulfate, it was concentrated and recrystallized from acetonitrile to obtain 1.7 g of the example compound (A-58) as yellow crystals.

The organic oxidizing agent represented by formula (IV) may be used singly or in combination with a known quencher.

Representative examples of the quencher used in combination include the metallic complex, the diimmonium salt and the aminium salt represented by formulae (III), (IV) and (V) described in Japanese Unexamined Patent Publication No. 3(1991)-224793, and the nitroso compound shown in Japanese Unexamined Patent Publication No. 2(1990)-300287 and No. 2(1990)-300288. The quencher to be combined is particularly preferably a metallic complex (for example, PA-1006 (Mitsui Toatsu Finechemicals Co., Ltd.)) and a diimmonium salt (for example, IRG-023 and IRG-022 (Nippon Kayaku Co., Ltd.)), and most preferably a diimmonium salt. These quenchers may be used in combination of two or more thereof depending on the object.

The addition amount of the organic oxidizing agent represented by formula (IV) is preferably in the range of from 1 to 100 parts by weight per 100 parts by weight of the organic dye, more preferably from 1 to 50 parts by weight, particularly preferably from 1 to 25 parts by weight, and most preferably from 1 to 10 parts by weight.

The addition amount of the quencher is preferably in the range of from 1 to 100 parts by weight per 100 parts by weight of the organic dye, more preferably from 1 to 50 parts by weight, particularly preferably from 1 to 25 parts by weight, and most preferably from 1 to 10 parts by weight.

The organic dye used in the invention will be described below.

Examples of the organic dye that can be used in the invention include a cyanine series dye, a merocyanine series dye, a phthalocyanine series dye, an oxonol series dye, a pyrylium series dye, a thiopyrylium series dye, a triarylmethane series dye, a polymethine series dye, a squalium series dye, an azulenium series dye, a naphthoquinone series dye, an anthraquinone series dye, an indophenol series dye, an indoaniline series dye, an aminium series diimmonium series dye and a pyran series dye.

The symmetric or asymmetric cyanine dye represented by formula (III) will be described. Examples of the nucleus formed with $Z^1$ and $Z^2$ in formula (III) include a 3,3- dialkylindolenine nucleus, a 3,3-dialkylbenzoindolenine nucleus, a thiazole nucleus, a benzothiazole nucleus, a naphthothiazole nucleus, a thiazoline nucleus, an oxazole nucleus, a benzoxazole nucleus, a naphthoxazole nucleus, an oxazoline nucleus, a selenazole nucleus, a benzoselenazole nucleus, a naphthoselenazole nucleus, a selenazoline nucleus, a tellurazole nucleus, a benzotellurazole nucleus, a naphthotellurazole nucleus, a tellurazoline nucleus, an imidazole nucleus, a benzoimidazole nucleus, a naphthoimidazole nucleus, a pyridine nucleus, a quinoline nucleus, an isoquinoline nucleus, an imidazo[4,5-b]quinoxaline nucleus, an oxadiazole nucleus, a thiadiazole nucleus, a tetrazole nucleus, and a pyrimidine nucleus. The 5-membered or 6-membered nitrogen-containing heterocyclic rings referred to herein may have a substituent if possible, and examples of the substituent include those exemplified as the substituents for $R^1$, $R^2$ and $R^3$ described for formula (IV).

Examples of the substituent will be described in more detail below.

The alkyl group includes a linear, branched or cyclic alkyl group having from 1 to 18 carbon atoms (preferably from 1 to 8 carbon atoms), and examples thereof include methyl, ethyl, propyl, isopropyl, butyl, isobutyl, pentyl, 2-hydroxyethyl, 4-carboxybutyl, hexyl, octyl, benzyl and phenethyl.

The alkenyl group includes a linear, branched or cyclic alkenyl group having from 2 to 18 carbon atoms (preferably from 2 to 8 carbon atoms), and examples thereof include vinyl, allyl, 1-propenyl, 2-pentenyl, 1,3-butanedienyl and 2-octenyl.

The aralkyl group includes an aralkyl group having from 7 to 10 carbon atoms, and examples thereof include benzyl.

The aryl group includes an aryl group having from 6 to 10 carbon atoms, which may have a substituent, and examples thereof include phenyl, naphthyl, 4-carboxyphenyl, 3-carboxyphenyl, 3,5-dicarboxyphenyl, 4-methanesulfonamidophenyl and 4-butanesulfoneamidophenyl.

The heterocyclic group includes a 5-membered or 6-membered saturated or unsaturated heterocyclic group comprising a carbon atom, a nitrogen atom, an oxygen atom or a sulfur atom, in which the number and the species of the hetero atoms constituting the ring may be single or plural, and examples thereof include an oxazole ring, a benzoxazole ring, a 5-carboxybenzoxazole ring, a thiazole ring, an imidazole ring, a pyridine ring, a sulforane ring, a furan ring, a thiophene ring, a pyrazole ring, a pyrrole ring, a chroman ring and a coumarin ring.

Examples of the halogen atom include a fluorine atom, a chlorine atom and a bromine atom.

The alkoxy group includes an alkoxy group having from 1 to 18 carbon atoms (preferably from 1 to 8 carbon atoms), and examples thereof include methoxy, ethoxy, propoxy and butoxy.

The aryloxy group includes an aryloxy group having from 6 to 10 carbon atoms, which may have a substituent, and examples thereof include phenoxy and p-methoxyphenoxy.

The alkylthio group includes an alkylthio group having from 1 to 18 carbon atoms (preferably from 1 to 8 carbon atoms), and examples thereof include methylthio and ethylthio.

The arylthio group includes an arylthio group having from 6 to 10 carbon atoms, and examples thereof include phenylthio.

The acyloxy group includes an acyloxy group having from 1 to 18 carbon atoms (preferably from 1 to 8 carbon atoms), and examples thereof include acetoxy, propanoyloxy, pentanoyloxy and octanoyloxy.

The alkylamino group includes an alkylamino group having from 1 to 18 carbon atoms (preferably from 1 to 8 carbon atoms), and examples thereof include methylamino, dimethylamino, diethylamino, dibutylamino and octylamino.

The amido group includes an amido group having from 1 to 18 carbon atoms (preferably from 1 to 8 carbon atoms), and examples thereof include acetoamido, propanoylamino, pentanoylamino, octanoylamino, octanoylmethylamino and benzamido.

The sulfoneamido group includes a sulfoneamido group having from 1 to 18 carbon atoms (preferably from 1 to 8 carbon atoms), and examples thereof include methanesulfoneamido, ethanesulfoneamido, propylsulfoneamide, butanesulfoneamido and benzenesulfoneamido.

The alkoxycarbonylamino group includes an alkoxycarbonylamino group having from 1 to 18 carbon atoms (preferably from 1 to 8 carbon atoms), and examples thereof include methoxycarbonylamino and ethoxycarbonylamino.

The alkoxysulfonylamino group includes an alkoxysulfonylamino group having from 1 to 18 carbon atoms (preferably from 1 to 8 carbon atoms), and examples thereof include methoxysulfonylamino and ethoxysulfonylamino.

The sulfamoylamino group includes a sulfamoylamino group having from 0 to 18 carbon atoms (preferably from 0 to 8 carbon atoms), and examples thereof include methylsulfamoylamino, dimethylsulfamoylamino, ethylsulfamoylamino, propylsulfamoylamino and octylsulfamoylamino.

The ureido group includes an ureido group having from 1 to 18 carbon atoms (preferably from 1 to 8 carbon atoms), which may have a substituent, and examples thereof include ureido, methylureido, N,N-dimethylureido and octylureido.

The thioureido group includes a thioureido group having from 1 to 18 carbon atoms (preferably from 1 to 8 carbon atoms), which may have a substituent, and examples thereof include thioureido, methylthioureido, N,N-dimethylthioureido and octylthioureido.

The acyl group includes an acyl group having from 1 to 18 carbon atoms (preferably from 1 to 8 carbon atoms), and examples thereof include acetyl, benzoyl and propanoyl.

The alkoxycarbonyl group includes an alkoxycarbonyl group having from 1 to 18 carbon atoms (preferably from 1 to 8 carbon atoms), and examples thereof include methoxycarbonyl, ethoxycarbonyl and octyloxycarbonyl.

The carbamoyl group includes a carbamoyl group having from 1 to 18 carbon atoms (preferably from 1 to 8 carbon atoms), which may have a substituent, and examples thereof include carbamoyl, N,N-dimethylcarbamoyl and N-ethylcarbamoyl.

The alkylsulfonyl or arylsulfonyl group includes an alkylsulfonyl or arylsulfonyl group having from 1 to 18 carbon atoms (preferably from 1 to 8 carbon atoms), and examples thereof include methanesulfonyl, ethanesulfonyl and benzenesulfonyl.

The alkylsulfinyl group includes an alkylsulfinyl group having from 1 to 18 carbon atoms (preferably from 1 to 8 carbon atoms), and examples thereof include methanesuflinyl, ethanesulfinyl and octanesulfinyl.

The sulfamoyl group includes a sulfamoyl group having from 0 to 18 carbon atoms (preferably from 0 to 8 carbon atoms), which may have a substituent, and examples thereof include sulfamoyl, dimethylsulfamoyl, ethylsulfamoyl, butylsulfamoyl, octylsulfamoyl and phenylsulfamoyl.

$Z^1$ and $Z^2$ each preferably represent a substituted or unsubstituted 3,3-dialkylindolenine nucleus or a 3,3-dialkylbenzoindolenine nucleus.

$R^{30}$ and $R^{31}$ each independently represent an alkyl group.

Examples of the alkyl group represented by $R^{30}$ and $R^{31}$ include a substituted or unsubstituted, linear, branched or cyclic alkyl group having from 1 to 18 carbon atoms (preferably from 1 to 8 carbon atoms), and examples of the substituent include those exemplified as the substituents for the nitrogen-containing heterocyclic ring, the preferred scopes of which are also the same. Preferably it is an unsubstituted alkyl group and an alkyl group substituted with an aryl group, a halogen atom, a hydroxy group, an alkoxy group, an acyloxy group, an amido group, a sulfoneamido group, an alkoxycarbonyl group, a carboxyl group or a sulfo group. Examples thereof include methyl, ethyl, propyl, butyl, isobutyl, 2-ethylhexyl, octyl, benzyl, 2-phenylethyl, 2-hydroxyethyl, 3-hydroxypropyl, 2-carboxyethyl, 3-carboxypropyl, 4-carboxybutyl, carboxymethyl, 2-methoxyethyl, 2-(2-methoxyethyl)ethyl, 2-sulfoethyl, 3-sulfopropyl, 3-sulfobutyl, 4-sulfobutyl, 2-(3-sulfopropoxy)ethyl, 2-hydroxy-3-sulfopropyl, 3-sulfopropoxyethoxyethyl, 2-acetoxyethyl, carbomethoxymethyl and 2-methanesulfonylaminoethyl.

The methine groups represented by $L^3$, $L^4$, $L^5$, $L^6$ and $L^7$ are each independently an unsubstituted or substituted methine group, and the details thereof are the same as those described as the substituents for the nitrogen-containing heterocyclic ring, the preferred scopes of which are also the same. In the case where they have substituents, the substituents may be connected to each other to form a 5-membered to 7-membered ring, or to form a ring with an auxochrome. Examples of the 5-membered to 7-membered ring include a cyclopentene ring, a 1-dimethylaminocyclopentene ring, a 1-diphenylaminocyclopentene ring, a cyclohexene ring, a 1-chlorocyclohexene ring, an isophorone ring, a 1-morphorinocyclopentene ring and a cycloheptene ring.

n1 and n2 preferably meet either the case where n1 is 0, and n2 is 1, or the case where n1 is 2, and n2 is 0.

M1 represents a charge balancing counter ion. M1 may be either a cation or an anion.

Examples of the cation include an alkali metal ion, such as a sodium ion, a potassium ion and a lithium ion, and an organic ion, such as a tetraalkylammonium ion and a pyridinium ion.

The anion may be either an inorganic anion or an organic anion, and examples thereof include a halogenide ion (such as a fluoride ion, a chloride ion, a bromide ion and an iodide ion), a sulfonate ion (such as a methanesulfonate ion, a trifluoromethanesulfonate ion, a methylsulfate ion, a p-toluenesulfonate ion, a p-chlorobenzenesulfonate ion, a 1,3-benzenedisulfonate ion, a 1,5-naphthalenedisulfonate ion and a 2,6-naphthalenedisulfonate ion), a sulfate ion, a thiocyanate ion, a perchlorate ion, a tetrafluoroborate ion, a picrate ion, an acetate ion, a metallic complex ion represented by the following formulae:

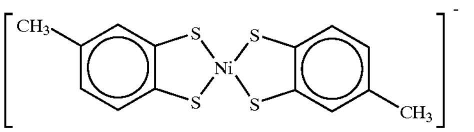

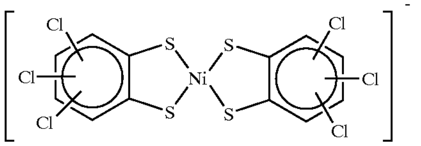

-continued

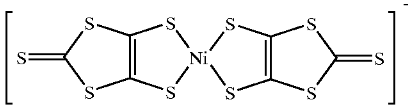

and a phosphate ion (such as a hexafluorophosphate ion and a phosphate ion represented by the following formula:

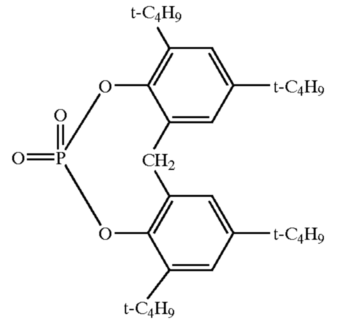

m1 represents a number that is required to balance the charge (0 or more, preferably a number of from 0 to 4), and in the case where a salt is formed inside the molecule, m1 is 0. p and q each independently represent 0 or 1. Both p and q are preferably 0.

The compound represented by formula (III) may form a bis structure by connecting two species thereof on arbitrary carbon atoms.

The organic dye is preferably a cyanine dye represented by formula (III-1):

(III-1)

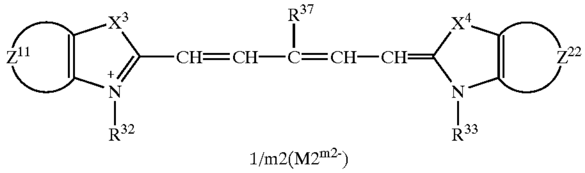

The cyanine dye compound represented by formula (III-1) is more preferably a compound having the following combinations:

It is preferred that $X^3$ and $X^4$ each independently represent an oxygen atom, —C($R^{34}$)($R^{35}$)— or —N($R^{36}$)—; $R^{32}$ and $R^{33}$ each independently represent an unsubstituted alkyl group having from 1 to 6 carbon atoms or an alkyl group having from 1 to 6 carbon atoms substituted with an alkoxy group or an alkylthio group; $R^{34}$, $R^{35}$ and $R^{36}$ each independently represent an unsubstituted alkyl group having from 1 to 6 carbon atoms; $R^{37}$ represents a hydrogen atom, an alkyl group having from 1 to 6 carbon atoms, which may have a substituent, a phenyl group, a pyridyl group, a pyrimidyl group, a succinimido group, a benzoxazole group and a halogen atom; $Z^{11}$ and $Z^{22}$ each independently represent an atomic group for forming an unsubstituted benzene ring, an unsubstituted naphthalene ring or an unsubstituted quinoxaline ring, or an atomic group for forming a benzene ring substituted with one or two groups selected from a methyl group, a chlorine atom, a fluorine atom, a methoxy group and an ethoxy group; and M2 represents a perchlorate ion, a hexafluorophosphate ion, a metallic complex ion represented by the following formula:

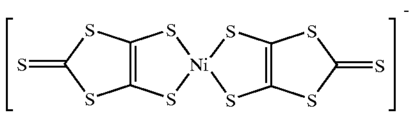

or a sulfonate ion represented by the following formula:

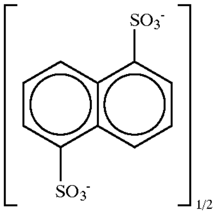

In formula (III-1), m2 represents the valence number or M2.

In formula (III-1), the most preferred combination is that both $X^3$ and $X^4$ simultaneously represent —$C(R^{34})(R^{35})$— or —$N(R^{36})$—; $R^{32}$ and $R^{33}$ each independently represent an unsubstituted alkyl group (such as a methyl group, an ethyl group, a propyl group, an isopropyl group and a butyl group); $R^{34}$, $R^{35}$ and $R^{36}$ each independently represent a methyl group or an ethyl group; $R^{37}$ represents a hydrogen atom, a methyl group, an ethyl group, a chlorine atom or a bromine atom; and both $Z^{11}$ and $Z^{22}$ simultaneously represent an atomic group for forming an unsubstituted benzene ring, an unsubstituted naphthalene ring or an unsubstituted quinoxaline ring.

Specific examples of compounds of the organic dye represented by formula (III) used in the invention will be listed below:

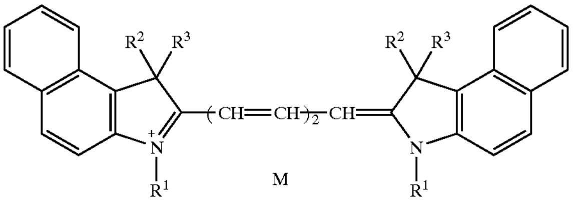

| No. | $R^1$ | $R^2$ | $R^3$ | M |
|---|---|---|---|---|
| B-1 | $CH_3$ | $CH_3$ | $CH_3$ | $ClO_4^-$ |
| B-2 | $CH_3$ | $CH_3$ | $C_2H_5$ | 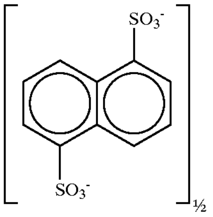 |
| B-3 | $CH_3$ | $CH_3$ | $C_2H_5$ | $PF_6^-$ |
| B-4 | $C_2H_5$ | $CH_3$ | $CH_3$ | 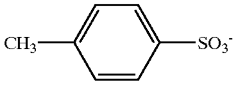 |
| B-5 | n-$C_3H_7$ | $CH_3$ | $CH_3$ | $CF_3SO_3^-$ |
| B-6 | n-$C_4H_9$ | $CH_3$ | $CH_3$ | $ClO_4^-$ |
| B-7 | n-$C_4H_9$ | $CH_3$ | $CH_3$ | 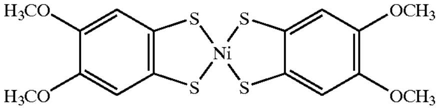 |
| B-8 | $CH_2CH(CH_3)_2$ | $CH_3$ | $CH_3$ | 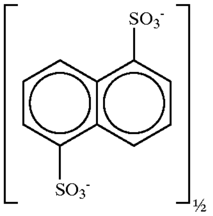 |

-continued

| | | | | |
|---|---|---|---|---|
| B-9 | $CH_2CH_2CF_2H$ | $CH_3$ | $CH_3$ | $ClO_4^-$ |
| B-10 | 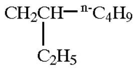 | $CH_3$ | $CH_3$ | $PF_6^-$ |
| B-11 | $CH_3$ | $CH_3$ | $CH_3$ | 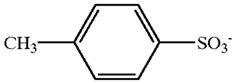 |
| B-12 | $CH_2CH_2OC_2H_5$ | $CH_3$ | $CH_3$ | $ClO_4^-$ |
| B-13 | n-$C_4H_9$ | $CH_3$ | $C_2H_5$ | $ClO_4^-$ |
| B-14 | n-$C_4H_9$ | $CH_3$ | $C_2H_5$ | $PF_6^-$ |
| B-15 | $C_2H_5$ | $CH_3$ | $C_2H_5$ | $ClO_4^-$ |

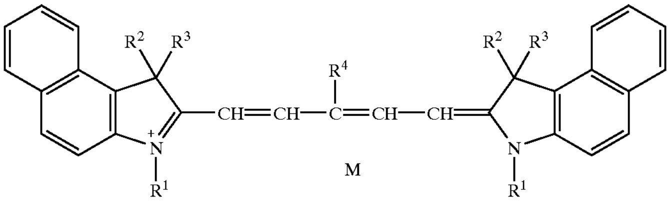

| No. | $R^1$ | $R^2$ | $R^3$ | $R^4$ | M |
|---|---|---|---|---|---|
| B-16 | $CH_3$ | $CH_3$ | $CH_3$ | $CH_3$ | $ClO_4^-$ |
| B-17 | $CH_3$ | $CH_3$ | $CH_3$ | $CH_3$ | 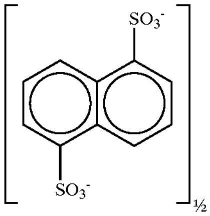 |
| B-18 | n-$C_3H_7$ | $CH_3$ | $CH_3$ | $CH_3$ | $ClO_4^-$ |
| B-19 | n-$C_4H_9$ | $CH_3$ | $CH_3$ | $CH_3$ | $ClO_4^-$ |
| B-20 | $CH_3$ | $CH_3$ | $CH_3$ | 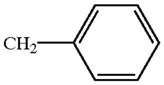 | $ClO_4^-$ |
| B-21 | $CH_3$ | $CH_3$ | $CH_3$ | 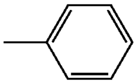 | $ClO_4^-$ |
| B-22 | $CH_3$ | $CH_3$ | $CH_3$ | 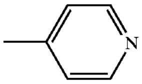 | $ClO_4^-$ |
| B-23 | $CH_3$ | $CH_3$ | $CH_3$ | 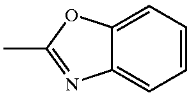 | $ClO_4^-$ |
| B-24 | $CH_3$ | $CH_3$ | $CH_3$ | Br | $ClO_4^-$ |
| B-25 | $CH_3$ | $CH_3$ | $CH_3$ | Cl | $ClO_4^-$ |
| B-26 | $CH_2CO_2C_2H_5$ | $CH_3$ | $CH_3$ | H | 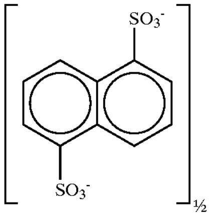 |

-continued
| | | | | | |
|---|---|---|---|---|---|
| B-27 | 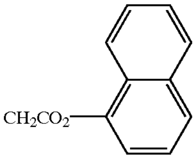 | $CH_3$ | $CH_3$ | H | $ClO_4^-$ |
| B-28 | 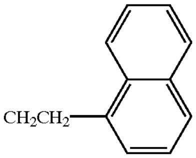 | $CH_3$ | $CH_3$ | H | $ClO_4^-$ |
| B-29 | 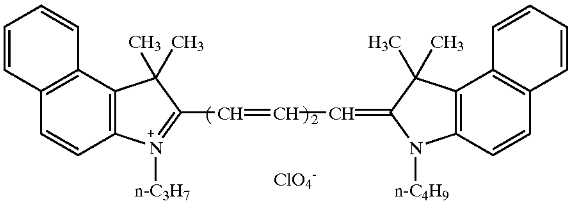 | | | | |
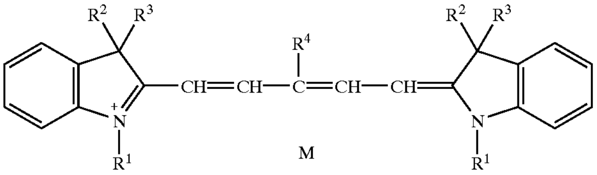
| No. | $R^1$ | $R^2$ | $R^3$ | $R^4$ | M |
|---|---|---|---|---|---|
| B-30 | $CH_3$ | $CH_3$ | $CH_3$ | H |  |
| B-31 | $CH_3$ | $CH_3$ | $C_2H_5$ | H | $ClO_4^-$ |
| B-32 | $C_2H_5$ | $CH_3$ | $CH_3$ | $CH_3$ | $ClO_4^-$ |
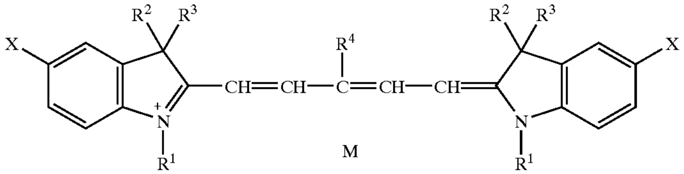
| No. | $R^1$ | $R^2$ | $R^3$ | $R^4$ | X | M |
|---|---|---|---|---|---|---|
| B-33 | $C_2H_5$ | $CH_3$ | $CH_3$ | 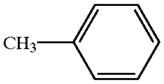 | H | $ClO_4^-$ |
| B-34 | n-$C_3H_7$ | $CH_3$ | $CH_3$ | H | H | 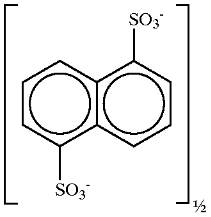 |
| B-35 | $CH_2CH(CH_3)_2$ | $CH_3$ | $CH_3$ | H | H | $PF_6^-$ |
| B-36 | n-$C_4H_9$ | $CH_3$ | $CH_3$ | H | $CH_3$ | $I^-$ |
| B-37 | $CH_2CH_2OC_2H_5$ | $CH_3$ | $CH_3$ | H | Cl | $ClO_4^-$ |
| B-38 | n-$C_3H_7$ | $CH_3$ | $CH_3$ | $CH_3$ | $OCH_3$ | $ClO_4^-$ |

-continued

| | | | | | | |
|---|---|---|---|---|---|---|
| B-39 | $CH_2CH(CH_3)_2$ | $CH_3$ | $CH_3$ | H | $SO_2NH_2$ | $ClO_4^-$ |
| B-40 | n-$C_3H_7$ | $CH_3$ | $CH_3$ | H | H | 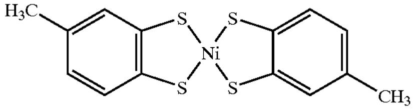 |
| B-41 | n-$C_4H_9$ | $CH_3$ | $CH_3$ | 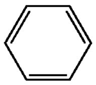 | H | $ClO_4^-$ |
| B-42 | n-$C_3H_7$ | $CH_3$ | $CH_3$ | $C_2H_5$ | Cl | $PF_6^-$ |
| B-43 | $CH_2CH(CH_3)_2$ | $CH_3$ | $CH_3$ | H | $CO_2C_2H_5$ | $PF_6^-$ |
| B-44 | n-$C_3H_7$ | $CH_3$ | $C_2H_5$ | H | H | $ClO_4^-$ |

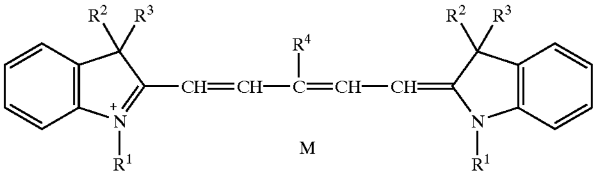

| No. | $R^1$ | $R^2$ | $R^3$ | $R^4$ | M |
|---|---|---|---|---|---|
| B-45 | n-$C_3H_7$ | $CH_3$ | $C_2H_5$ | H | $PF_6^-$ |
| B-46 | $C_2H_5$ | $CH_3$ | $C_2H_5$ | H | $ClO_4^-$ |
| B-47 | n-$C_4H_9$ | $CH_3$ | $C_2H_5$ | H | $ClO_4^-$ |
| B-48 | $CH_3$ | $CH_3$ | $CH_3$ | Br | $ClO_4^-$ |
| B-49 | $CH_3$ | $CH_3$ | $CH_3$ | Cl | $ClO_4^-$ |
| B-50 | $CH_3$ | $CH_3$ | $CH_3$ | 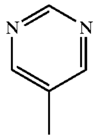 | $I^-$ |

B-51

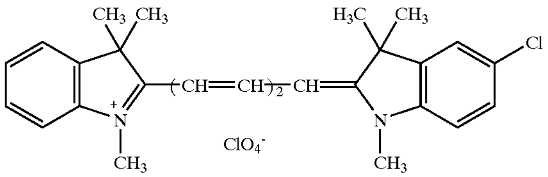

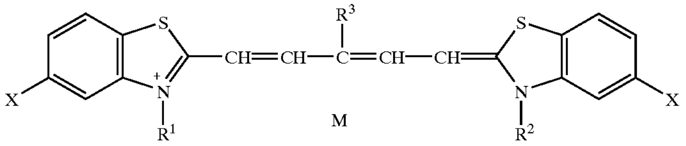

| No. | $R^1$ | $R^2$ | $R^3$ | X | M |
|---|---|---|---|---|---|
| B-52 | $C_2H_5$ | $C_2H_5$ | $CH_3$ | H | $I^-$ |
| B-53 | $CH_3$ | $CH_3$ | H | 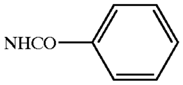 | $I^-$ |
| B-54 | $CH_3$ | $CH_3$ | H | $CH_3$ | 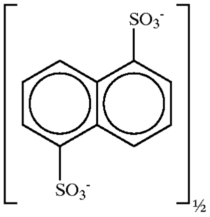 |

-continued
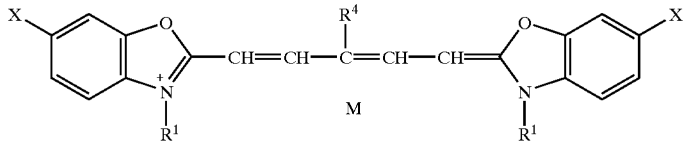
| No. | $R^1$ | $R^2$ | X | M |
|---|---|---|---|---|
| B-55 | $CH_3$ | $CH_3$ | H | $I^-$ |
| B-56 | $C_2H_5$ | $C_2H_5$ | Br | 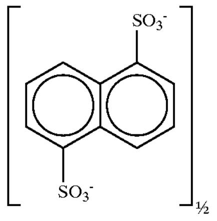 |
| B-57 | $(CH_2)_2CO_2H$ | Br | 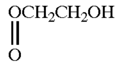 | $Na^+$ |
| B-58 | 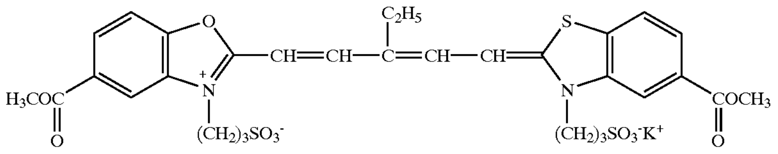 | | | |
| B-59 | 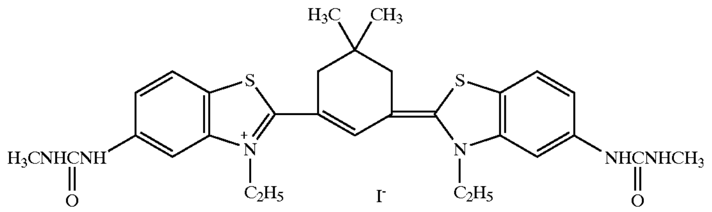 | | | |
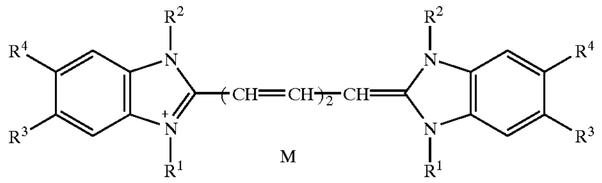
| No. | $R^1$ | $R^2$ | $R^3$ | $R^4$ | M |
|---|---|---|---|---|---|
| B-60 | $(CH_2)_4SO_3^-$ | $C_2H_5$ | $CF_3$ | Cl | $K^+$ |
| B-61 | $(CH_2)_4SO_3^-$ | $C_2H_5$ | CN | Cl | $K^+$ |
| B-62 | 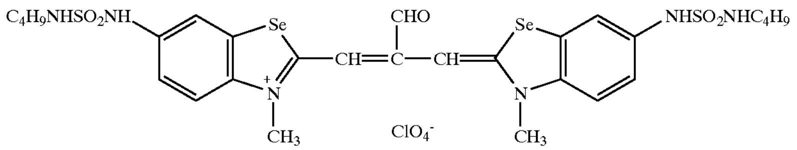 | | | | |
| B-63 | 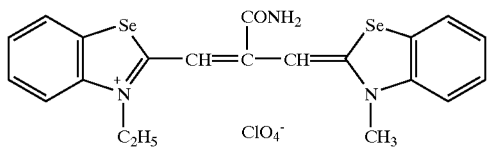 | | | | |

-continued
B-64
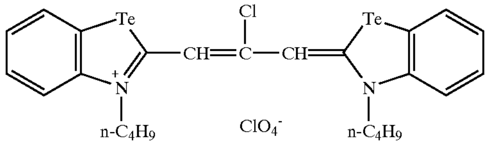
B-65
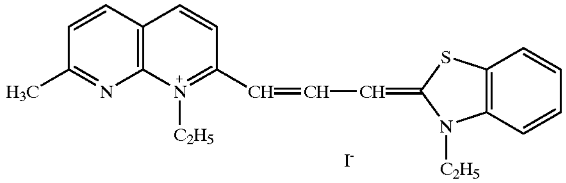
B-66
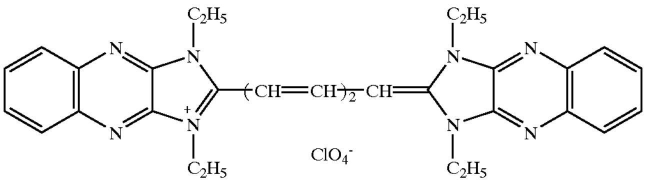
B-67
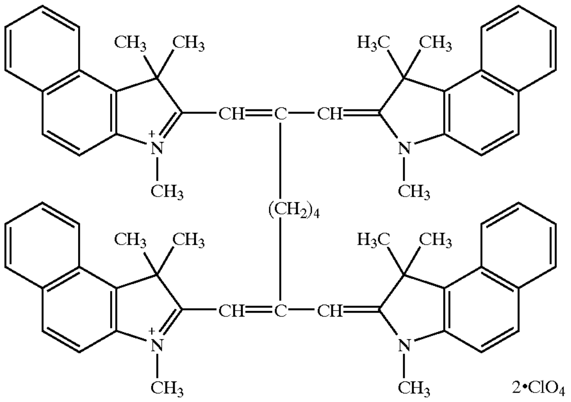
B-68
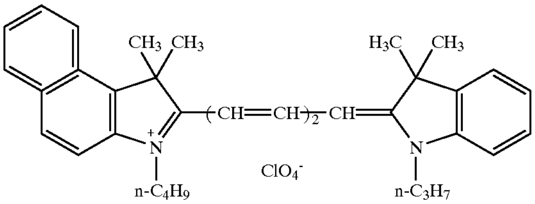
B-69
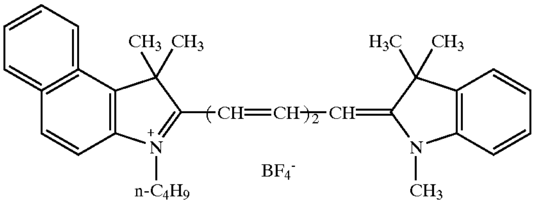
B-70
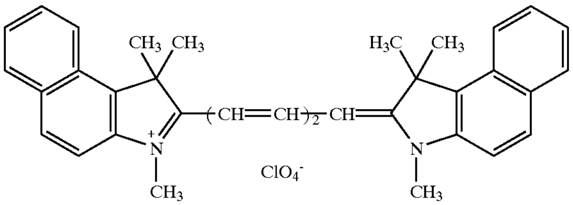

-continued
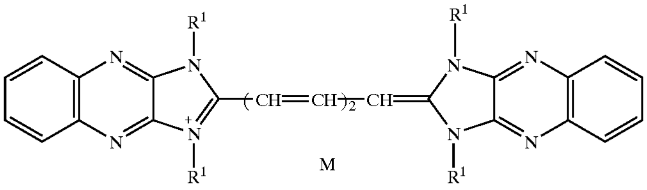
| No. | $R^1$ | M |
|---|---|---|
| B-71 | 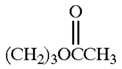 | $COl_4^-$ |
| B-72 | $(CH_2)_3SCH_3$ | $COl_4^-$ |
| B-73 | $(CH_2)_3SCH_3$ | $BF_4^-$ |
| B-74 | $(CH_2)_3SCH_3$ | $BF_4^-$ |
B-75
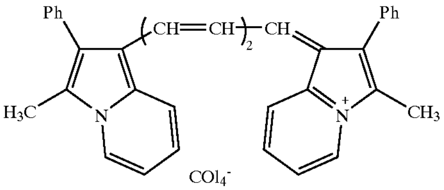
$COl_4^-$
B-76
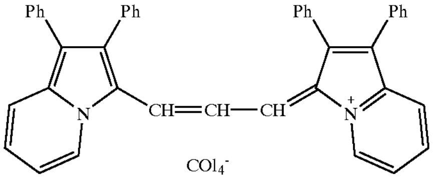
$COl_4^-$
B-77
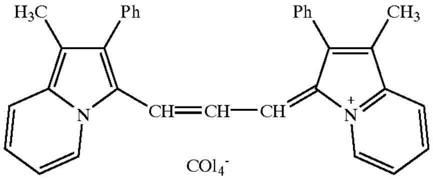
$COl_4^-$
B-78
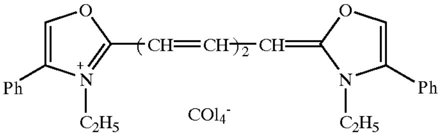
$COl_4^-$
B-79
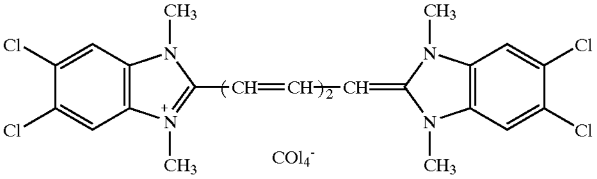
$COl_4^-$
B-80
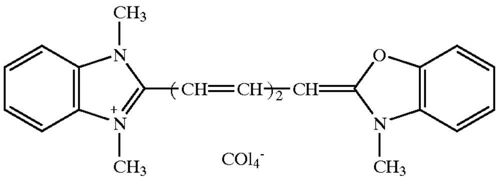
$COl_4^-$ -continued

B-81

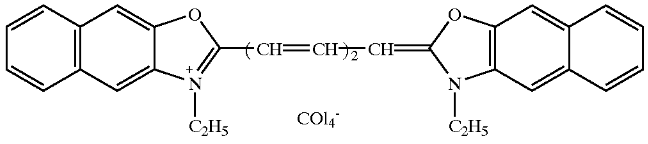

B-82

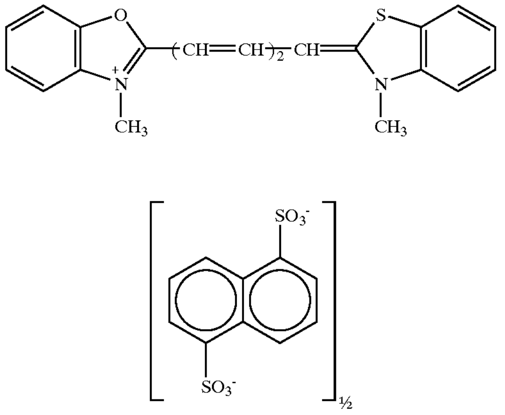

The compound represented by formula (III) can be synthesized according to the methods described in *Heterocyclic Compounds—Cyanine Dyes and Related Compounds*, written by F. M. Hamer, John Wiley & Sons, N.Y. and London (1964); *Heterocyclic Compounds—Special topics in heterocyclic chemistry*, written by D. M. Sturmer, John Wiley & Sons, N.Y. and London (1977), Chapter 18, Section 14, pages 482 to 515; and *Rodd's Chemistry of Carbon Compounds*, Elsevir Science Publishing Company Inc., 2nd. Ed. Vol. IV, Part B (1977), Chapter 15, pages 369 to 422.

In the present invention, as the optical functional film, one comprising a metal complex of an azo dye represented by formula (V) shown below can be preferably used:

(V)

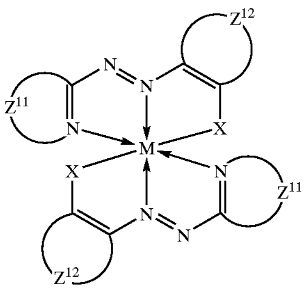

wherein M represents a metal atom; X represents an oxygen atom, a sulfur atom, or $=NR^{21}$; $R^{21}$ represents a hydrogen atom, an alkyl group, an aryl group, an acyl group, an alkylsulfonyl group, or an arylsulfonyl group; $Z^{11}$ represents an atom group necessary for completing a 5-membered or 6-membered nitrogen-containing heterocyclic ring; and $Z^{12}$ represents an atom group necessary for completing an aromatic ring or a heterocyclic aromatic ring.

Of the compounds represented by formula (V), those represented by formula (V-1) shown below are preferable:

(V-1)

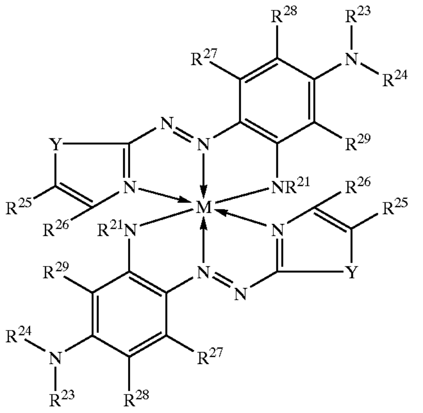

wherein M represents iron, cobalt, nickel, copper, zinc, palladium, platinum, or gold; $R^{21}$ represents an alkylsulfonyl group, or an arylsulfonyl group, an alkyl group having from 1 to 12 carbon atoms, which may have a substituent, or a phenyl or naphthyl group having from 6 to 16 carbon atoms, which may have a substituent; Y represents an oxygen atom, a sulfur atom, or $=NR^{22}$; $R^{22}$, $R^{23}$, and $R^{24}$ each independently represent an alkyl group having from 1 to 12 carbon atoms, which may have a substituent; $R^{23}$ and $R^{24}$ may be linked with each other to form a ring; $R^{25}$ and $R^{26}$each independently represent a hydrogen atom, a halogen atom, an alkyl group, an aryl group, a cyano group, an acyl group, an alkylsulfonyl group, or an arylsulfonyl group; $R^{27}$, $R^{28}$, and $R^{29}$ each independently represent a hydrogen atom, an alkyl group, an aryl group, a hydroxyl group, an alkoxy group, an aryloxy group, an amino group, a carboxylic acid amido group, a sulfonamido group, a cyano group, a halogen atom, an acyl group, an alkylsulfonyl group, or an arylsulfonyl group.

Of the compounds represented by formula (V-1), those represented by formula (V-2) shown below are preferable:

(V-2)

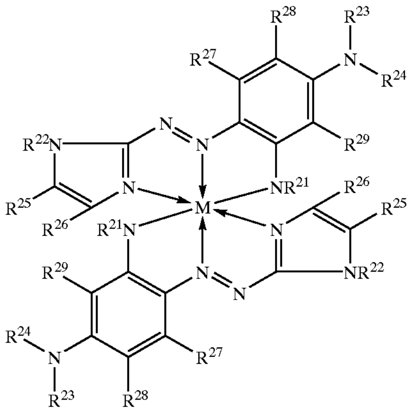

In formula (V-2), M should preferably represent iron, cobalt, or nickel. $R^{21}$ should preferably represent an alkylsulfonyl group having from 1 to 4 carbon atoms, which may have a substituent, or an arylsulfonyl group having from 6 to 10 carbon atoms, which may have a substituent. $R^{21}$ should more preferably represent an alkylsulfonyl group having from 1 to 4 carbon atoms, which is unsubstituted or substituted with a fluorine atom, (e.g., a methylsulfonyl group or a trifluoromethylsulfonyl group), or an unsubstituted arylsulfonyl group having from 6 to 10 carbon atoms (e.g., a phenylsulfonyl group). $R^{22}$, $R^{23}$, and $R^{24}$ should preferably each independently represent an alkyl group having from 1 to 4 carbon atoms, which may have a substituent. Preferable examples of the substituents for the alkyl group include a halogen atom, a hydroxyl group, a cyano group, an alkoxy group, an alkylthio group, an arylthio group, an acyl group, an alkylsulfoyl group, and an arylsulfonyl group. $R^{22}$, $R^{23}$, and $R^{24}$ should more preferably each independently represent an unsubstituted alkyl group having from 1 to 4 carbon atoms. It is also preferable that $R^{23}$ and $R^{24}$ are linked with each other to form a ring (e.g., a pyrrolidine ring or a morpholine ring). $R^{25}$ and $R^{26}$ should preferably each independently represent a cyano group, an acyl group, an alkylsulfonyl group, or an arylsulfonyl group. $R^{25}$ and $R^{26}$ should more preferably each represent a cyano group. $R^{27}$, $R^{28}$, and $R^{29}$ should preferably each independently represent a hydrogen atom, an alkyl group, an aryl group, a hydroxyl group, an alkoxy group, an aryloxy group, an amino group, a carboxylic acid amido group, or a sulfonamido group. $R^{27}$, $R^{28}$, and $R^{29}$ should more preferably each represent a hydrogen atom.

Examples of the metal complexes of the azo dyes, which may be utilized in the present invention, will be described hereinbelow.

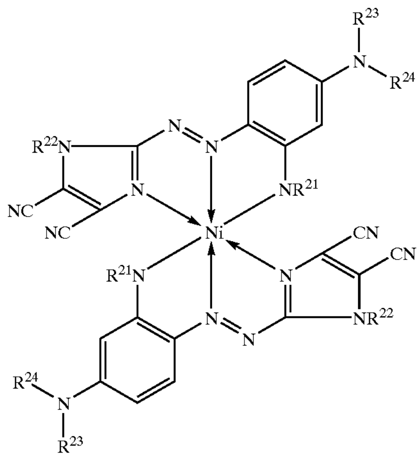

| No. | $R^{21}$ | $R^{22}$ | $R^{23}$ | $R^{24}$ |
|---|---|---|---|---|
| V-1 | $SO_2CF_3$ | $C_2H_5$ | $C_2H_5$ | $C_2H_5$ |
| V-2 | $SO_2CF_3$ | $n-C_4H_9$ | $C_2H_5$ | $C_2H_5$ |
| V-3 | $SO_2CF_3$ | $n-C_4H_9$ | $C_2H_4CN$ | $C_2H_5$ |

-continued

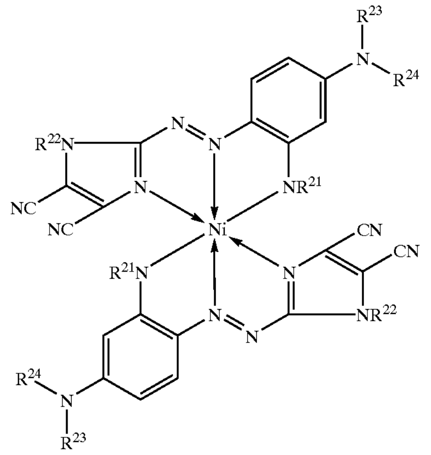

| No. | $R^{21}$ | $R^{22}$ | $R^{23}$ | $R^{24}$ |
|---|---|---|---|---|
| V-4 | $SO_2CF_3$ | $n-C_4H_9$ | $—(CH_2)_4—$ | * |
| V-5 | $SO_2CF_3$ | $n-C_4H_9$ | $—CH_2CH_2OCH_2CH_2—$ | ** |
| V-6 | $SO_2CF_3$ | $C_2H_5$ | $C_2H_5$ | $C_2H_5$ |
| V-7 | 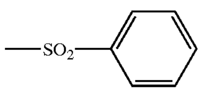 | $C_2H_5$ | $C_2H_5$ | $C_2H_5$ |
| V-8 | $SO_2CF_3$ | $C_2H_5$ | $CH_2CH_2OH$ | $C_2H_5$ |
| V-9 | $SO_2CF_3$ | $n-C_3H_7$ | $C_2H_5$ | $C_2H_5$ |
| V-10 | $SO_2CF_3$ | $CH_2CH_2OCH_3$ | $C_2H_5$ | $C_2H_5$ |

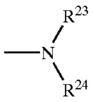

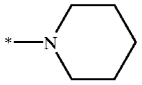

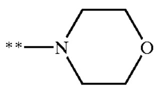

A process for preparing the metal complex of the azo dye represented by formula (V) is described in Japanese Unexamined Patent Publication No. 9(1997)-277703, particularly Examples 1 to 3 thereof.

In the present invention, an optical functional film constituted of an azo dye represented by formula (VI) shown below can also be utilized preferably.

(VI)

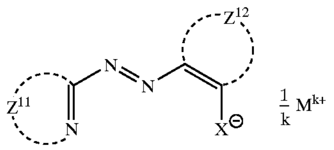

In formula (VI), k and M have the same meanings as those of k and M respectively, in formula (II-1) or formula (II-2) shown above. Also, x, $z^{11}$, and $Z^{12}$ have the same meanings as those of X, $Z^{11}$, $z^{12}$ respectively in formula (V).

Examples of the azo dyes represented by formula (VI) will be described hereinbelow.

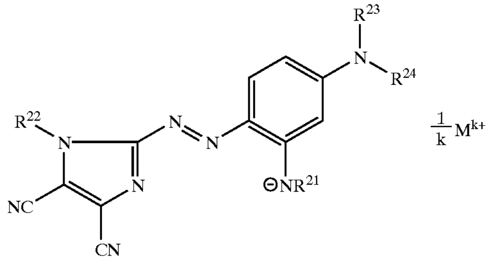

| No. | $R^{21}$ | $R^{22}$ | $R^{23}$ | $R^{24}$ | k | M |
|---|---|---|---|---|---|---|
| VI-1 | $SO_2CF_3$ | $C_2H_5$ | $C_2H_5$ | $C_2H_5$ | 2 | 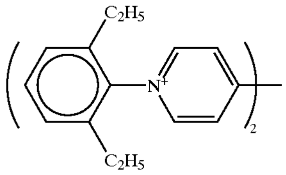 |
| VI-2 | $SO_2CF_3$ | $CH_3$ | $C_2H_5$ | $C_2H_5$ | 2 | 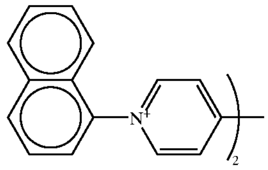 |
| VI-3 | $SO_2CF_3$ | $^{n}C_4H_9$ | $—CH_2CH_2OCH_2CH_2—$ | | 2 | 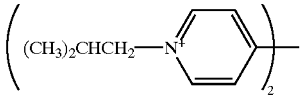 |
| VI-4 | $SO_2CF_3$ | $C_2H_5$ | $CH_2CH_2OH$ | $CH_2CH_2OH$ | 1 | $(n\text{-}C_4H_9)_4\overset{+}{N}$ |
| VI-5 | $SO_2CF_3$ | $CH_2CH_2OCH_3$ | $C_2H_5$ | $C_2H_5$ | 1 | 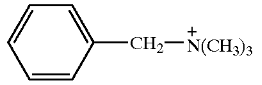 |

The azo compounds represented by formula (VI) can be synthesized with an azo coupling reaction of an aromatic diazonium in accordance with a conventional procedure.

In the invention, a high molecular weight compound may be used in combination to easily maintain the organic dye in an amorphous state without crystallization. Examples of the high molecular weight compound include a natural high molecular weight compound, such as gelatin, dextran, rosin and rubber; and a synthetic resin including a cellulose derivative, such as nitrocellulose, cellulose acetate and cellulose acetate butylate; a hydrocarbon series resin, such as polyethylene, polystyrene, polypropylene and polyisobutylene; a vinyl series resin, such as polyvinyl chloride, polyvinylidene chloride and a polyvinyl chloride-polyvinyl acetate copolymer; an acrylic resin, such as polyether, polyacrylamide, polymethyl acrylate and polymethyl methacrylate; and an initial polymerized product of a thermosetting resin, such as polyester, polyurethane, polyvinylalcohol, chlorinated polyolefin, an epoxy resin, a butyral resin, a rubber derivative and a phenol-formaldehyde resin.

The optical functional film employed in the present invention can be obtained by imparting one of the compounds represented by formulas (I) to (VI) shown above onto the metallic film with a conventional technique, such as spin coating, vacuum evaporation, or sputtering. The thickness of the optical functional film is adjusted so as to satisfy the conditions, under which the surface plasmon resonance occurs with light having a wavelength falling within the range of 350 nm to 2,000 nm. Ordinarily, the thickness of the optical functional film should preferably fall within the range of 10 nm to 1,000 nm.

The device comprising the dielectric block, the metallic film and the optical functional film, in which the surface plasmon resonance is excited, can be used in a novel optical memory device and a novel optical operation device.

That is, a first optical memory device according to the invention comprises

- a dielectric block arranged in such a manner that a driving light having a uniform intensity is incident on one plane thereof at a total reflection critical angle through an interior thereof,
- a metallic film formed over the one plane of the dielectric block,
- an optical functional film, a refractive index of which is changed by irradiation of light, formed over the metallic film in such a manner that the optical functional film is irradiated with a signal light subjected to space modulation, and an optical system making the driving light reflected on the one plane incident on the optical functional film.

The metallic film formed over the one plane of the dielectric block used herein includes not only a film formed directly on the one plane, but also a film formed over the one plane through another thin film. The same is applied to the optical functional film formed over the metallic film.

Figure 11A:
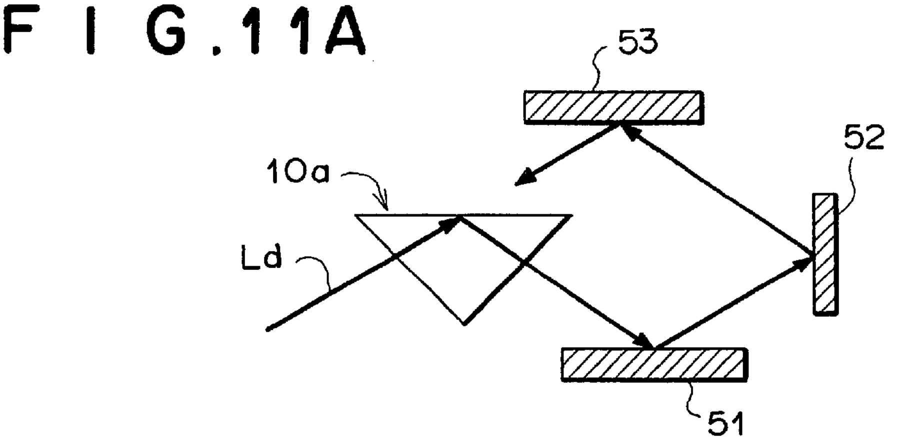
FIGS. 11A and 11B are schematic side views showing a still further embodiment of the optical oscillation circuit according to the invention.
Figure 11B:
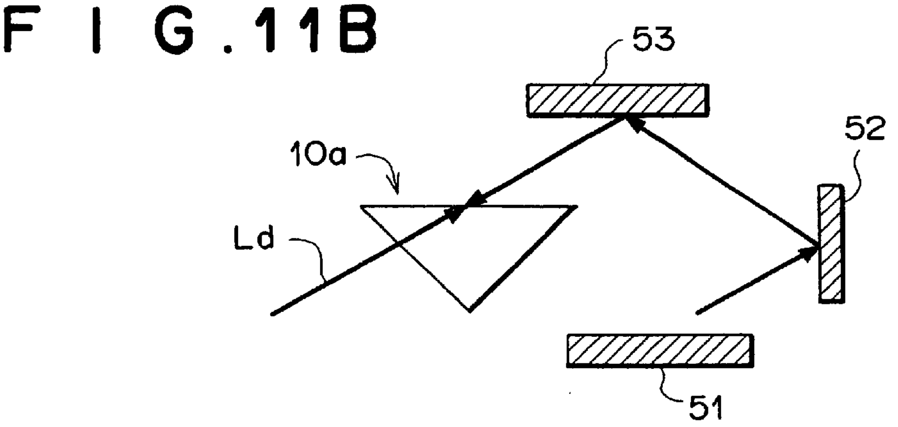

From the standpoint of the incident mode on the dielectric block, the driving light and the signal light correspond to the light to be modulated and the modulation driving light, respectively, in the optical modulation device shown in FIGS. 11A and 11B. In the invention, the status of space modulation of the signal light is stored as described later.

In the optical memory device having the constitution described above, it is preferred to provide light branching means, by which a part of the driving light reflected on the one plane of the dielectric block is taken out by branching.

A second optical memory device according to the invention comprises two of the devices each comprising the dielectric block, the metallic film and the optical functional film, and specifically comprises a first dielectric block arranged in such a manner that a driving light having a uniform intensity is incident on one plane thereof at a total reflection critical angle through an interior thereof, a first metallic film formed over the one plane of the first dielectric block, a first optical functional film, a refractive index of which is changed by irradiation of light, formed over the first metallic film in such a manner that the first optical functional film is irradiated with a signal light subjected to space modulation, a second dielectric block arranged in such a manner that the driving light reflected on the one plane of the first dielectric block is incident on one plane thereof at a total reflection critical angle through an interior thereof, a second metallic film formed over the one plane of the second dielectric block, a second optical functional film, a refractive index of which is changed by irradiation of light, formed over the second metallic film, and an optical system making the driving light reflected on the one plane of the second dielectric block incident on the first optical functional film.

In the second optical memory device, it is preferred to provide light branching means, by which a part of the driving light reflected on the one plane of the first dielectric block is taken out by branching.

In the first and second optical memory devices according to the invention, it is preferred that a signal light carrying image information is used as the space-modulated signal light. In this case, the image information carried on the signal light is stored.

In the optical operation device of the invention, it is preferred to use, as the optical functional films, a film comprising numeral micro-regions, which are two-dimensionally arranged, each comprising a group of plural parts, which are stepwise or continuously different from each other in the minimum intensity of irradiated light, by which change in refractive index occurs. By using such optical functional films, the difference between gradation images can also be determined by the manner described later.

The optical operation device according to the invention comprises two of the devices each comprising the dielectric block, the metallic film and the optical functional film, by which the difference in space modulation status of the signal lights incident on the optical functional films of the devices can be determined, and specifically comprises a first dielectric block arranged in such a manner that a driving light having a uniform intensity is incident on one plane thereof at a total reflection critical angle through an interior thereof, a first metallic film formed over the one plane of the first dielectric block, a first optical functional film, a refractive index of which is changed by irradiation of light, formed over the first metallic film in such a manner that the first optical functional film is irradiated with a first signal light subjected to space modulation, a second dielectric block arranged in such a manner that the driving light reflected on the one plane of the first dielectric block is incident on one plane thereof at a total reflection critical angle through an interior thereof, a second metallic film formed over the one plane of the second dielectric block, a second optical functional film, a refractive index of which is changed by irradiation of light, formed over the second metallic film in such a manner that the second optical functional film is irradiated with a second signal light subjected to space modulation, an optical system making the driving light reflected on the one plane of the second dielectric block incident on the first optical functional film, and light branching means for taking out a part of the driving light reflected on the one plane of the first dielectric block by branching.

In the optical operation device according to the invention, it is preferred to provide display means for displaying the space modulation status of the driving light taken out by the light branching means. In the optical operation device, a signal light carrying image information may be used as the space-modulated first and second signal lights, and in this case, the difference between the images can be determined.

In the optical operation device of the invention, it is preferred to use, as the optical functional films, a film comprising numeral micro-regions, which are two-dimensionally arranged, each comprising a group of plural parts, which are stepwise or continuously different from each other in the minimum intensity of irradiated light, by which change in reflective index occurs. By using such optical functional films, the difference between gradation images can also be determined by the manner described later.

Furthermore, in the optical operation device according to the invention, it is preferred to provide means for making the first signal light and the second signal light, being interchanged with each other, be incident on the first optical functional film and the second optical functional film.

As the material of the optical functional film of the first and second optical memory device and the optical operation device, the compounds represented by formulae (I) to (IV) are preferably employed.

In a metal, free electrons vibrate as groups to generate a compressional wave called a plasma wave. The quantized compressional wave formed on the metal surface is called a surface plasmon.

Figure 3:
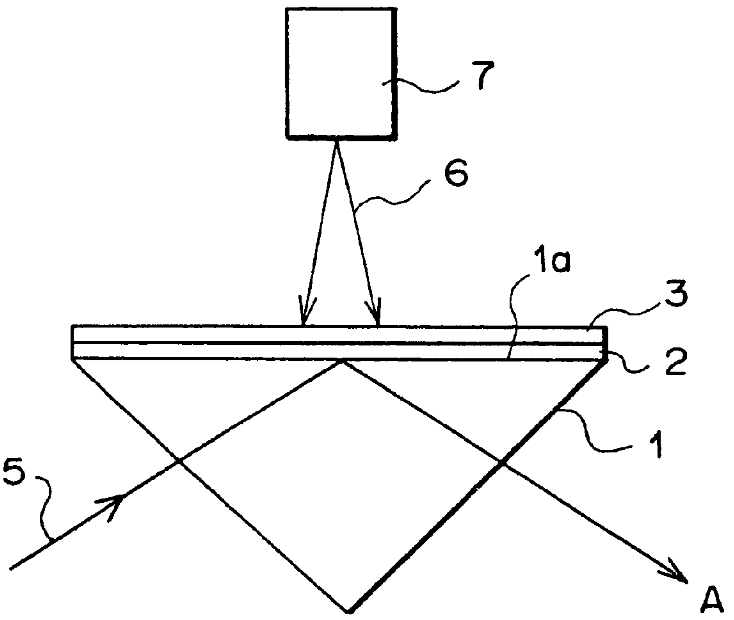
FIG. 3 is a schematic side view showing the conventional optical modulation device relating to the invention.

An optical modulation device modulating light by utilizing the phenomenon, in which the surf ace plasmon is excited by a light wave, has been conventionally studied. FIG. 3 shows the basic constitution of the optical modulation device. The optical modulation device basically comprises a dielectric block 1 arranged in such a manner that light to be modulated 5 is incident on one plane la thereof at a total reflection critical angle through an interior thereof, a metallic film 2 formed on the one plane 1*a* of the dielectric block 1, an optical functional film 3, the refractive index of which is changed by irradiation of light, formed on the metallic film 2, and a driving source 7 irradiating the optical function film 3 with modulation driving light 6.

In the constitution described above, the incident angle θ of the light to be modulated 5 with respect to the one plane 1*a* of the dielectric block 1 is set, for example, at such an angle that when optical functional film 3 is irradiated with the modulation driving light 6, a surface plasmon resonance is excited on the metallic film 2, and when not irradiated, a surface plasmon resonance is not excited.

By using such a configuration, in the states where the optical functional film 3 is not irradiated with the modulation driving light 6, the light to be modulated 5 is subjected to total reflection at the interface between the dielectric block 1 and the metallic film 2 to advance in the direction A. On the other hand, when the optical functional film 3 is irradiated with the modulation driving light 6, a surface plasmon resonance is excited on the metallic film 2 to cancel the total reflection, and thus the reflected light amount of the light to be modulated 5 is considerably decreased or becomes completely zero. According to the procedures, the light to be modulated 5 advancing in the direction A can be modulated by controlling the irradiation of the modulation driving light 6.

The optical logic device according to the invention is obtained by paying attention to the optical switching function of the optical modulation device, and in the optical logic device 10*a* of the mode a shown in FIGS. 1A and 1B, the incident angle θ of the driving light Ld with respect to the one plane 1*a* of the dielectric block 1 is set at an angle, at which when the optical functional film 3 is irradiated with the control light Lc, surface plasmon resonance is relatively strongly excited on the metallic film 2, and when not irradiated, surface plasmon resonance is relatively weakly excited or is not excited.

In the optical logic device 10*a* of the mode a, as shown in FIG. 1A, when the optical functional film 3 is not irradiated with the control light Lc, the driving light Ld is strongly reflected as total reflection at the interface between the dielectric block 1 and the metallic film 2. On the contrary, as shown in FIG. 1B, when the optical functional film 3 is irradiated with the control light Lc, the total reflection is cancelled, and the driving light Ld is not reflected at all at the interface or is slightly reflected at the interface.

Figure 2B:
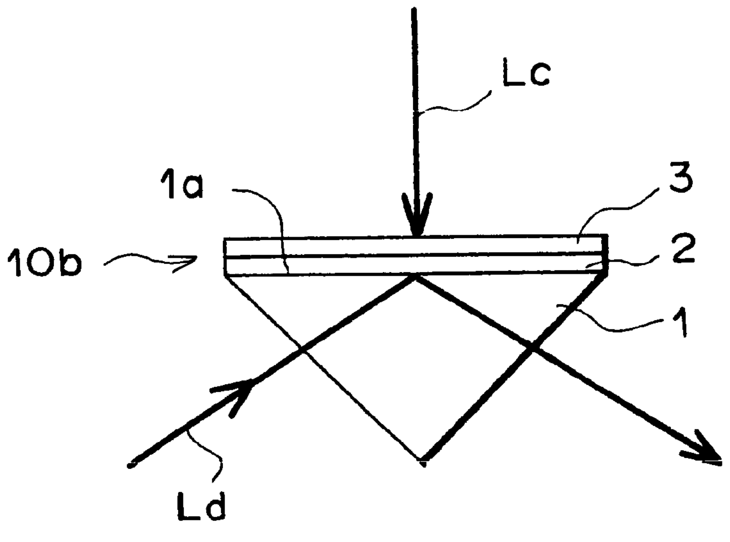

On the other hand, in the optical logic device 10*b* of the mode b shown in FIGS. 2A and 2B, the incident angle of the driving light Ld with respect to the one plane 1*a* of the dielectric block 1 is set at an angle, at which when the optical functional film 3 is not irradiated with the control light Lc, surface plasmon resonance is relatively strongly excited on the metallic film 2, and when irradiated, surface plasmon resonance is relatively weakly excited or is not excited.

In the optical logic device 10*b* of the mode b, as shown in FIG. 2A, when the optical functional film 3 is not irradiated with the control light Lc, the total reflection is cancelled, and the driving light Ld is not reflected at all at the interface or is slightly reflected at the interface, and on the contrary, as shown in FIG. 2B, when the optical functional film 3 is irradiated with the control light Lc, the driving light Ld is strongly reflected as total reflection at the interface.

As described in the foregoing, in the optical logic device 10*a* of the mode a and the optical logic device 10*b* of the mode b, because the status of the driving light Ld emitted from the device is changed corresponding to the control light Lc incident or not incident, the control light Lc or the driving light Ld before being incident on the one plane 1*a* of the dielectric block 1 is used as input light for logic operation, and thus various types of logic operation can be conducted by using a single optical logic device or a combination of a plurality thereof.

Because the status of the driving light Ld emitted from the device is changed corresponding to the control light Lc incident or not incident as described above, by making the driving light Ld emitted from one optical logic device incident on the optical functional film of the device or incident on the optical functional film of another device, the state where the driving light Ld is emitted from the optical logic device and the state where the light is not emitted can be automatically switched. That is, an optical oscillation circuit that enables self-excited oscillation can be constituted with the sole optical logic device or a combination of a plurality thereof.

Because the constitution of the optical logic device according to the invention is extremely simple, it can be fabricated at a low cost, and therefore, the optical logic circuit and the optical oscillation circuit according to the invention comprising the optical logic device can also be fabricated at a low cost.

Because the optical logic device according to the invention conducts an optical switching function by utilizing a high speed response of chemical substances, the optical logic circuit of the invention using the optical logic device can perform a high speed operation, and the optical oscillation circuit of the invention using the optical logic device can be oscillated at an extremely high frequency with an extremely short oscillation cycle.

Figure 13A:
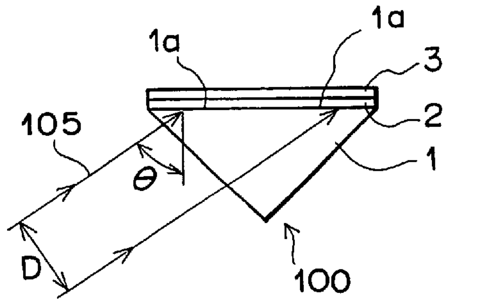
FIGS. 13A to 13C are schematic diagrams showing an optical memory device as the first embodiment of the invention.
Figure 13B:
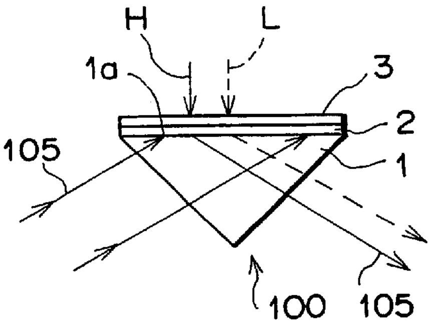
Figure 13C:
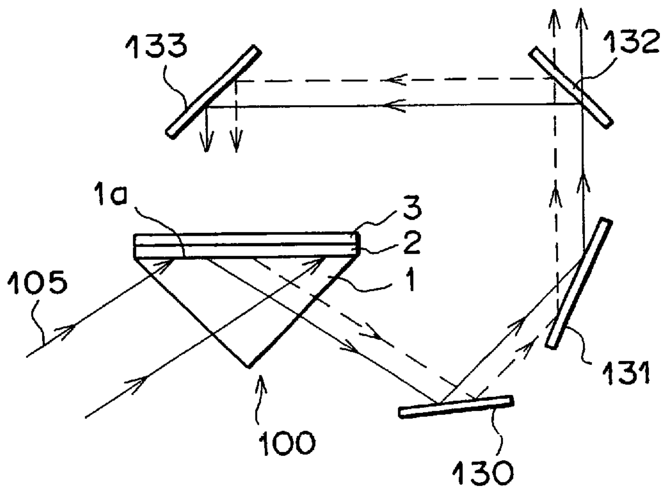

The function and the effect of the first optical memory device according to the invention will be described with reference to FIGS. 13A to 13C. In FIGS. 13A to 13C, the equivalent components described with reference to FIG. 23 have the same numbers attached as in FIG. 23, and the descriptions thereof are omitted unless they are particularly necessary (the same also applies to the following).

A surface plasmon device 100 comprises a dielectric block 1, a metallic film 2 and an optical functional film 3, which are the same as those described in the foregoing. A driving light 105 having a beam width D is introduced into the surface plasmon device 100 in such a manner that the driving light is introduced through the interior of the dielectric block 1 and is subjected to total reflection at one plane 1*a* thereof. The incident angle θ of the driving light 105 with respect to the one plane 1*a* of the dielectric block 1 is set, for example, at such an angle that when the optical functional film 3 is not irradiated with a signal light H described later, a surface plasmon resonance is excited on the metallic film 2, and when it is irradiated, the surface plasmon resonance is not excited.

By using such a configuration, as shown in FIG. 13A, when the optical functional film 3 is not irradiated with the signal light H, the surface plasmon resonance is excited to cancel the total reflection of the driving light 105, and the reflected light amount becomes substantially zero.

Starting from the situation when the optical functional film 3 is irradiated with the signal light H as shown in FIG. 13B, the surface plasmon resonance is not excited at the region of the metallic film 2 corresponding to the irradiated part, and thus the driving light 105 is subjected to total reflection at the interface between the region of the metallic film 2 and the dielectric block 1. On the other hand, the surface plasmon resonance continues to be excited at the region of the metallic film 2 corresponding to the non-irradiated part with the signal light, and the total reflection of the driving light 105 is kept cancelled.

The arrow L in FIG. 13B shows that the driving light 105 may be incident on that position depending on the state of modulation. In other words for convenience, assuming that the signal light L is emitted from, for example, various projectors to carry binary image information, the position of the arrow H corresponds to one pixel that is of high luminance (low density), and the position of the arrow L corresponds to another pixel that is of low luminance (high density). The broken line drawn in parallel to the driving light 105 subjected to total reflection means that when the signal light L is incident on the position of the arrow L, driving light 105 is generated advancing along the broken line.

As shown in FIG. 13C, when the driving light 105 subjected to total reflection is incident on the optical functional film 3 by the optical system comprising mirrors 130, 131 and 133 and a half mirror 132 (which are omitted in FIGS. 13A and 13B), the situation where the signal light H is incident in FIG. 13B can be reproduced by using the driving light 105.

That is, the function of making the driving light 105 subject to total reflection performed by the signal light H can be then performed by the driving light 105 itself. Therefore, even when the signal light H is terminated, the modulation status of the signal light is maintained by utilizing the driving light 105. Accordingly, the modulation status of the signal light can be stored by the device.

In this example, because a part of the driving light 105 reflected at the one plane 1*a* of the dielectric block 1 is taken out from the half mirror 132, the stored modulation status of the signal light can be confirmed by observing the light thus taken out. In order to reset the stored status to the initial status, the irradiation of the driving light 105 is terminated just for an instant.

Figure 14A:
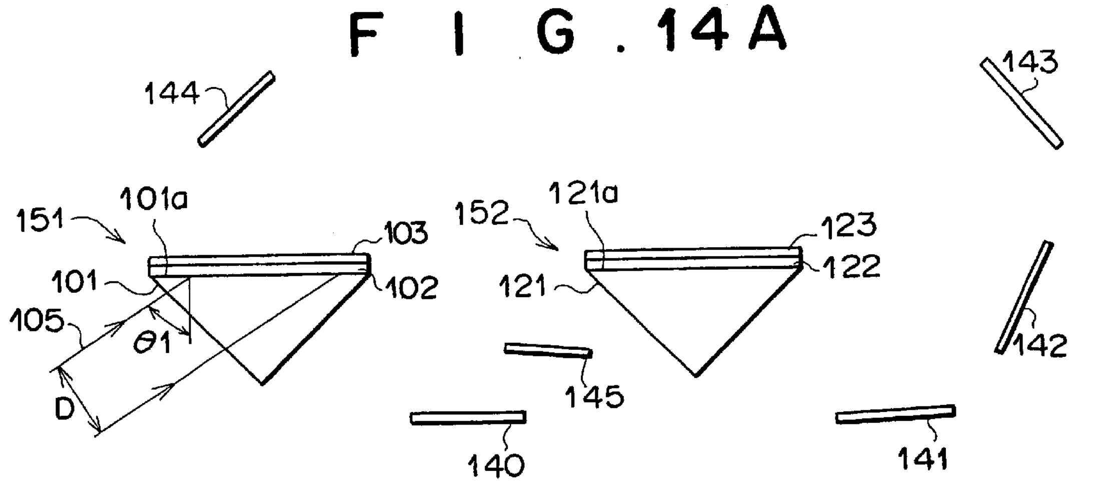
FIGS. 14A to 14C are schematic diagrams showing an optical memory device as the second embodiment of the invention.

The function and the effect of the second optical memory device according to the invention will be described with reference to FIGS. 14A to 14C. In the second optical memory device, a first surface plasmon device 151 and a second surface plasmon device 152 are used, both of which have the same constitution as the surface plasmon device 100 shown in FIGS. 13A to 13C. The first surface plasmon device 151 performs completely the same function as the surface plasmon device 100 of FIGS. 13A to 13C. That is, in the case where a driving light 105 is incident on one plane 101*a* of a dielectric block 101 at an incident angle θ1, when an optical functional film 103 is not irradiated with a signal light H, a surface plasmon resonance is excited on a metallic film 102, and thus the total reflection of the driving light 105 is cancelled as shown in FIG. 14A.

Figure 14B:
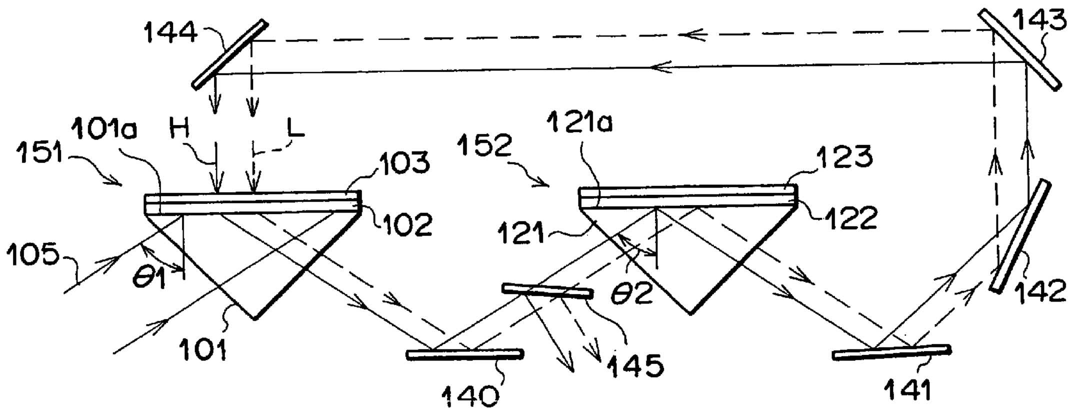

When the optical functional film 103 is irradiated with the signal light H as shown in FIG. 14B, the surface plasmon resonance is not excited, and the driving light 105 is subjected to total reflection. The driving light 105 subjected to total reflection is reflected by a mirror 140, and is incident on one plane 121*a* of a dielectric block 121 of the second surface plasmon device 152 at an incident angle of θ2.

In contrast with the first surface plasmon device 152, the second plasmon device 151 is configured in such a manner that when the driving light 105 is incident according to the manner described above, the surface plasmon resonance is not excited on a metallic film 122 unless an optical functional film 123 is irradiated with a reset light 106 described later. Therefore, when the optical functional film 123 is not irradiated with the reset light 106, the driving light 105 is subjected to total reflection at the interface between the dielectric block 121 and the metallic film 122.

The driving light 105 subjected to total reflection is guided by an optical system comprising mirrors 141, 142, 143 and 144 to be incident on the optical functional film 103 of the first surface plasmon device 151. That is, in the first surface plasmon device 151, the same status as the surface plasmon device 100 in FIG. 13C is obtained, and thus even when the signal light H is terminated, the modulation status of the signal light is continuously stored by utilizing the driving light 105. Accordingly, the modulation status of the signal light can also be stored in this device.

A half mirror 145 is arranged between the mirror 140 and the second surface plasmon device 152. Since a part of the driving light 105 is taken out by branching from the half mirror 145, the stored modulation status of the signal light can be confirmed by observing the light thus taken out.

Figure 14C:
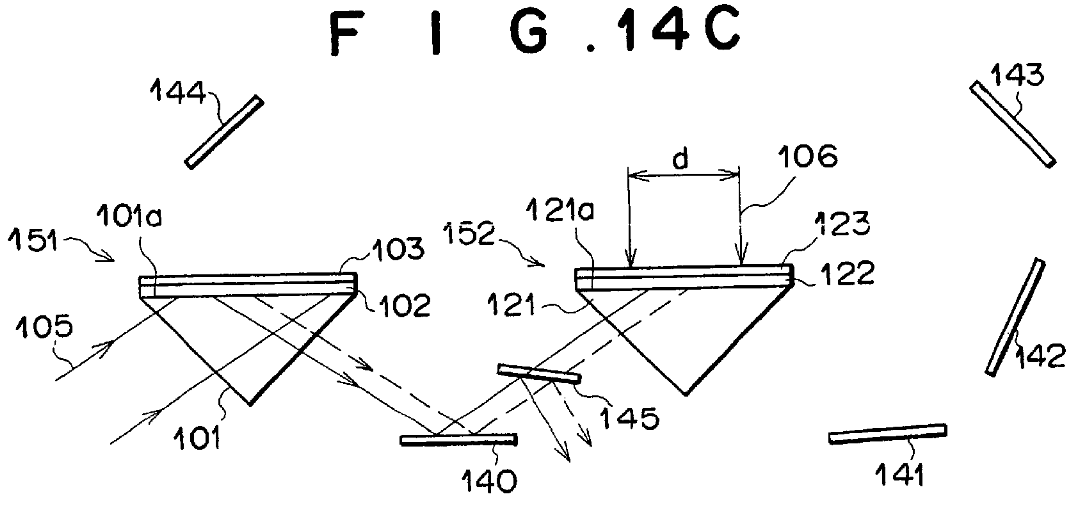

Starting from the situation where the optical functional film 123 of the second surface plasmon device 152 is irradiated with the reset light 106 as shown in FIG. 14C, the surface plasmon resonance is excited on the metallic film 122 to cancel the total reflection of the driving light 105. After this step, the driving light 105 is not incident on the optical functional film 103 of the first surface plasmon device 151, and the total reflection of the driving light 105 in the first surface plasmon device 151 is also cancelled. That is, the system is restored to the status in FIG. 14A.

As described in the foregoing, in the second optical memory device, the device can be reset to the initial status by irradiating the second surface plasmon device 152 with the reset light 106.

The function and the effect of the optical operation device according to the invention will be described with reference to FIGS. 15A to 15C. In this optical operation device, an optical functional film 123 is irradiated with a second signal light H2 subjected to space modulation, instead of the reset light 106 described above.

Figure 15A:
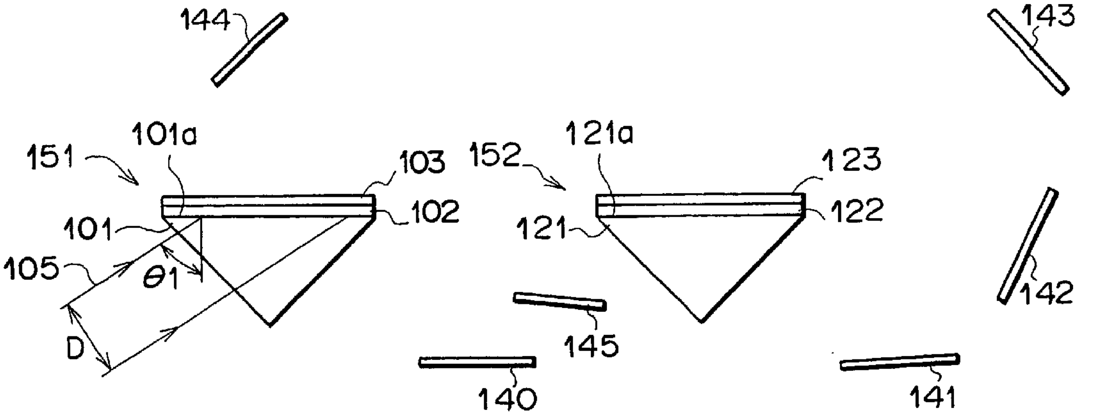
FIGS. 15A to 15C are schematic diagrams showing an optical operation device as the third embodiment of the invention.
Figure 15B:
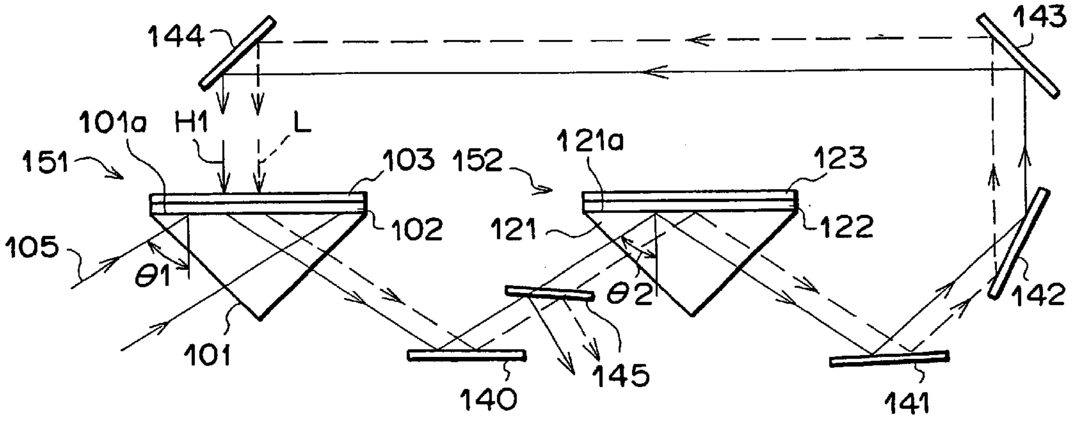

FIGS. 15A and 15B show the same kinds of state as in FIGS. 14A and 14B, respectively. In the states shown in FIG. 15B, i.e., the states where the space modulation status caused by a first signal light H1is stored, an optical functional film 123 of the second surface plasmon device 152 is irradiated with a second signal light H2 subjected to space modulation. Then, a surface plasmon resonance is excited in the region of a metallic film 122 corresponding to the irradiated part, and the total reflection of the driving light 105 is cancelled at the interface between the region of the metallic film 122 and the dielectric block 121. On the other hand, in the region of the metallic film 122 corresponding to the non-irradiated part of the optical functional film 123, the surface plasmon resonance is not excited, and thus the total reflection of the driving light 105 is not cancelled.

It is clear from the description above that when the space modulation status of the first signal light H1 once stored completely agrees with the space modulation status of the second signal light H2, the total reflection of the driving light 105 in the second surface plasmon device 152 completely disappears. Therefore, the driving light 105 is not incident on the optical functional film 103 of the first surface plasmon device 151, and the total reflection of the driving light 105 in the first surface plasmon device 151 also completely disappears.

In the case where the driving light 105 is not observed at all on monitoring the driving light 105 taken out by branching by the half mirror 145, it can be determined that there is no difference between the space modulation status of the first signal light H1 and the space modulation status of the second signal light H2, i.e., both of them agree with each other.

In the case where the first signal light H1 and the second signal light H2 are emitted from, for example, various projectors to carry binary image information, it can be determined whether the images are identical or not.

In order to monitor the driving light 105 partly taken out by branching with the half mirror 145, it is preferred that an image pickup device 80 comprising a CCD or the like is arranged to receive the driving light 105, and an image is displayed by image displaying means 81, such as a CRT, based on the output of the image pickup device.

Figure 15C:
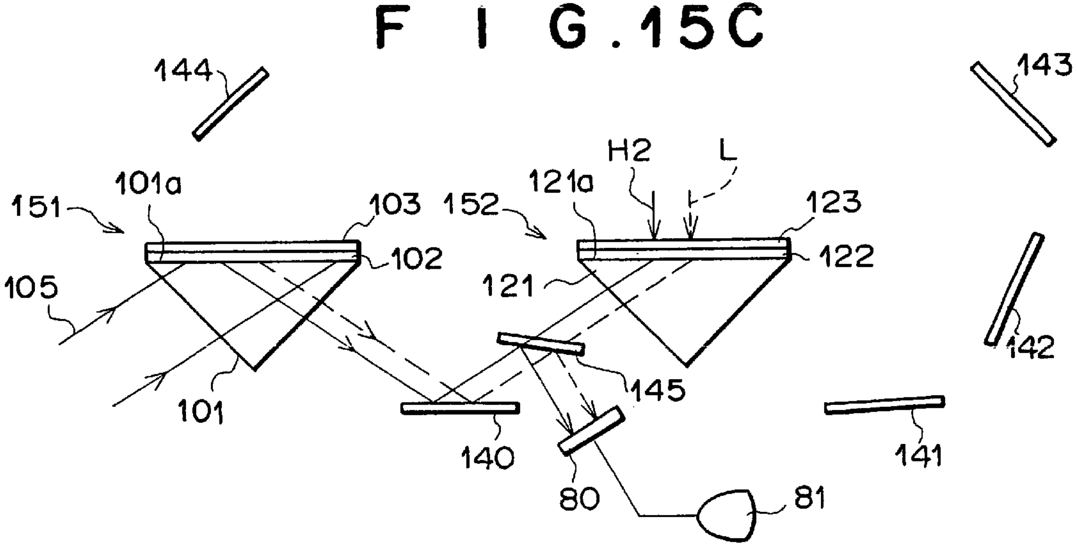
Figure 16A:
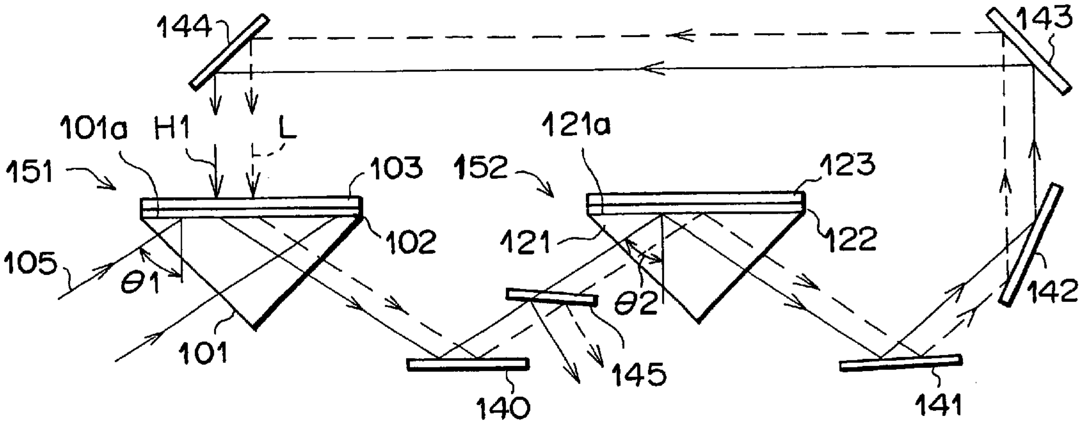
FIGS. 16A and 16B are schematic diagrams showing another status of the optical operation device of FIGS. 15A to 15C.
Figure 16B:
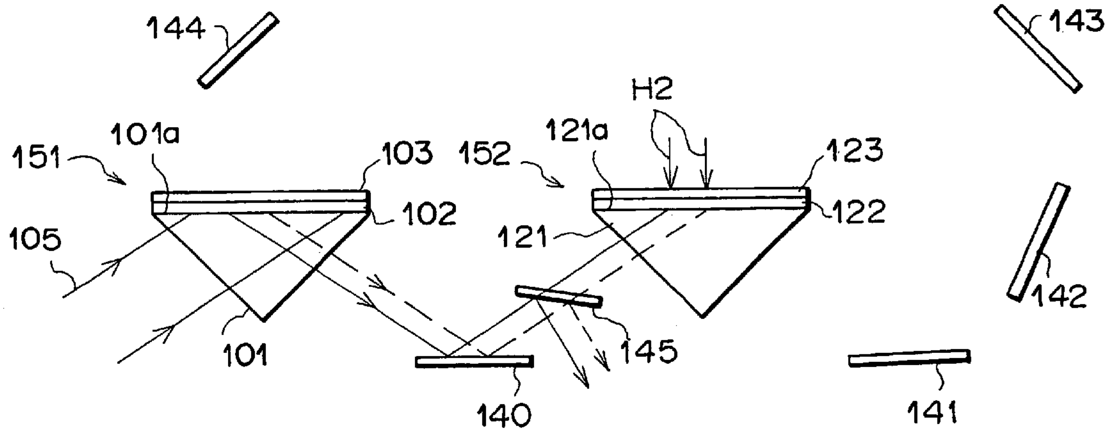

The case where, starting from the state of FIG. 15B, the signal light is incident at the position indicated with the arrow L in FIG. 15C will be considered. The state is shown in FIGS. 16A and 16B. At this time, the space modulation status of the second signal light H2 is not the same as the space modulation status of the first signal light H1. In the case where there is such a difference, i.e., the signal light is incident on the side of the second signal light H2 at the position, at which the first signal light is not incident on the side of the first signal light H1, the situation occurs where no driving light 105 is observed at all through the half mirror 145, and thus it is possible to erroneously determine that there is no difference between the two space modulation statuses.

Figure 17A:
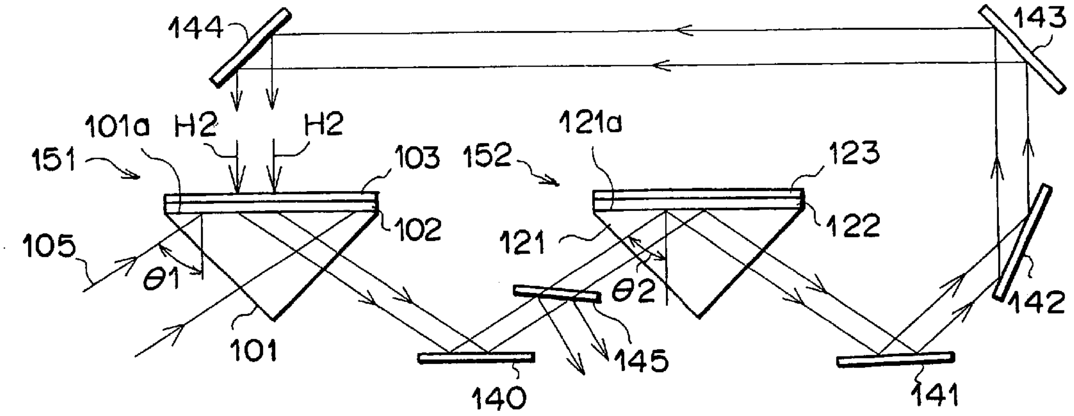
FIGS. 17A to 17C are schematic diagrams showing a further status of the optical operation device of FIGS. 15A to 15C.
Figure 17B:
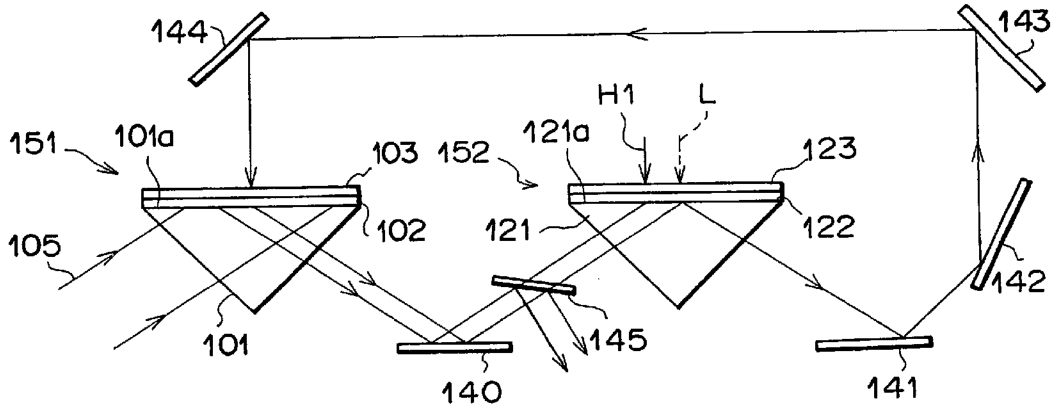
Figure 17C:
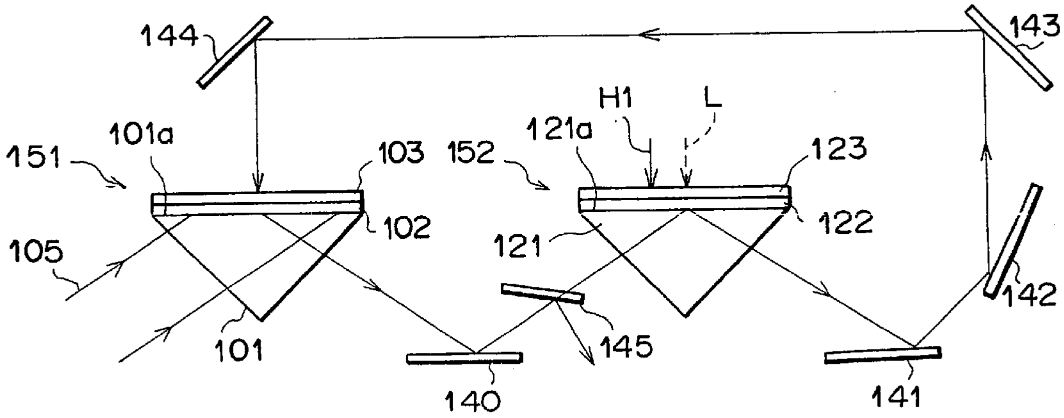

In the case where the optical operation device according to the invention has means for interchanging the first signal light and the second signal light to be incident on the first optical functional film and the second optical functional film, such an erroneous determination can be prevented. That is, the driving light 105 is observed through the half mirror 145 after conducting the interchanging, and the driving light 105 is observed corresponding to the part, at which the difference in modulation status is present, as shown in FIGS. 17A to 17C.

Furthermore, in the optical operation device according to the invention, when an optical functional film comprising numerous micro-regions, which are two-dimensionally arranged, each comprising a group of plural parts, which are stepwise or continuously different from each other in the minimum intensity of irradiated light, by which change in reflective index occurs, the difference between gradation images can also be determined. This will be described in detail below.

FIG. 18 shows an optical functional film 63 having the function described above. The optical functional film 63 comprises numerous micro-regions 63A, each of which are the minimum unit for displaying gradation (one pixel), arranged two-dimensionally. Each micro-region 63A comprises 16 (=4×4) parts 63*p* as shown in the enlarged view. The 16 parts 63*p* are formed to have the minimum intensities of irradiated light, by which change in reflective index occurs, which are stepwise different from each other.

In the case where the optical functional film 63 is used instead of the optical functional film 103 in FIGS. 15A to 15C, when the signal light H1 incident on the micro-region 63A is of a relatively high intensity, the reflective index of many parts 63*p* of the micro-region 63A is changed. Thus, in the region of the metallic film 102 corresponding to the micro-region 63A, the driving light 105 is reflected on a broad part. On the other hand, when the signal light H1 incident on the micro-region 63A is of a relatively low intensity, the reflective index of only a few parts 63*p* of the micro-region 63A is changed. Accordingly, in the region of the metallic film 102 corresponding to the micro-region 63A, the driving light 105 is reflected only on a narrow part.

According to the procedures described above, because display of gradation can be conducted with the micro-region 63A as a unit by controlling the reflected light amount of the driving light 105 by the micro-region 63A as a unit, a gradation image can be stored, and a difference between two gradation images can be determined.

In order for gradation display, an optical functional film 73 is also effective, the schematic side view of which is shown in FIG. 19. The optical functional film 73 also comprises numerous micro-regions 73A, each of which is the minimum unit for displaying gradation (one pixel), arranged two-dimensionally. Each micro-region 73A is formed, for example, of a material for which the larger the height, the larger the minimum irradiation light intensity at which change in reflective index occurs, with a profile where the height thereof is continuously changed in the one-dimensional or two-dimensional direction within the film surface.

Similar to the case using the optical functional film 63, when the optical functional film 73 is used, because display gradation can be conducted with the micro-region 73A as a unit by controlling the reflected light amount by the micro-region 73A as a unit, a gradation image can be stored, and a difference between two gradation images can be determined. In this case, furthermore, the reflected light amount can be continuously controlled.

Embodiments of the invention will be described in more detail with reference to the drawings. FIGS. 1A and 1B show a schematic side view of an optical logic device 10*a* as a first embodiment of the invention. The optical logic device 10*a* is of the mode a, and comprises a dielectric block 1 having a prism shape arranged in such a manner that a driving light Ld is incident on one plane 1*a* thereof at a total reflection critical angle through an interior thereof, a metallic film 2 formed over the one plane 1*a* of the dielectric block 1, and an optical functional film 3, a refractive index of which is changed by irradiation of light, formed over the metallic film 2.

In this embodiment, the driving light Ld is linearly polarized light having a wavelength of 680 nm, and the dielectric block 1 is arranged in such a manner that the driving light Ld is incident on the one plane 1*a* thereof as P wave polarized light. The dielectric block 1 comprises glass having a high refractive index, and the refractive index thereof at a wavelength of 680 nm is 2.05. The metallic film 2 comprises Au, for example, and the film thickness thereof is 15 nm.

The optical functional film 3 can be preferably formed by using one of the materials described in detail in the foregoing. In this embodiment, the optical functional film 3 comprises a dye having a refractive index n at a wavelength of 680 nm being 1.60 on non-irradiation of the control light Lc having a wavelength of 532 nm, and being 1.61 on irradiation of the control light Lc.

Figure 12:
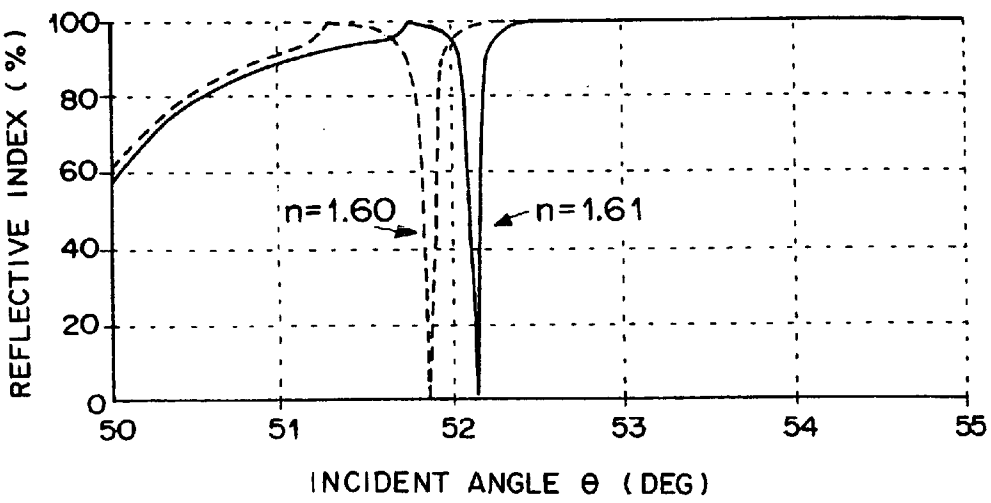
FIG. 12 is a graph showing the relationship between the incident angle θ of a driving light with respect to the interface between the dielectric block and the metallic film and the reflective index at the interface, in the optical logic device of FIG. 1.

The function of the optical logic device 10*a* will be described. The refractive index n of the optical functional film 3 at a wavelength of 680 nm is 1.60 on non-irradiation of the control light Lc and is 1.61 on irradiation of the control light Lc. The relationship between the incident angle θ of the driving light Ld with respect to the interface between the dielectric block 1 and the metallic film 2 and the reflective index is shown by the broken line and the solid line in FIG. 12 for the cases of a refractive index n of the optical functional film 3 of 1.60 and 1.61, respectively.

The incident angle θ is set at 52.2° in this example. Therefore, the reflective index becomes substantially 100% under the condition where the optical functional film 3 is not irradiated with the control light Lc (the refractive index n is 1.60), whereas the reflective index becomes substantially 0% under the condition where the optical functional film 3 is irradiated with the control light Lc (the refractive index n is 1.61). Accordingly, the driving light Ld is reflected or is not reflected depending on whether the control light Lc is not incident or incident. FIG. 1A shows the state where the optical functional film 3 is not irradiated at all with the control light Lc, and FIG. 1B shows the state where the optical functional film 3 is irradiated with the control light Lc.

When the control light Lc or the driving light Ld before being incident on the one plane 1*a* of the dielectric block 1 is used as input light and the driving light Ld emitted from an optical logic device 10*a* is used as output light, various types of logic operation can be conducted by a single optical logic device 10*a* or a combination of a plurality thereof.

The inventors prepared the optical logic device having the constitution shown in FIG. 1A, in which the optical functional film was formed from the compound shown below to a thickness of 160 nm with spin coating. It was confirmed that logical operations can be performed with the prepared optical logic device.

TABLE 4

| Compound | Wavelength of control light | Wavelength of driving light |
|---|---|---|
| A. Compound of formula (I) in which the dye part is A-1 and the bispyridinium part is B-1 | 680 nm | 780 nm |
| B. Mixture of B-16 of formula (III) and A-4 of formula (IV) in a ratio of 100:15 | 633 nm | 780 nm |
| C. Compound VI-1 | 532 nm | 680 nm |
| D. Formula (II), 26 | 680 nm | 780 nm |

A second embodiment of the invention will be described. FIGS. 2A and 2B show a schematic side view of an optical logic device 10*b* as the second embodiment of the invention. The optical logic device 10*b* is of the mode b, and comprises the dielectric block 1, a metallic film 2, and an optical functional film 3, which are the same as in FIGS. 1A and 1B.

In this case also, the refractive index n of the optical functional film 3 at a wavelength of 680 nm is 1.60 or 1.61 on non-irradiation or irradiation of the control light Lc. The relationship between the incident angle θ of the driving light Ld with respect to the interface between the dielectric block 1 and the metallic film 2 and the reflective index is shown by the broken line and the solid line in FIG. 12 for the cases of a refractive index n of the optical functional film 3 of 1.60 and 1.61, respectively.

The incident angle θ is set at 51.8° in this example. Therefore, the reflective index becomes substantially 0% under the condition where the optical functional film 3 is not irradiated with the control light Lc (the refractive index n is 1.60), whereas the reflective index becomes substantially 100% under the condition where the optical functional film 3 is irradiated with the control light Lc (the refractive index n is 1.61). Accordingly, the driving light Ld is not reflected or is reflected depending on whether the control light Lc is not incident or incident. FIG. 2A shows the state where the optical functional film 3 is not irradiated at all with the control light Lc, and FIG. 2B shows the state where the optical functional film 3 is irradiated with the control light Lc.

When the control light Lc or the driving light Ld before being incident on the one plane 1*a* of the dielectric block 1 is used as input light and the driving light Ld emitted from an optical logic device 10*b* is used as output light, various types of logic operation can be conducted by a single optical logic device 10*b* or a combination of a plurality thereof.

Embodiments of optical logic circuits utilizing the optical logic device 10*a* and the optical logic device 10*b* will be described with reference to FIG. 4A to FIG. 7D.

In FIG. 4A to FIG. 7D, since the detailed constitutions of the optical logic devices 10*a* and 10*b* are the same as those shown in FIGS. 1A to 2B, the detailed constitutions thereof are omitted from the figures, but the optical logic devices 10*a* and 10*b* are indicated with simple isosceles triangles (which are the same as in FIG. 8A to FIG. 11B). In FIGS. 4A to 7D, input light is indicated with letters I, I1 and I2 in circles, and output light is indicated with a letter O in a circle.

An NOT circuit shown in FIGS. 4A and 4B will be described. An optical logic device 10*a* of the mode a is used herein, and a driving light Ld is incident thereon (specifically, on the one plane 1*a* of the dielectric block 1). A control light Lc is incident on the optical logic device 10*a* (specifically, on the optical functional film 3) with the capability of being freely terminated.

In this embodiment, the control light Lc functions as only one input light I. In the optical logic device 10*a* of the mode a, the output light O (the driving light Ld subjected to total reflection) is emitted when the input light I is not incident as shown in FIG. 4A, and the output light O is not emitted when the input light I is incident as shown in FIG. 4B. That is, when the presence of the input light I and the output light O is indicated as 1, and the absence thereof is indicated as 0, the input condition of 0 provides the output condition of 1, whereas the input condition of 1 provides the output condition of 0, so as to constitute a NOT circuit.

An exNOR circuit shown in FIGS. 5A to 5D will be described. An optical logic device 10*a* of the mode a is used herein, and the driving light Ld is incident thereon. Two control lights Lc are incident on the optical logic device 10*a* with the capability of being freely terminated.

Figure 5A:
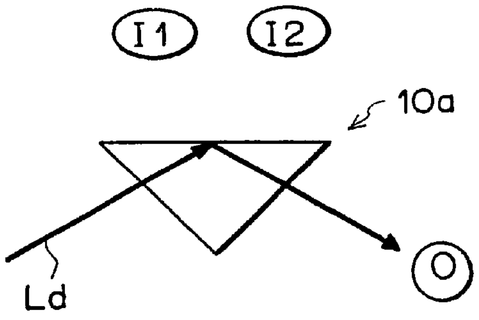
FIGS. 5A to 5D are schematic side views showing another embodiment of the optical logic circuit according to the invention.
Figure 5B:
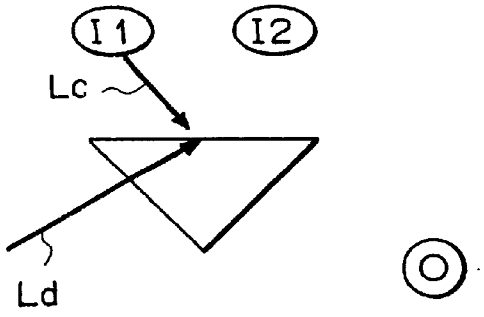
Figure 5C:
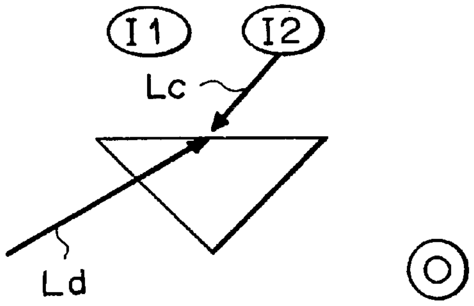
Figure 5D:
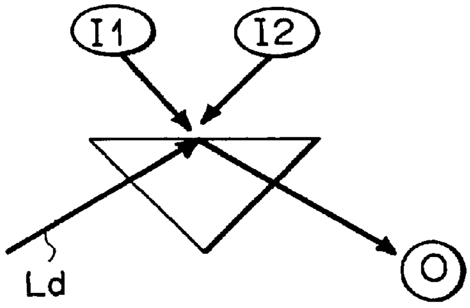

In this embodiment, the two control lights Lc function as input lights I1 and I2. In the optical logic device 10*a* of the mode a, the output light O (the driving light Ld subjected to total reflection) is emitted when the input lights I1 and I2 are not incident as shown in FIG. 5A, and the output light O is not emitted when only one of the input lights I1 and I2 is incident as shown in FIGS. 5B and 5C. When both the input lights I1 and I2 are incident, the output light O is emitted since the condition of the cancellation of the total reflection is broken due to the intensity of the control light being too high.

That is, when the presence of the input lights I1 and I2 and the output light O is indicated as 1, and the absence thereof is indicated as 0, the input condition of 0 and 0 provides the output condition of 1, the input condition of 1 and 0 provides the output condition of 0, the input condition of 0 and 1 provides the output condition of 0, and the input condition of 1 and 1 provides the output condition of 1, so as to constitute an exNOR circuit.

An AND circuit shown in FIGS. 6A to 6D will be described. An optical logic device 10*b* of the mode b is used herein, and the driving light Ld and one control light Lc are incident thereon with the capability of being freely terminated.

Figure 6A:
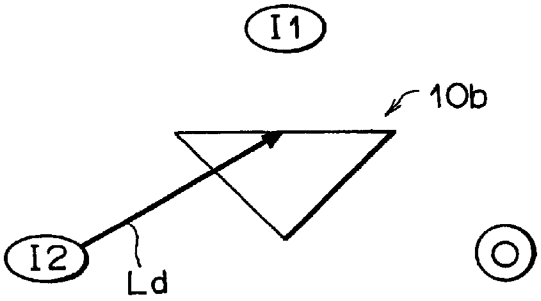
FIGS. 6A to 6D are schematic side views showing a further embodiment of the optical logic circuit according to the invention.
Figure 6B:
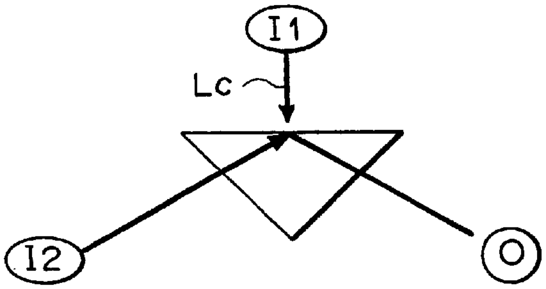
Figure 6C:
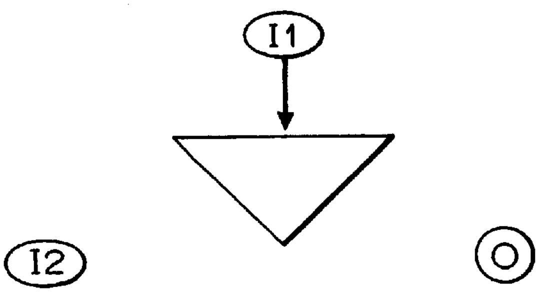
Figure 6D:
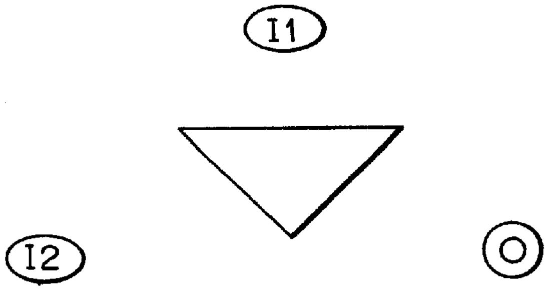

In this embodiment, the control light Lc functions as an input lights I1, and the driving light Ld functions as an input light I2. In the optical logic device 10*b* of the mode b, the output light O (the driving light Ld subjected to total reflection) is emitted when both the input lights I1 and I2 are incident as shown in FIG. 6B, and the output light O is not emitted when at least one of the input lights I1 and I2 is not incident as shown in FIGS. 6A, 6C and 6D.

That is, when the presence of the input lights I1 and I2 and the output light O is indicated as 1, and the absence thereof is indicated as 0, the input conditions of 0 and 0, 0 and 1, and 1 and 0 provide the output condition of 0, and the input condition of 1 and 1 provides the output condition of 1, so as to constitute an AND circuit.

An OR circuit shown in FIGS. 7A to 7D will be described. An optical logic device 10*b* of the mode b is used herein, and the driving light Ld is incident thereon. Two control lights Lc are incident on the optical logic device 10*b* with the capability of being freely terminated.

Figure 7A:
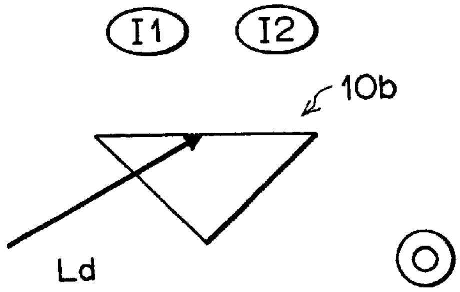
FIGS. 7A to 7D are schematic side views showing a still further embodiment of the optical logic circuit according to the invention.
Figure 7B:
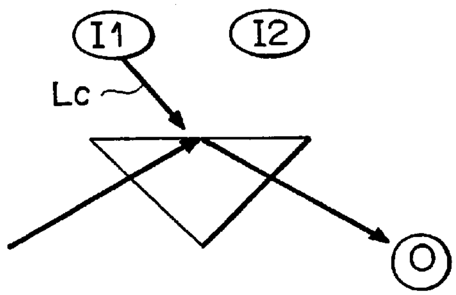
Figure 7C:
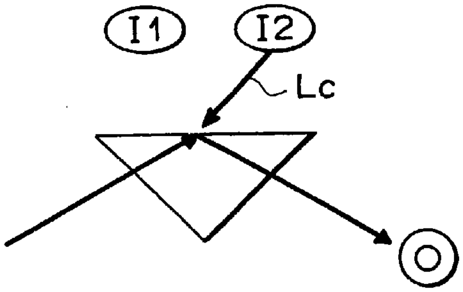
Figure 7D:
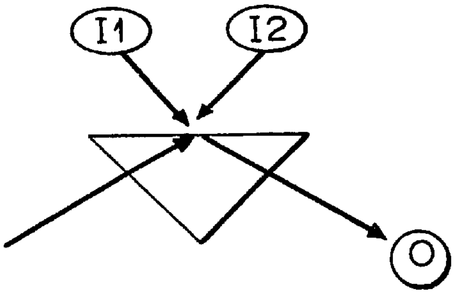

In this embodiment, the two control lights Lc function as input lights I1 and I2. In the optical logic device 10*b* of the mode b, the output light O (the driving light Ld subjected to total reflection) is not emitted when the input lights I1 and I2 are not incident as shown in FIG. 7A, and the output light O is emitted when only one of the input lights I1 and I2 is incident as shown in FIGS. 7B and 7C. When both the input lights I1 and I2 are incident as shown in FIG. 7D, the output light O is emitted since the condition of the cancellation of the total reflection is broken.

That is, when the presence of the input lights I1 and I2 and the output light O is indicated as 1, and the absence thereof is indicated as 0, the input conditions of 1 and 1, 1 and 0, and 0 and 1 provide the output condition of 1, and the input condition of 0 and 0 provides the output condition of 0, so as to constitute an OR circuit.

Figure 4A:
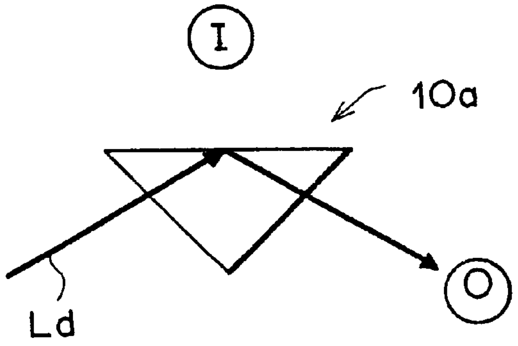
FIGS. 4A and 4B are schematic side views showing one embodiment of the optical logic circuit according to the invention.
Figure 4B:
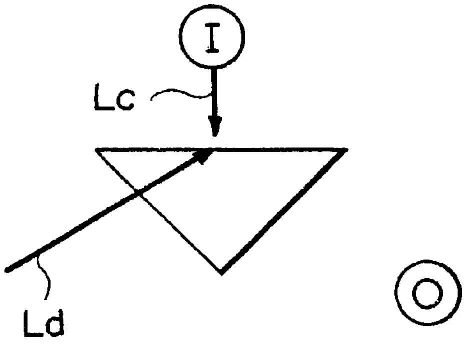

When the exNOR circuit shown in FIGS. 5A to 5D, the AND circuit shown in FIGS. 6A to 6D, and the OR circuit shown in FIGS. 7A to 7D are combined with the NOT circuit shown in FIGS. 4A and 4B in such a manner that the output light O of the circuits is incident on the NOT circuit as the input light I, an exOR circuit, an NAND circuit, and an NOR circuit can be obtained, respectively.

In the optical logic circuit of the invention, it is preferred that plural kinds of light having different wavelengths are used as the plural input lights incident on one optical logic device. In the NOT circuit shown in FIGS. 4A and 4B, for example, the condition of the optical logic device 10*a* is changed by the control light Lc. Because the response of the optical logic device 10*a* depends on the wavelength, it is preferred to use light having such a wavelength that improves the response characteristics of the optical logic device 10*a* as the control light Lc. On the other hand, even when a constitution where the driving light Ld does not reach the optical functional film 3, a part of leaking light may reach the optical functional film 3. By using light having such a wavelength that lowers the response characteristics of the optical logic device 10*a* as the driving light Ld, even when there is leaking light, the influence thereof on the optical logic device 10*a* can be suppressed to a low level.

Embodiments of an optical oscillation circuit utilizing the optical logic device 10*a* and the optical logic device 10*b* will be described with reference to FIGS. 8A to 11B. An optical oscillation circuit shown in FIGS. 8A and 8B will be described. The optical oscillation circuit comprises one optical logic device 10*b* of the mode b, one optical logic device 10*a* of the mode a, and an optical system comprising mirrors 21, 22 and 23. The optical logic device 10*a* of the mode a is arranged in such a manner that the driving light Lb1 subjected to total reflection at the interface between the dielectric block 1 and the metallic film 2 of the optical logic device 10*b* (see FIGS. 2A and 2B) is incident on the optical functional film 3 of the optical logic device 10*a*.

Figure 8A:
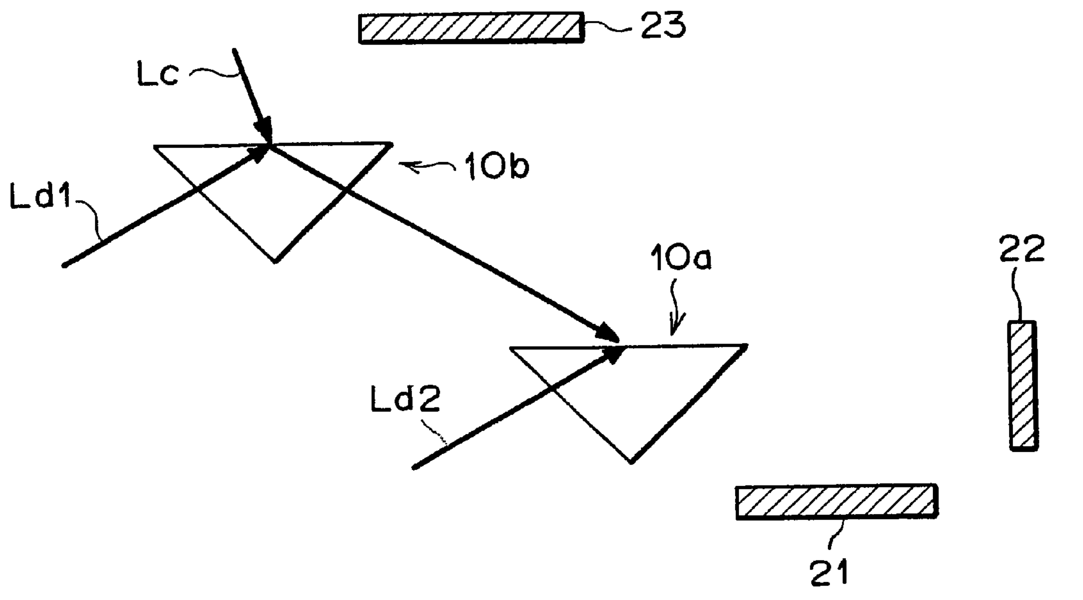
FIGS. 8A and 8B are schematic side views showing one embodiment of the optical oscillation circuit according to the invention.

The function of the optical oscillation circuit will be described. As shown in FIG. 8A, driving lights Lb1 and Lb2 are incident on the optical logic device 10*b* of the mode b and the optical logic device 10*a* of the mode a, respectively. A control light Lc as trigger light is incident on the optical logic device 10*b* of the mode b. When the control light Lc is incident on the optical logic device 10*b* of the mode b, the driving light Lb1 is subjected to total reflection in the optical logic device 10*b* of the mode b, and the driving light Lb1 is incident on the optical logic device 10*a* of the mode a as a control light.

Then, the phenomenon of cancellation of total reflection occurs in the optical logic device 10*a* of the mode a, and the driving light Lb2 is not subjected to total reflection therein. In the case where the phenomenon of cancellation of total reflection does not occur in the optical logic device 10*a* of the mode a, the driving light Lb2 is subjected to total reflection in the optical logic device 10*a*, and reflected by the mirrors 21, 22 and 23 in this order to be incident on the optical logic device 10*b* of the mode b as a control light along the light path shown by the broken lines in FIG. 8B.

When the control light Lc as trigger light is terminated, the phenomenon of cancellation of total reflection occurs in the optical logic device 10*b* of the mode b, and the driving light Lb1 is not subjected to total reflection therein. Then, the driving light Lb1 is not incident on the optical logic device 10*a* of the mode a as a control light, and thus the driving light Lb2 is subjected to total reflection in the optical logic device 10*a* to be incident on the optical logic device 10*b* of the mode b as a control light.

Then, the driving light Lb1 is subjected to total reflection in the optical logic device 10*b* of the mode b, and the driving light Lb1 is incident on the optical logic device 10*a* of the mode a as a control light. Accordingly, the phenomenon of cancellation of total reflection occurs in the optical logic device 10*a* of the mode a, and the driving light Lb2 is not subjected to total reflection therein.

By repeating the operation described above, emission and non-emission of the driving light Lb1 from the optical logic device 10*b* of the mode b and emission and non-emission of the driving light Lb2 from the optical logic device 10*a* of the mode a are continuously switched. Under such a self-excited oscillation condition, when a part of the driving light Lb2 is taken out, for example, by a beam splitter between the mirror 22 and the mirror 23, light subjected to high-speed on/off switching can be taken out. In order to stop the oscillation, the driving light Lb1 or the driving light Lb2 is terminated.

The oscillation can also be started without using the trigger light. For example, the oscillation can be started when the driving light Lb2 is incident on the optical logic device 10*a* of the mode a at a slightly earlier timing than the driving light Lb1 incident on the optical logic device 10*b* of the mode b.

Figure 8B:
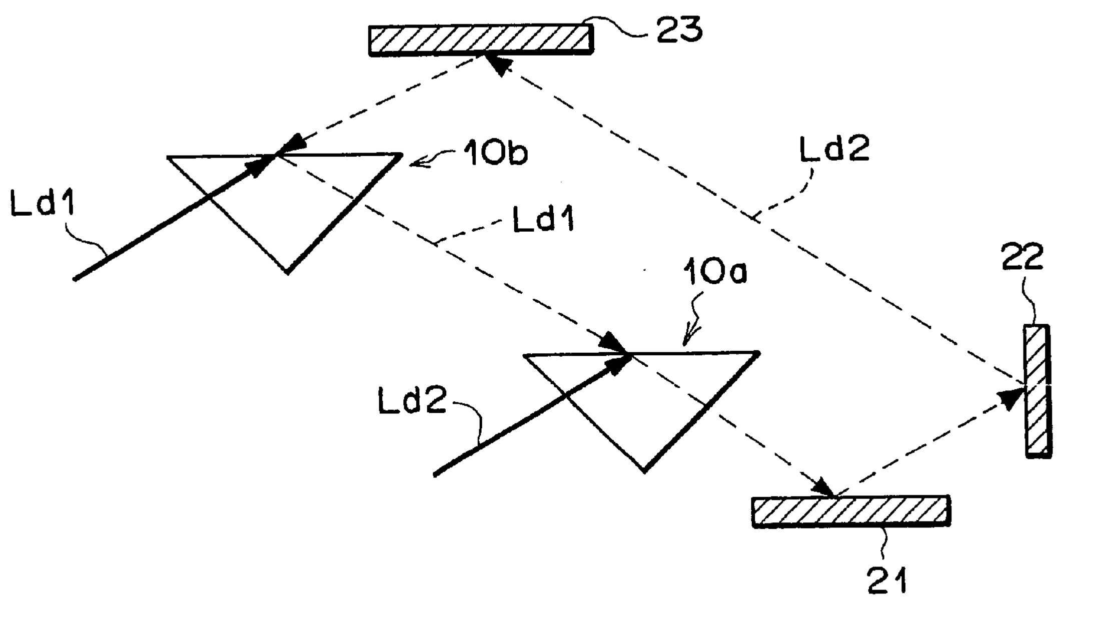
Figure 9:
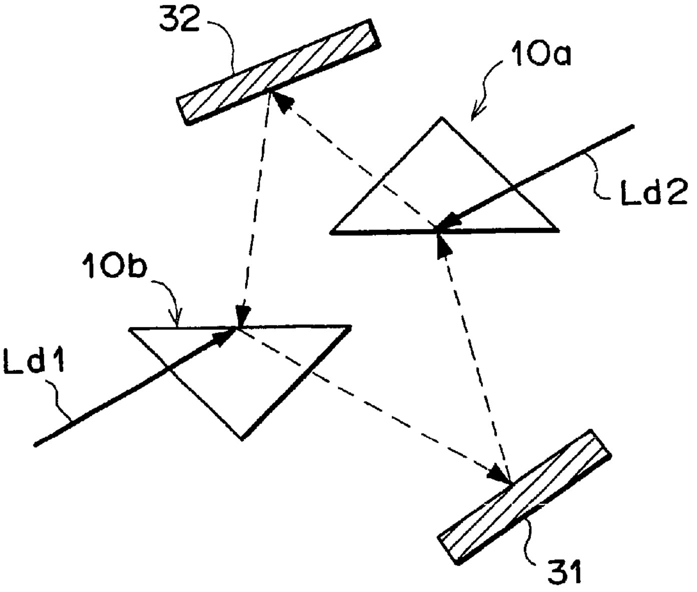
FIG. 9 is a schematic side view showing another embodiment of the optical oscillation circuit according to the invention.
Figure 10:
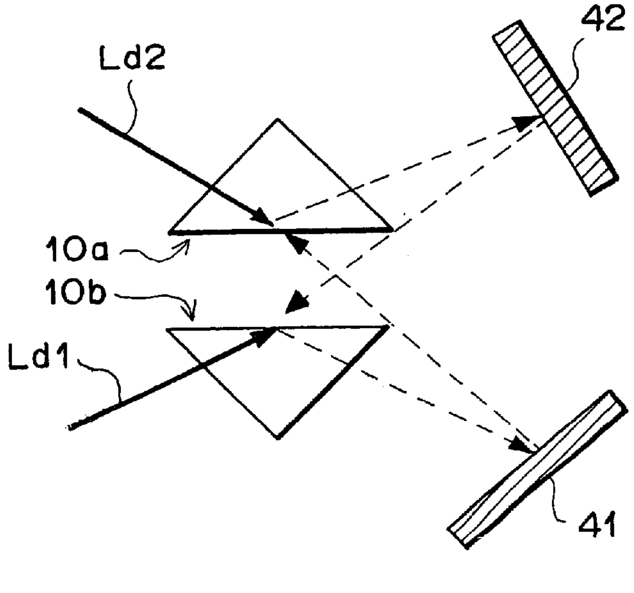
FIG. 10 is a schematic side view showing a further embodiment of the optical oscillation circuit according to the invention.

Furthermore, the optical system combining the optical logic device 10*b* of the mode b and the optical logic device 10*a* of the mode a is not limited to that shown in FIGS. 8A and 8B, and other optical systems, such as those shown in FIGS. 9 and 10, may be applied.

In the embodiment shown in FIG. 9, the optical logic device 10*b* of the mode b and the optical logic device 10*a* of the mode a are arranged as they are slightly deviated from each other, and the driving light Lb1 subjected to total reflection in the optical logic device 10*b* of the mode b is reflected by the mirror 31 to be incident on the optical logic device 10*a* of the mode a as a control light, whereas the driving light Lb2 subjected to total reflection in the optical logic device 10*a* of the mode a is reflected by the mirror 32 to be incident on the optical logic device 10*b* of the mode b as a control light.

In the embodiment shown in FIG. 10, the optical logic device 10*b* of the mode b and the optical logic device 10*a* of the mode a are arranged facing each other, and the driving light Lb1 subjected to total reflection in the optical logic device 10*b* of the mode b is reflected by the mirror 41 to be incident on the optical logic device 10*a* of the mode a as a control light, whereas the driving light Lb2 subjected to total reflection in the optical logic device 10*a* of the mode a is reflected by the mirror 42 to be incident on the optical logic device 10*b* of the mode b as a control light.

A further embodiment of the optical oscillation circuit according to the invention will be described with reference to FIGS. 11A and 11B. The optical oscillation circuit comprises one optical logic device 10*a* of the mode a and an optical system comprising mirrors 51, 52 and 53. The mirrors 51, 52 and 53 are arranged in such a manner that the driving light Ld subjected to total reflection at the interface between the dielectric block 1 and the metallic film 2 of the optical logic device 10*a* of the mode a (see FIGS. 1A and 1B) is incident on the optical functional film 3 of the optical logic device 10*a*.

The function of the oscillation circuit will be described. As shown in FIG. 11A, the driving light Ld is incident on the optical logic device 10*a* of the mode a. The driving light Ld is subjected to total reflection in the optical logic device 10*a* of the mode a, and after being emitted therefrom, it is reflected by the mirrors 51, 52 and 53 in this order to be incident on the optical logic device 10a of the mode a as a control light. Then, as shown in FIG. 11B, the phenomenon of cancellation of total reflection occurs in the optical logic device 10*a* of the mode a, and the driving light Ld is not subjected to total reflection therein.

When the driving light Ld is not subjected to total reflection, the driving light Ld is not incident on the optical logic device 10*a* of the mode a as a control light. The condition of cancellation of total reflection is then broken, and thus the driving light Ld is subjected to total reflection in the optical logic device 10*a* of the mode a.

By repeating the operation described above, emission and non-emission of the driving light Ld from the optical logic device 10*a* of the mode a is continuously switched to obtain a self-excited oscillation condition.

An embodiment of the optical memory device according to the invention will be described in detail with reference to FIGS. 13A to 13C. FIGS. 13A to 13C show a first embodiment of the optical memory device according to the invention. The optical memory device comprises one surface plasmon device 100 and an optical system comprising mirrors 130, 131 and 133 and a half mirror 132, which is omitted in FIGS. 13A and 13B.

The surface plasmon device 100 comprises a dielectric block 1 arranged in such a manner that a driving light 105 is incident on one plane 1*a* thereof at a total reflection critical angle through an interior thereof, a metallic film 2 formed over the one plane 1*a* of the dielectric block 1, and an optical functional film 3, a refractive index of which is changed by irradiation of light, formed over the metallic film 2.

In the invention, the driving light 105 is linearly polarized light having a wavelength of 680 nm, and the dielectric block 1 is arranged in such a manner that the driving light 105 is incident on the one plane 1*a* thereof as P wave polarized light. The dielectric block 1 comprises glass having a high refractive index, and the refractive index thereof at a wavelength of 680 nm is 2.05. The metallic film 2 comprises Au, for example, and the film thickness thereof is 15 nm.

The optical functional film 3 can be preferably formed by using one of the materials described in detail in the foregoing. In this embodiment, the optical functional film 3 comprises a dye having a refractive index n at a wavelength of 680 nm being 1.60 on non-irradiation of the signal light H having a wavelength of 532 nm, and being 1.61 on irradiation of the signal light H.

The function of the optical memory device will be described. The refractive index n of the optical functional film 3 at a wavelength of 680 nm is 1.60 on non-irradiation of the signal light H and is 1.61 on irradiation of the signal light H. The relationship between the incident angle θ of the driving light 105 with respect to the interface between the dielectric block 1 and the metallic film 2 and the reflective index is shown by the broken line and the solid line in FIG. 22 for the cases of a refractive index n of the optical functional film 3 of 1.60 and 1.61, respectively.

When the incident angle θ is set, for example, at 51.8°, the reflective index becomes substantially 0% under the condition where the optical functional film 3 is not irradiated with the signal light H (the refractive index n is 1.60), whereas the reflective index becomes substantially 100% under the condition where the optical functional film 3 is irradiated with the signal light H (the refractive index n is 1.61). Accordingly, the driving light Ld is reflected or is not reflected depending on whether the signal light H is not incident or incident.

FIG. 13A shows the state where the optical functional film 3 is not irradiated at all with the signal light H, FIG. 13B shows the state where the optical functional film 3 is irradiated with the signal light H, and FIG. 13C shows the state where after the irradiation, the signal light H is terminated. By obtaining these kinds of state, the optical memory device can store the space modulation status of the signal light H even after terminating the signal light H. The mechanisms thereof are as described in the foregoing.

The optical memory device according to the second embodiment will be described with reference to FIGS. 14A to 14C. The optical memory device comprises a first surface plasmon device 151, a second surface plasmon device 152, and an optical system comprising mirrors 140, 141, 142, 143 and 144 and a half mirror 145.

The first surface plasmon device 151 and the second surface plasmon device 152 are formed similarly to the surface plasmon device 100 in FIGS. 13A to 13C. That is, the first dielectric block 101, the first metallic film 102, the first optical functional film 103, and the one plane 101*a* of the first dielectric block 101 constituting the first surface plasmon device 151 correspond to the dielectric block 1, the metallic film 2, the optical functional film 3, and the one plane 1*a* of the dielectric block 1 of the surface plasmon device 100, respectively. The second dielectric block 121, the second metallic film 122, the second optical functional film 123, and the one plane 121*a* of the second dielectric block 121 constituting the second surface plasmon device 152 correspond to the dielectric block 1, the metallic film 2, the optical functional film 3, and the one plane 1*a* of the dielectric block 1 of the surface plasmon device 100, respectively.

The incident angle θ of the driving light 105 with respect to the interface between the first dielectric block 101 and the first metallic film 102 is set at 51.8° as described above. Then, similarly to the case of the surface plasmon device 100, the driving light 105 is reflected or is not reflected at the interface corresponding to irradiation and non-irradiation of the signal light H on the first optical functional film 103.

The incident angle θ of the driving light 105 with respect to the interface between the second dielectric block 121 and the second metallic film 122 is set at 52.2° (see FIG. 22). Then, in contrast to the case of the surface plasmon device 100, the driving light 105 is not reflected or is reflected at the interface corresponding to irradiation and non-irradiation of light on the second optical functional film 123.

FIG. 14A shows the state where the first optical functional film 103 is not irradiated at all with the signal light H, and the second optical functional film 123 is not irradiated with the reset light 106 either, FIG. 14B shows the state where, starting from the state of FIG. 14A, the first optical functional film 103 is irradiated with the signal light H, and FIG. 14C shows the state where after irradiating the signal light H1, the second optical functional film 123 is irradiated with the reset light 106. By obtaining these kinds of state, the optical memory device can store the modulation status by the signal light H even after terminating the signal light H, and the storage state can be cancelled by irradiation of the reset light 106. The mechanisms thereof are as described in the foregoing.

The optical operation device according to the third embodiment of the invention will be described with reference to FIGS. 15A to 15C. The optical operation device comprises a first surface plasmon device 151 and a second surface plasmon device 152, which are the same as that in the optical memory device shown in FIGS. 14A to 14C, as well as an optical system comprising mirrors 140, 141, 142, 143 and 144 and a half mirror 145.

In the optical operation device, the second signal light H2 subjected to space modulation is incident on the optical functional film 123 of the second surface plasmon device 152. In this case, the signal light incident on the first surface plasmon device 151 is called a first signal light H1.

According to the optical operation device, the difference between the space modulation status by the first signal light H1 and the space modulation status by the second signal light H2 can be determined. Furthermore, when the optical functional film 63 shown in FIG. 18 or the optical functional film 73 shown in FIG. 19 is particularly applied in the first surface plasmon device 151 and the second surface plasmon device 152, the difference between two gradation images can be determined. The mechanisms thereof are as described in detail in the foregoing.

The case where the first signal light H1 and the second signal light H2 each carry image information will be described in more detail with reference to FIGS. 20A to 21D. In these figures, images by the first signal light H1 and the second signal light H2 are shown as the first image and the second image, respectively, and the images observed through the half mirror 145 are shown as a monitor image. In order to observe the monitor image, the driving light 105 partly branched by the half mirror 145 is introduced into an image pickup device 80, such as a CCD, as shown in FIG. 15C, and the pickup image is then displayed by image displaying means 81, such as a CRT.

As shown in FIG. 20A, when the first image is inputted to the first surface plasmon device 151 while the second image is not inputted to the second surface plasmon device 152, the same image is displayed as a monitor image even when the input of the first image is terminated as shown in FIG. 20B. In order to facilitate the descriptions, the images are binary images, and the diagram indicating a human figure in the images is not a high density part as shown in the figures, but is of a low density (i.e., a part having a high luminance by irradiating with the signal light).

Starting from the state shown in FIG. 20B, the second image is inputted to the second surface plasmon device 152 as shown in FIG. 20C, and as a result, a part of a high luminance that is present in the first image but is not present in the second image is shown as the monitor image as shown in FIG. 20D. As the monitor image is shown in this manner, it can be determined that the first image and the second image are not identical.

While FIGS. 20A to 20D show the process of image operation according to the lapse of time, FIGS. 21A to 21D show what kind of image is displayed as the monitor image when the image operation process is conducted according to the procedures described above.

FIG. 21A shows the operation result when the first image and the second image are those shown in FIGS. 20A to 20D. FIG. 21B shows the operation result when a part of high luminance that is not present in the first image is shown in the second image. In this case, no image is displayed as the monitor image as described in the foregoing, and thus there is a possibility of erroneously determining that the images are identical.

When the first image and the second image are interchanged with each other as shown in FIG. 21C, a part of high luminance that is present only one of the images is displayed as the monitor image, and thus it can be determined that there is a difference between the images.

Furthermore, in order to prevent in the erroneous determination described above, instead of the interchanging of the first image and the second image, negative images of the first and second images are inputted to the first surface plasmon device 151 and the second surface plasmon device 152, respectively, and thus a part of high luminance that is present in only one of the images is displayed as the monitor image, whereby it can be easily determined that there is a difference between the images.

What is claimed is:

1. An optical logic device performing a logic operation with respect to one or plural input lights, said optical logic device comprising a dielectric block arranged in such a manner that a driving light is incident on one plane thereof at a total reflection critical angle through an interior thereof, a metallic film formed over said one plane of said dielectric block, and an optical functional film comprising organic dye, a refractive index of which is changed by irradiation of light, formed over said metallic film in such a manner that said optical functional film is irradiated with a control light;

wherein said optical functional film comprises a compound represented by formula (I):

(I)

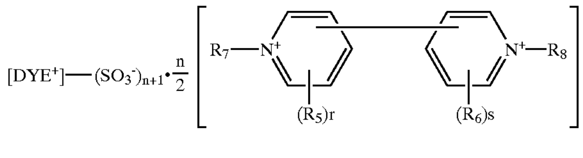

wherein $DYE^+$ represents a mono-valent cation of a cyanine dye; n represents an integer of 1 or more; $R_5$ and $R_6$ each independently represents a substituent group; $R_7$ and $R_8$ each independently represent an alkyl group, an alkenyl group, an alkynyl group, an aralkyl group, an aryl group or a heterocyclic group, provided that $R_5$ and $R_6$, $R_5$ and $R_7$, $R_6$ and $R_8$, or $R_7$ and $R_8$ may each be connected to form a ring; and r and s each independently represent an integer of from 0 to 4, provided that when r and s are each 2 or more, plural groups of r and s may be the same or different.

2. An optical logic device performing a logic operation with respect to one or plural input lights, said optical logic device comprising a dielectric block arranged in such a manner that a driving light is incident on one plane thereof at a total reflection critical angle through an interior thereof, a metallic film formed over said one plane of said dielectric block, and an optical functional film comprising organic dye, a refractive index of which is changed by irradiation of light, formed over said metallic film in such a manner that said optical functional film is irradiated with a control light;

wherein said optical functional film comprises a dye compound represented by formula (II-1) or a dye compound represented by formula (II-2) solely, or a combination of a plurality of said compounds:

(II-1)

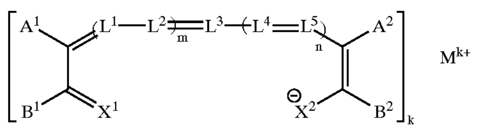

(II-2)

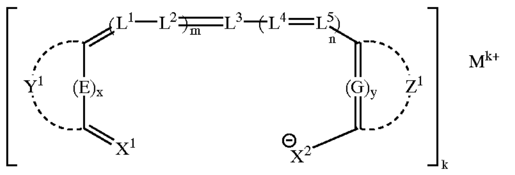

wherein $A^1$, $A^2$, $B^1$, and $B^2$ each independently represent a substituent; $L^1$, $L^2$, $L^3$, $L^4$, and $L^5$ each represent a methine group; $X^1$ represents =O, =NR, or =C(CN), in which R represents a substituent; $X^2$ represents —O, —NR, or —$C(CN)_2$, in which R represents a substituent; m and n each represent an integer of from 0 to 2; $Y^1$ and E each represent an atom or an atom group necessary for forming a carbocyclic ring or a heterocyclic ring; $Z^1$ and G each represent an atom or an atom group necessary for forming a carbocyclic ring or a heterocyclic ring; x and y each independently represent 0 or 1, $M^{K+}$ represents an onium ion, and k represents the number of charges.

3. An optical logic device performing a logic operation with respect to one or plural input lights, said optical logic device comprising a dielectric block arranged in such a manner that a driving light is incident on one plane thereof at a total reflection critical angle through an interior thereof, a metallic film formed over said one plane of said dielectric block, and an optical functional film comprising organic dye, a refractive index of which is changed by irradiation of light, formed over said metallic film in such a manner that said optical functional film is irradiated with a control light;

wherein said optical functional film comprises an organic dye represented by formula (III):

(III)

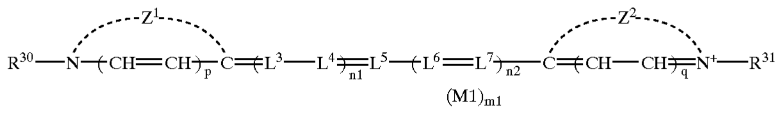

wherein $Z^1$ and $Z^2$ each represent an atom group necessary for forming a 5-membered or 6-membered nitrogen-containing heterocyclic ring; $R^{30}$ and $R^{31}$ each independently represent an alkyl group; $L^3$, $L^4$, $L^5$, $L^6$, and $L^7$ each represent a methine group; n1 and n2 each represent an integer of from 0 to 2; p and q each independently represent an integer of from 0 to 2; and M1 represents a charge balancing counter ion.

4. The optical logic device as claimed in claim 3, wherein said optical functional film comprises a combination of said organic dye represented by formula (III) and an organic oxidizing agent represented by formula (IV):

(IV)

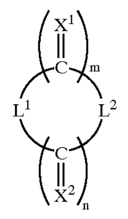

wherein m and n each independently represent an integer of from 0 to 2; $X^1$ and $X^2$ each represent $=NR^1$ or $=CR^2R^3$, in which $R^1$, $R^2$, and $R^3$ each represent substituents; and $L^1$ and $L^2$ each independently represent a divalent linking group.

5. An optical logic device performing a logic operation with respect to one or plural input lights, said optical logic device comprising a dielectric block arranged in such a manner that a driving light is incident on one plane thereof at a total reflection critical angle through an interior thereof, a metallic film formed over said one plane of said dielectric block, and an optical functional film comprising organic dye, a refractive index of which is changed by irradiation of light, formed over said metallic film in such a manner that said optical functional film is irradiated with a control light;

wherein said optical functional film comprises an organic dye represented by formula (V):

(V)

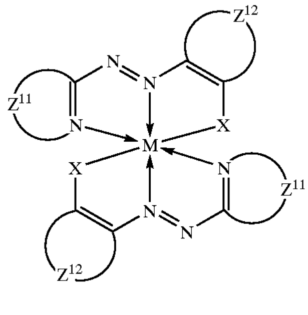

wherein M represents a metal atom; X represents an oxygen atom, a sulfur atom, or $=NR^{21}$; $R^{21}$ represents a hydrogen atom, an alkyl group, an aryl group, an acyl group, an alkylsulfonyl group, or an arylsulfonyl group; $Z^{11}$ represents a atom group necessary for completing a 5-membered or 6-membered nitrogen-containing heterocyclic ring; and $Z^{12}$ represents an atom group necessary for completing an aromatic ring or a heterocyclic aromatic ring.

6. An optical logic device performing a logic operation with respect to one or plural input lights, said optical logic device comprising a dielectric block arranged in such a manner that a driving light is incident on one plane thereof at a total reflection critical angle through an interior thereof, a metallic film formed over said one plane of said dielectric block, and an optical functional film comprising organic dye, a refractive index of which is changed by irradiation of light, formed over said metallic film in such a manner that said optical functional film is irradiated with a control light;

wherein said optical functional film comprises an organic dye represented by formula (VI):

(VI)

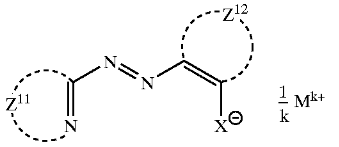

wherein k and M have the same meanings as those of K and M respectively, in formula (II-1) or formula (II-2); and X, $Z^{11}$, and $Z^{12}$ have the same meanings as those of X, $Z^{11}$, and $Z^{12}$ respectively in formula (V).

7. An optical logic circuit comprising a plurality of optical logic devices according to any one of claims 1 to 6, in such a manner that a driving light subjected to total reflection as an interface between said dielectric block and said metallic film of one of said optical logic devices is incident on another optical logic device as the control light.

8. An optical logic device performing a logic operation with respect to one or plural input lights, said optical logic device comprising a dielectric block arranged in such a manner that a driving light is incident on one plane thereof at a total reflection critical angle through an interior thereof, a metallic film formed over said one plane of said dielectric block, and an optical functional film, a refractive index of which is changed by irradiation of light, formed over said metallic film in such a manner that said optical functional film is irradiated with a control light, wherein said optical functional film comprises at least one compound represented by at least one of the formulae (I), (II-1), (II-2), (III), (IV), (V), and (VI):

(I)

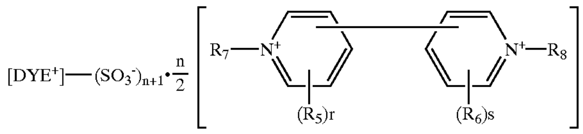

wherein $DYE^+$ represents a mono-valent cation of a cyanine dye; n represents an integer of 1 or more; $R_5$ and $R_6$ each independently represent a substituent group; $R_7$ and $R_8$ each independently represent an alkyl group, an alkenyl group, an alkynyl group, an aralkyl group, an aryl group or a heterocyclic group, provided that $R_5$ and $R_6$, $R_5$ and $R_7$, $R_6$ and $R_8$, or $R_7$ and $R_8$ may each be connected to form a ring; and r and s each independently represent an integer from 0 to 4, provided that when r and s are each 2 or more, plural groups of r and s may be the same or different;

(II-1)

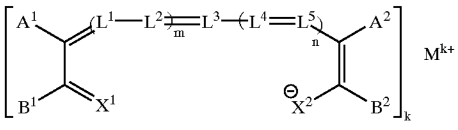

wherein $A^1$, $A^2$, $B^1$, and $B^2$ each independently represent a substituent; $L^1$, $L^2$, $L^3$, $L^4$, and $L^5$ each represent a methine group; $X^1$ represents =O, =NR, or =C(CN), in which R represents a substituent; $X^2$ represents —O, —NR, or $—C(CN)_2$, in which R represents a substituent; m and n each represent an integer of from 0 to 2; $M^{K+}$ represents an onium ion, and k represents the number of charges (II-2)

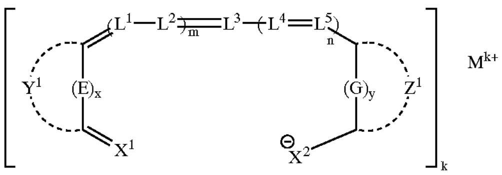

wherein $L^1$, $L^2$, $L^3$, $L^4$, and $L^5$ each represent a methine group; $X^1$ represents =O, =NR, o =C(CN), in which R represents a substituent; $X^2$ represents —O, —NR, or $—C(CN)_2$, in which R represents a substituent; m and n each represent an integer from 0 to 2; $Y^1$ and E each represent an atom or an atom group necessary for forming a carbocyclic ring or a heterocyclic ring; $Z^1$ and G each represent an atom or an atom group necessary for forming a carbocyclic ring or a heterocyclic ring; x and y each independently represent 0 or 1, $M^{K+}$ represents an onium ion, and k represents the number of charge;

(III)

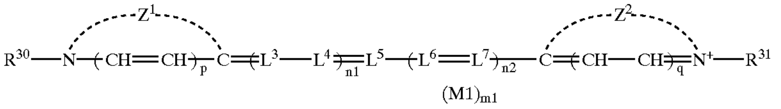

wherein $Z^1$ and $Z^2$ each represent an atom group necessary for forming a 5-membered or 6-membered nitrogen-containing heterocyclic ring; $R^{30}$ and $R^{31}$ each independently represent an alkyl group; $L^3$, $L^4$, $L^5$, $L^6$, and $L^7$ each represent a methine group; n1 and n2 each represent an integer of from 0 to 2; p and q each independently represent an integer of from 0 to 2; and M1 represents a charge balancing counter ion;

(IV)

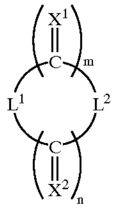

wherein m and n each independently represent an integer of from 0 to 2; $X^1$ and $X^2$ each represent $=NR^1$ or $=CR^2R^3$, in which $R^1$, $R^2$, and $R^3$ each represent substituents; and $L^1$ and $L^2$ each independently represent a divalent linking group;

(V)

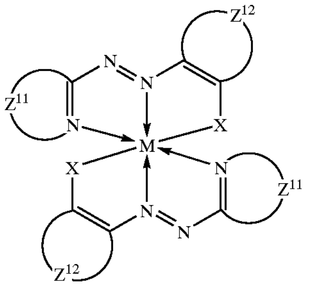

wherein M represents a metal atom; X represents an oxygen atom, a sulfur atom, or $=NR^{21}$; $R^{21}$ represents a hydrogen atom, an alkyl group, an aryl group, an acyl group, an alkylsulfonyl group, or an arylsulfonyl group; $Z^{11}$ represents a atom group necessary for completing a 5-membered or 6-membered nitrogen-containing heterocyclic ring; and $Z^{12}$ represents an atom group necessary for completing an aromatic ring or a heterocyclic aromatic ring; and (VI)

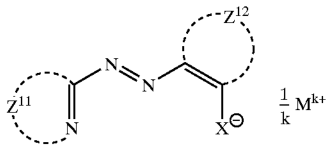

wherein k and M have the same meanings as those of K and M respectively, in formula (II-1) or formula (II-2); and X, $Z^{11}$, and $Z^{12}$ have the same meanings as those of X, $Z^{11}$, and $Z^{12}$ respectively in formula (V).

9. An optical logic circuit comprising a plurality of optical logic devices according to claim 8, in such a manner that a driving light subjected to total reflection as an interface between said dielectric block and said metallic film of one of said optical logic devices is incident on another optical logic device as the control light.

* * * * *